United States Patent
Rothrock et al.

(10) Patent No.: US 10,308,864 B2
(45) Date of Patent: Jun. 4, 2019

(54) CORE-SHELL TRIGGERED RELEASE SYSTEMS

(71) Applicant: Research Triangle Institute, Research Triangle Park, NC (US)

(72) Inventors: Ginger D. Rothrock, Cary, NC (US); Leah Marie Johnson, Durham, NC (US)

(73) Assignee: RESEARCH TRIANGLE INSTITUTE, Research Triangle Park, NC (US)

( * ) Notice: Subject to any disclaimer, the term of this patent is extended or adjusted under 35 U.S.C. 154(b) by 0 days.

(21) Appl. No.: 15/975,205

(22) Filed: May 9, 2018

(65) Prior Publication Data

US 2018/0258340 A1    Sep. 13, 2018

Related U.S. Application Data

(62) Division of application No. 14/911,542, filed as application No. PCT/US2014/050679 on Aug. 12, 2014, now Pat. No. 9,994,759.

(Continued)

(51) Int. Cl.
*E21B 43/16* (2006.01)
*C09K 8/588* (2006.01)
(Continued)

(52) U.S. Cl.
CPC ............. *C09K 8/588* (2013.01); *B01J 13/14* (2013.01); *C09K 8/03* (2013.01); *C09K 8/516* (2013.01);
(Continued)

(58) Field of Classification Search
CPC . B01J 13/14; C09K 8/03; C09K 8/516; C09K 8/58; C09K 8/536; C09K 8/584;
(Continued)

(56) References Cited

U.S. PATENT DOCUMENTS 4,250,044 A * 2/1981 Hinkel ............... C09K 8/62
    166/308.2
4,770,796 A * 9/1988 Jacobs ............... C09K 8/685
    166/307

(Continued)

FOREIGN PATENT DOCUMENTS

| WO | WO 2011/048459 | 4/2011 |
| WO | WO 2012/090158 | 7/2012 |
| WO | WO 2012/116230 | 8/2012 |

OTHER PUBLICATIONS

Cocuzza et al., "Current and Future Nanotech Applications in the Oil Industry," *American Journal of Applied Sciences*, 2012, pp. 784-793, vol. 9, No. 6.

(Continued)

*Primary Examiner* — Silvana C Runyan
(74) *Attorney, Agent, or Firm* — Womble Bond Dickinson (US) LLP

(57) ABSTRACT

The present disclosure relates to delivery and release systems, such as core-shell particles. An exemplary composition according to the disclosure can include a carrier element forming an outer shell that defines an inner core. The core can include a reactive agent that is adapted to react with the shell, particularly at an inner interface of the shell with the core materials. The reaction can provide an inside-out degradation of the shell and release of one or more materials therein. The reactive agent may be separated from the shell, such as using a phase change material (PCM). Upon reaching specific environmental conditions, the PCM can change so as the release the reactive agent for reaction with the shell. The systems can be used in various methods to deliver a material to various environments, including underground reservoirs.

18 Claims, 45 Drawing Sheets

Related U.S. Application Data

(60) Provisional application No. 61/865,319, filed on Aug. 13, 2013.

(51) Int. Cl.

| | |
|---|---|
| *C09K 8/58* | (2006.01) |
| *C09K 8/92* | (2006.01) |
| *B01J 13/14* | (2006.01) |
| *C09K 8/584* | (2006.01) |
| *C09K 8/03* | (2006.01) |
| *C09K 8/516* | (2006.01) |
| *C09K 8/536* | (2006.01) |
| *C09K 8/70* | (2006.01) |
| *B82Y 30/00* | (2011.01) |
| *B82Y 40/00* | (2011.01) |

(52) U.S. Cl.
CPC ................ *C09K 8/536* (2013.01); *C09K 8/58* (2013.01); *C09K 8/584* (2013.01); *C09K 8/70* (2013.01); *C09K 8/92* (2013.01); *E21B 43/16* (2013.01); *B82Y 30/00* (2013.01); *B82Y 40/00* (2013.01); *C09K 2208/10* (2013.01)

(58) Field of Classification Search
CPC ........ C09K 8/70; C09K 8/92; C09K 2208/10; E21B 43/16; B82Y 30/00
See application file for complete search history.

(56) References Cited

U.S. PATENT DOCUMENTS

| | | |
|---|---|---|
| 7,595,281 B2 | 9/2009 | McDaniel et al. |
| 8,141,637 B2 | 3/2012 | Barmatov et al. |
| 2010/0065271 A1 | 3/2010 | McCrary et al. |
| 2010/0314118 A1 | 12/2010 | Quintero et al. |
| 2012/0004148 A1 | 1/2012 | Ogle et al. |

OTHER PUBLICATIONS

Tiantian et al., "Engineered Nanoparticles as Harsh-Condition Emulsion and Foam Stabilizers and as Novel Sensors," *Offshore Technology Conference*, May 2-5, 2011, p. 6. Par. 2.

* cited by examiner

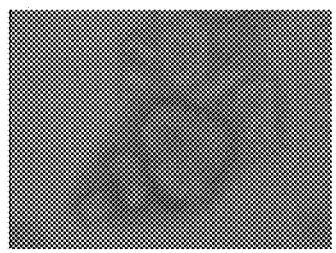 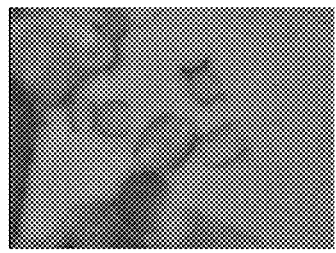 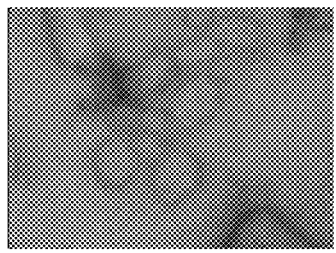
FIG. 26A　　　　FIG. 26B　　　　FIG. 26C
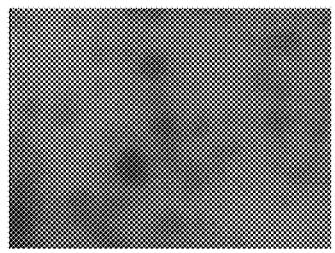 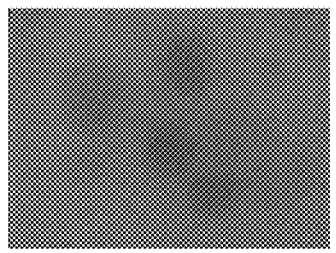 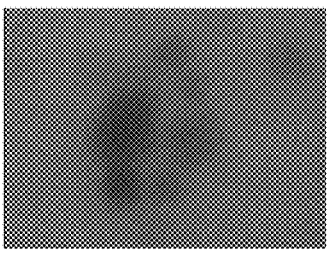
FIG. 27A　　　　FIG. 27B　　　　FIG. 27C
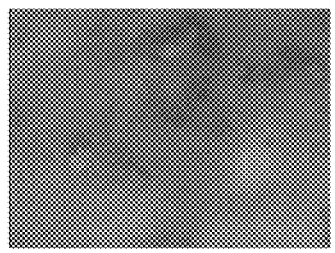 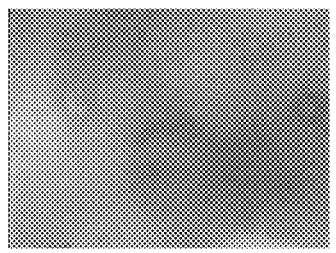 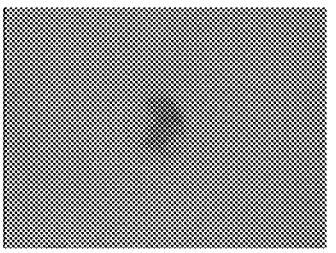
FIG. 28A　　　　FIG. 28B　　　　FIG. 29

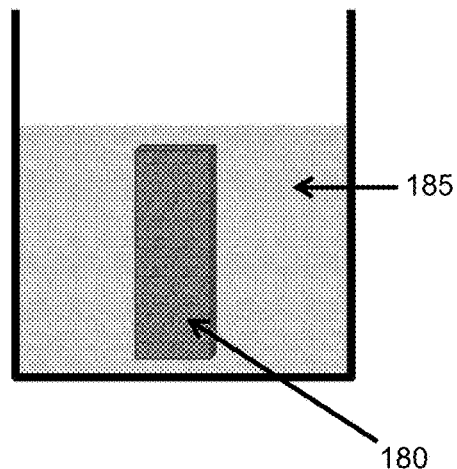
FIG. 35
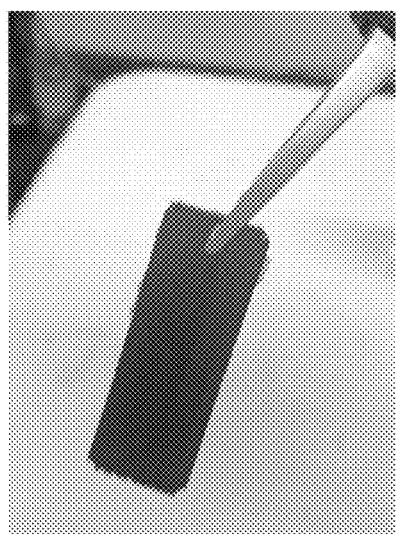 
FIG. 36  FIG. 37

(●) 1:0 [PACM:4-APDS]; (■) 0.75:0.2 [PACM:4-APDS]; (♦) 0.5:0.5 [PACM:4-APDS];
(▼) 0.25:0.75 [PACM:4-APDS]

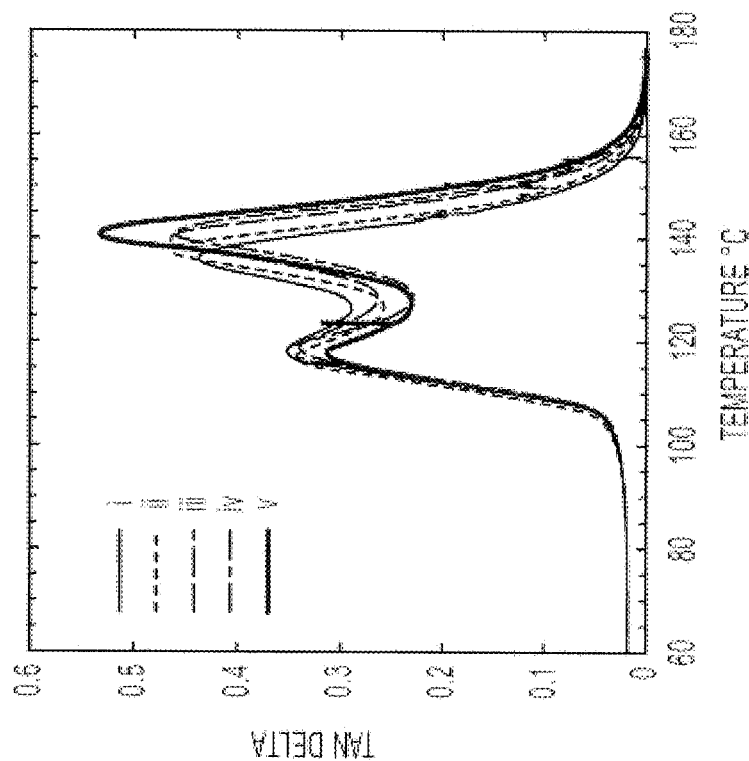
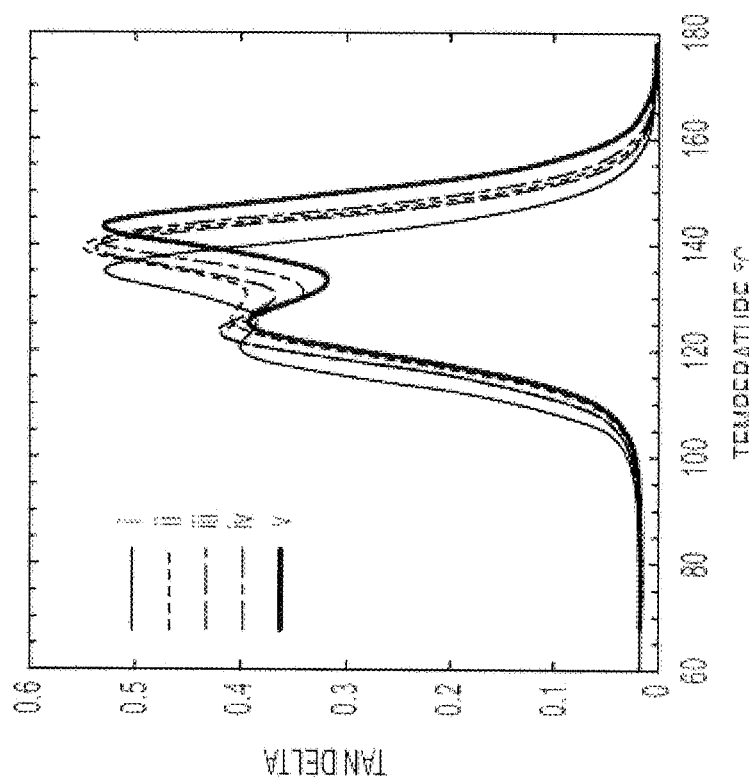
FIG. 45A
FIG. 45B

CORE-SHELL TRIGGERED RELEASE SYSTEMS

CROSS-REFERENCE TO RELATED APPLICATIONS

The present application is a divisional of U.S. patent application Ser. No. 14/911,542, filed Feb. 11, 2016, which is a U.S. National Stage of International Patent Application No. PCT/US2014/050679, filed Aug. 12, 2014, which claims priority to U.S. Provisional Application 61/865,319, filed Aug. 13, 2013, the disclosures of all applications being incorporated by reference herein in their entirety.

FIELD OF THE DISCLOSURE

The present disclosure relates to delivery and release compositions, systems, and methods of use thereof. In particular, the present disclosure provides carrier elements adapted to contain a further material and release the further material in response to a specified trigger.

SUMMARY OF THE DISCLOSURE

The present disclosure provides delivery and release systems that are useful in any environment where it may be desirable to deliver a material that is protected or otherwise separated from the environment until specific conditions are present. The delivery and release system may comprise a core-shell particle. The delivery and release system and methods of use thereof may be applied to release of materials in a subterranean reservoir, such as for utilization in enhanced oil recovery ("EOR") or the like.

The presently described delivery and release systems can utilize an inside-out reaction mechanism to release a material from a core of a particle. An agent positioned within the core may react in some fashion (e.g., chemical or physical) on the interior of the shell, which may be described as the core-shell interface, which is distinct from the shell-environment interface. The nature of the environment can be relied upon to cause a change within the core of the particle that allows one or more agents within the core to act upon the shell at the core-shell interface. The presently described delivery and release systems can be utilized in a wide variety of environments since the shell is not degraded directly by the materials in the surrounding environment. Thus, the delivery and release systems may be substantially stable under a first set of conditions but may be configured to at least partially degrade under one or more different set of conditions.

In some embodiments, a delivery and release system according to the present disclosure comprises: an inner core; a carrier element forming an outer shell that surrounds the inner core and fluidly separates the inner core from an external environment; and a reactive agent positioned within the inner core. In some embodiments, the reactive agent is adapted to react with the carrier element when the external environment exhibits specified conditions and change at least a portion of the outer shell so as to cause at least a portion of the core to be in fluid communication with the external environment. The delivery and release system may be in the form of a plurality of particles.

The delivery and release system, in the form of particles, may be used in a method of delivering and releasing a releasable material in a subterranean reservoir having environmental conditions. In some embodiments, the method comprises providing particles of the delivery and release system as described herein and delivering the particles to the subterranean reservoir such that the particles are subjected to the subterranean reservoir environmental conditions. In some embodiments, the reactive agent is configured to react with the carrier element at one or more of the subterranean reservoir environmental conditions one or both of during and after the delivering of the particles. Further, reacting can be effective to change at least a portion of the outer shell so as to cause at least a portion of the inner core to be in fluid communication with the subterranean reservoir and to cause at least a portion of the material for release to move from the inner core to the subterranean reservoir.

The delivery and release systems and their methods of use thereof can be defined by one or more of the following statements. Specifically, a delivery and release system and/or a method of use thereof as described above may include one, two, or any number of the following characteristics in any combination.

The nature of the reaction at the core-shell interface can vary. The reactive agent can be adapted to react chemically with the carrier element. The change to the outer shell can be at least a partial degradation of the outer shell. The reactive agent can be adapted to react physically with the carrier element.

The delivery and release system can be in the form of particles. The delivery and release system can comprise a phase change material ("PCM"). The PCM can be solid up to a temperature of about 40° C. and a liquid at greater temperatures. The PCM can be adapted to transition between solid and liquid states or between liquid and vapor states at one or more of the subterranean reservoir environmental conditions or under other external conditions. The PCM can be adapted to substantially isolate the reactive agent from reacting with the carrier element until the delivery and release system is subjected to the subterranean reservoir environmental conditions or other external conditions.

The carrier element can comprise a polymeric material. The polymeric material can include crosslinks adapted for degradation upon reaction with the reactive agent.

The releasable material can be selected from the group consisting of sensors, probes, markers, materials reactive with one or more components of the subterranean reservoir or other external environment, and combinations thereof.

The carrier element can comprise a material adapted for reversible change. The change to the outer shell can be an inside-out degradation of the outer shell.

At least a portion of the particles may be nanoparticles. At least a portion of the particles may be solid lipid nanoparticles.

The subterranean reservoir may be a hydrocarbon-bearing reservoir. The subterranean environmental conditions can be selected from the group consisting of pH, temperature, pressure, salinity, water content, oil content, and combinations thereof.

In a non-limiting example, core-shell particles enable the monitoring of subsurface environments (e.g., hydrocarbon-bearing reservoirs, underground water systems, and the like) to evaluate spatial distribution of materials therein, such as oil, gas, or contaminates. In another non-limiting example, the core-shell particles can enable a delayed release of specific compounds or functional elements (e.g., sensors).

Current approaches for identifying the location of subsurface oil involve injecting tracers at specific times. Existing tracers only map the entry and exit sites without detailing the physical structure of the geological formation or the location of the underlying hydrocarbon resources. Moreover, current tracers often adhere to subsurface rock inhibiting mobility of the tracer. The presently disclosed delivery and release systems overcome such challenges by providing previously unrecognized, controlled release core-shell particles to monitor different subsurface zones. In some embodiments, the presently disclosed systems include core-shell particles that remain stable for extended periods of time (e.g., several hours, several days, or several weeks) to enable the migration away from the wellbore and into the surrounding geological structures. The particles can be engineered to burst at specific time points (i.e., comprising a "chemical clock") to release carried materials, such as sensors, chemicals, and the like. The present disclosure thus can provide a controlled release system that expels a carried material or device at an engineered time point, which corresponds to delivery of the system to an environment with specified conditions. Moreover, the external core-shell structure can be readily modified to enhance mobility of the particles underground. This system can be used not only to map geological structures, but also to detect adverse events such as water breakthrough over the production time period. In relation to use in hydrocarbon-bearing reservoirs and the like, the presently disclosed delivery and release systems can deliver compounds of interest away from a wellbore, which compounds may include wettability modifiers, breakers, anti-scale agents, surfactants, catalysts, fracture agents, blocking agents, contrast agents, tracers, cross-linkers, and other compounds of interest for control of hydrocarbon production.

BRIEF DESCRIPTION OF THE FIGURES

Reference will now be made to the accompanying drawings, which are not necessarily drawn to scale, and wherein:

FIG. 18 shows the percent crystallinities of multiple PCMs according to embodiments of the present disclosure;

FIGS. 26A through 26C are transmission electron microscopy ("TEM") images of solid lipid nanoparticles according to embodiments of the present disclosure prepared using stearic acid, TWEEN® 80, and F68;

FIGS. 27A through 27C are transmission electron microscopy ("TEM") images of solid lipid nanoparticles according to embodiments of the present disclosure prepared using beeswax and TWEEN® 80;

FIGS. 28A and 28B are TEM images of solid lipid nanoparticles according to embodiments of the present disclosure prepared using stearic acid and cetyltrimethylammonium bromide ("CTAB");

FIG. 29 is a transmission electron microscopy (TEM) image of solid lipid nanoparticles according to embodiments of the present disclosure prepared using glyceryl trimyristate;

FIG. 35 is an illustration of an experimental setup for qualitative evaluation of degradable disulfide crosslinks in epoxy materials according to embodiments of the present disclosure;

FIG. 36 is an image of a film of epoxy polymer comprising EPON® 862 and 4APDS according to embodiments of the present disclosure prior to placement into a container of 100% 2-mercaptoethanol;

FIG. 37 is an image of the film of FIG. 36 after being in a container of 100% 2-mercaptoethanol for approximately 3.5 hours at 75° C.

FIG. 45A provides a graph of the tan delta curves of samples immersed in oil wherein samples were left at 10,000 psi and 100° C. for 2 weeks, and wherein the epoxy polymer samples were formed of EPON 862 and (i) 1:0, (ii) 0.75: 0.25, (iii) 0.5:0.5, and (iv) 0.25:0 [4APDS and AMICURE® PACM];

FIG. 45B provides a graphs of the tan delta curves of samples immersed in pH 12 slurry wherein samples were left at 10,000 psi and 100° C. for 2 weeks, and wherein the epoxy polymer samples were formed of EPON 862 and (i) 1:0, (ii) 0.75:0.25, (iii) 0.5:0.5, and (iv) 0.25:0 [4APDS and AMICURE® PACM];

DETAILED DESCRIPTION

Figure 1:
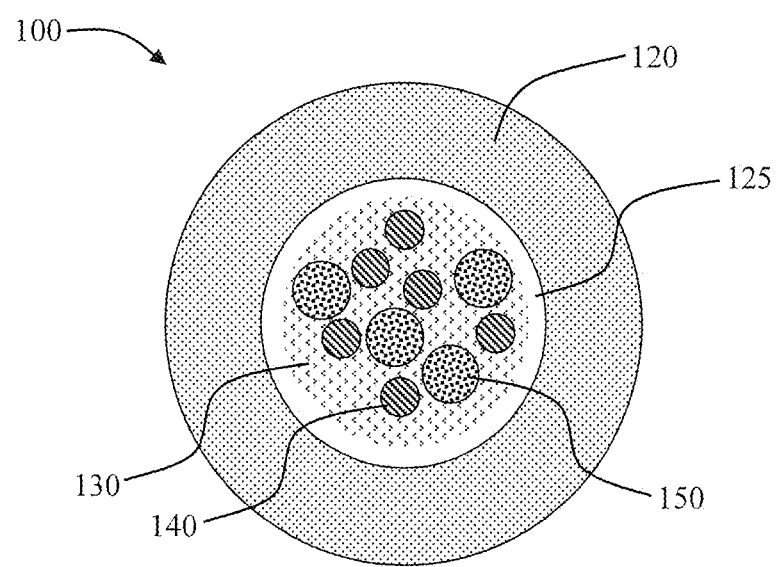
FIG. 1 shows a release and delivery system according to embodiments of the present disclosure including a shell, a core, a phase change material, a reactive agent, and a sensor.

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Controlled delivery of materials can be desirable in a variety of industries and settings. One means for controlled delivery is the use of core-shell particles wherein a material for delivery is enclosed in a shell that is formed of a material that is compromised so as to release the enclosed material under defined conditions—i.e., a trigger. Such systems have relied upon triggers from the external environment to change the properties of the shell and release the enclosed material—i.e., an "outside-in" release mechanism. Such systems have thus relied upon some type of reaction that occurs at the external surface of the particle shell, and the reaction kinetics were thus driven by the external environment where the enclosed material was to be released. By way of example, conditions such as pH, the presence of chemicals (e.g., mild acids/bases or enzymes), or pressure changes (e.g., mechanical pressure, shear stress, or osmotic pressure) have been used to directly rupture shells from the outside and release core components.

Such core-shell particles have been useful in environments that were well understood and where the physical conditions (e.g., temperature, pH, etc.) were well-known. It is now recognized that such systems can be unreliable in extreme and variable environments. Subsurface environments (such as hydrocarbon-bearing reservoirs—e.g., oil and/or gas fields) are an example of such environments where predictive and controllable release patterns are not believed to be achievable with such core-shell particles relying upon an outside-in release mechanism.

The present disclosure provides triggered release compositions and systems that can be used in a variety of environments and under a variety of conditions. The flexibility of use imparted by the disclosed compositions and systems arises in part from the triggered release mechanism that alters the carrier at an interior interface rather than an exterior interface. The presently disclosed compositions utilize an "inside-out" degradation mechanism. Specifically, a carried material is not only released upon degradation or other physical or chemical change of the outer material, but a carried material itself causes the change to the outer material.

In some embodiments, a delivery and release system comprises a carrier element that forms an outer shell. The system further comprises an inner core that is defined by the shell. The outer shell substantially or completely surrounds the inner shell. The core is characterized as being fluidly separated from an environment that is external to the carrier element (i.e., outside of the shell). The system also includes at least one material that is positioned within the core. The system can include an agent within the core that is adapted to react with the carrier element in a manner that changes the outer shell so as to cause the core to be in fluid communication with the external environment. The system can be designed such that the agent only reacts with the shell when the system encounters specified external environmental conditions. In various embodiments, reactions may occur at one or more subterranean reservoir environmental conditions. The carrier element may be defined as being a particle, and the shell may be considered to be a particle wall. The carrier element may be described as encapsulating or surrounding one or more materials within the core formed by the shell or wall(s). The particles may vary in size and may be defined as microcapsules/microparticles or nanocapsules/nanoparticles. The particles may have an average size (e.g., diameter) of about 20 nm to about 5 mm, about 30 nm to about 1 mm, about 40 nm to about 500 µm, or about 50 nm to about 5 µm.

The system can be adapted to undergo specific changes that result in the release of one or more materials from the core defined by the carrier element shell. Under one or more specified environmental conditions, particularly one or more subterranean reservoir environmental conditions, one or more materials present in the core can be adapted to undergo a change causing an action on the carrier element shell that changes a state or property of the carrier element shell. The change in the state or property of the carrier element shell facilitates at least partial release of a material from the core. Such change can be reversible or irreversible.

In some embodiments, the change to one or more materials within the core can be a change in its physical state. A material within the core may transition between states, such as through liquefying, vaporizing, melting, crystalizing, solidifying, or otherwise changing the mobility of components within the core. In some embodiments, the change to a material within the core can be a change in its chemical composition. For example, the material in the core may undergo a change in pH, may undergo degradation, or may undergo an equilibrium change in relation to or more materials that are reactive with one another. In some embodiments, the change to a material within the core can be a change in its conformation. For example, the material may increase or decrease in volume (i.e., swelling or shrinking). The types of changes also may overlap. For example, a state change from liquid to vapor may increase the volume of the material and thus may increase the internal pressure on the carrier element shell.

In some embodiments, the core includes at least one agent that is adapted to react with the carrier element. The reactive agent may be adapted to chemically react with the carrier element shell, such as to cause degradation of the shell. The reactive agent may be adapted to react physically with the carrier element shell, such as to exert pressure upon the shell, disrupt or increase ionic interactions, or affect crystallinity. As such, the reactive agent should not be construed as being limited to only a direct chemical reaction with the carrier element shell.

The core can include at least one material adapted for release from the carrier material. The releasable material can be adapted to exit the core when the shell is sufficiently changed so as to cause the core to be in fluid communication with the external environment, such as degradation of the shell. The releasable material may also be the reactive agent. The releasable material may be independent of the reactive agent. Exemplary, non-limiting releasable materials include sensors, probes, markers, tracers, reporters, contrast agents, materials reactive or interactive with the surrounding environment, and the like. Non-limiting examples of releasable materials include wettability modifiers, breakers, anti-scale agents, surfactants, catalysts, fracture agents, and blocking agents. Quantum dots are a non-limiting example of a sensor that may be used. In some embodiments, for example, the inside-out degradation of the carrier element shell can be beneficial for forming core-shell particles adapted to release nano-sensors into a hydrocarbon reservoir (or other environment) at a defined time.

A material present in the core that is adapted to undergo a change when the system is subject to the specified environmental condition can also be the reactive agent and/or the releasable material. In some embodiments, the change material within the core can be present in addition to a separate reactive agent and/or a separate releasable. The change material may be adapted to substantially prevent the reactive agent from reacting with the carrier element shell when not subject to the specified environmental conditions.

The change(s) to the core material(s) cause the reactive agent to act directly upon the carrier element shell from within the carrier element. The action of the reactive agent upon the carrier element shell changes the shell in a manner that allows a material to be released from the core of the carrier element. For example, in the core-shell model, a phase change to a change material in the core can cause the reactive agent to degrade the carrier element shell. In some embodiments, the reactive agent may be considered to act upon the wall(s) of the carrier element.

The presently disclosed systems can be defined in relation to ability of the carrier element shell to remain largely unaffected by the surrounding environment and rather exclusively respond to activated chemistries or other characteristics arising from the change(s) to one or more materials within the core. The carrier element shell thus can be defined in relation to its ability to transmit environmental signals or triggers to the core and the one or more materials contained therein. Non-limiting examples of environmental signals or triggers that change the properties of the material(s) inside the carrier element include pH, temperature, pressure, salinity, shear, water content, oil content, and the like.

As non-limiting examples, core-shell particles according to embodiments of the present disclosure may be configured to be substantially stable at about room temperature and pressure, and the particles may be configured to undergo a change as described herein when subjected to a temperature of at least about 35° C., at least about 40° C., at least about 50° C., about 40° C. to about 250° C., or about 50° C. to about 200° C., and/or when subjected to a pressure of at least about 100 psi, at least about 500 psi, at least about 1,000 psi, about 100 psi to about 25,000 psi, or about 1,000 psi to about 20,000 psi. As further examples, core-shell particles according to embodiments of the present disclosure may be configured to be substantially stable at a first pH but be configured to undergo a change as described herein when subjected to a pH change (increase or decrease) of at least about 1, at least about 2, at least about 4, about 1 to about 12, or about 2 to about 10. As further examples, core-shell particles according to embodiments of the present disclosure may be configured to be substantially stable when subjected to relatively low shear conditions but be configured to undergo a change as described herein when subject to increased shear conditions, such as being subjected to a shear of at least 1,000 $s^{-1}$, at least 5,000 $s^{-1}$, at least 10,000 $s^{-1}$, about 1,000 $s^{-1}$ to about 12,000 $s^{-1}$, or about 2,000 $s^{-1}$ to about 10,000 $s^{-1}$. As further examples, core-shell particles according to embodiments of the present disclosure may be configured to be substantially stable when subjected to relatively low salinity conditions but be configured to undergo a change as described herein when subject to increased salinity conditions, such as being subjected to salinity conditions of at least about 1,000 ppm total salt content, at least about 10,000 ppm total salt concentration, at least about 50,000 ppm total salt concentration, about 1,000 ppm to about 300,000 ppm total salt content, or about 2,000 ppm to about 100,000 ppm total salt content. The core-shell particles may be configured to undergo a change as described herein when subject to one or more of the foregoing conditions in any combination.

The presently disclosed systems can be particularly defined by the ability to utilize the interface between the reactive agent and the carrier element shell to afford kinetic control of the release of one or more materials from the carrier element shell. The kinetics can be customized by controlling factors, such as core material chemistry, shell chemistry, concentrations of components, and shell thickness. The change to materials with in the core that allows the release of a material therefrom may be gradual or may be relatively rapid. For example, the reactive chemistry within the core may be triggered by the surrounding environment, but the nature of the reactive chemistry and/or the carrier element may require 10 minutes or more, about 1 hour or more, about 12 hours or more, about 1 day or more, or about one week or more to sufficiently change the carrier element shell so as to allow release of the material therefrom. In some embodiments, the release may be substantially immediate upon contact of the particles with the release environment—e.g., less than 10 minutes, about 5 minutes or less, or about 1 minute or less. Generally, a plurality of particles may be utilized in a single application. In such embodiments, the time to release may be defined by the time required for greater than 50% of the particles by mass to have the carrier element shell sufficiently changed to effect release of the core material to the external environment.

The presently disclosed systems can be utilized in environments exhibiting harsh conditions, such as conditions typically found in subterranean reservoirs. For example, the presently disclosed systems can be utilized in temperatures up to about 250° C., pressures up to about 30,000 psi, and salinities up to about 400,000 ppm NaCl. Some embodiments of the present systems thus are suitable for oil and/or gas applications that require particle stability in harsh subterranean reservoir environments that contain high temperatures (e.g., about 75° C. to about 200° C.), high pressure (e.g., about 1000 psi to about 25,000 psi), and high salinity (e.g., about 50,000 ppm to about 300,000 ppm NaCl).

Some embodiments of the present systems exhibit excellent stability that make them useful in applications where it can take extended periods of time for the delivery and release particles to be positioned into one or more points of use. For example, with respect to an oil and/or gas recovery application, it may be necessary for particles to remain stable for long periods within the subterranean reservoir (e.g., hours, days, or weeks) to enable the migration of the particles into geological features surrounding the area (e.g., a wellbore) where material delivery (e.g., nano-sensors) is desired. Some embodiments of the present systems thus are suitable in applications where long-term triggered release requires a shell that is substantially or completely impervious to harsh environments.

In some embodiments, the delivery and release systems of the present disclosure may be characterized as providing for a burst release. In other words, the inside-out release mechanism may be adapted to degrade or otherwise change the shell of the carrier element sufficiently to effect a substantially complete release of a releasable material from the core of the carrier element. In a non-limiting example, a core-shell particle system as described herein may be utilized to improve interpretation of reservoir data, such as in enhanced oil recovery methods. In such methods, the core-shell particles can be pumped down-hole (i.e., into the subterranean reservoir). In the reservoir, the particles begin to degrade and can reach substantially complete degradation (i.e., burst release) after a given time (e.g., minutes, hours, or weeks after being subjected to the release environment). The location of the release can be identified and used for information about the subsurface structure, flow patterns within the reservoir, the physical nature of the environment, the chemical nature of the environment, or the like.

In some embodiments, the core may include a phase change material ("PCM"). By way of example, a suitable PCM may be one that responds to an elevated temperature by transitioning from a crystalline solid phase to a liquid phase. At ambient temperature, the PCM may be solid and may be adapted to form a matrix that contains a reactive agent and substantially or completely separates the reactive agent from the carrier element shell when the PCM/reactive agent combination is present in the carrier element core. In such embodiments, liquefying the PCM in the core also mobilizes the reactive agent within the core, which then degrades the shell from the inside (i.e., the interface between the core and the shell) to the outside (i.e., the interface between the shell and the surrounding environment). In a non-limiting example, a useful PCM that may be present in the core formed by a carrier element shell is stearic acid. Stearic acid liquefies at 70° C. Thus, in such embodiments, stearic acid is a useful PCM in the core of a carrier element to release a reactive agent within the core when the carrier element encounters an environment with a temperature of 70° C. or greater. Similar PCMs may be identified for use based upon the nature of the environment where the particles of the present system may be used. Polymers that exhibit a glass transition temperature and/or a melt temperature may be useful as PCMs according to the present disclosure.

The specific reactive agent used within the core of the carrier element can vary based upon the reactivity with the shell material and the ability of the reactive agent to be shielded against reaction with the shell until the appropriate environmental conditions are provided. In a non-limiting example, a useful reactive agent is 2-mercaptoethanol ("2-ME"). A useful shell-forming material for the carrier element is, for example, an epoxy polymer containing disulfide crosslinks. In this exemplary embodiment, a carrier element shell formed of the epoxy polymer encapsulates the core containing the 2-mercaptoethanol confined within a matrix formed by the crystalline stearic acid. A sensor, such as quantum dots, may be present in the core as the releasable material. The thus formed particles in this exemplary embodiment may be positioned into an environment having a temperature greater than 70° C. When encountering this environment, the stearic acid liquefies and, in turn, the 2-mercaptoethanol is mobilized from the stearic acid PCM matrix and reacts with disulfide chemical groups within the shell. This subsequently degrades the shell and releases the sensors.

In a non-limiting example, the carrier element shell may comprise a polymer that includes disulfide bonds, and a reactive agent present in the core may be a material that includes a thiol group. Exemplary thiols include glutathione, 2-mercaptoethanol, and dithiothreitol.

In a non-limiting example, the carrier element shell may comprise a polymer that is adapted to degrade in the presence of specific, reactive radicals, and a reactive agent present in the core may be a material that is adapted to form the specific, reactive radicals upon encountering a defined environmental condition, such as a high temperature environment. In such embodiments, upon exposure to the high temperature, the radicals generated within the core degrade the shell material. Exemplary materials that form reactive radicals at high temperature include ammonium persulfate, azo compounds, and peroxides.

In a non-limiting example, the carrier element shell may comprise a polymer that includes acetals or carbonate esters. The reactive agent present in the core may include an acid (or base, depending upon the exact nature of the polymer shell) that causes acidic or basic hydrolysis of the polymer shell. For example, ketal crosslinking groups may be used as acid-degradable chemical crosslinkers within durable polymer backbones, such as polyurethanes and polyureas. Cross-linked (i.e., epoxy) carrier elements are particularly useful to maintain the integrity of the shell, particularly during high shear delivery methods, such as pumping down a well, and in harsh environments. In other examples, the phase change material may include hydrogen ions that are adapted to disassociate and allow the core material to function as the reactive agent. Exemplary materials include fatty acids.

In a non-limiting example, the carrier element shell may comprise a polymer that includes chemical groups with affinity to specific enzymes. Thus, the core of the carrier element may include the specific enzyme that acts on the chemical groups in the polymer shell to cause degradation thereof.

A delivery and release system according to embodiments of the present disclosure is shown in FIG. 1. As seen therein, a core-shell particle 100 (also referred to herein as a "carrier element") is formed of a carrier element shell 120 and a carrier element core 125. Inside the core 125 is a PCM 130 that may be in the form of a crystalline matrix. Inside the PCM 130 matrix is a reactive agent 140 that is released when the PCM changes to liquid form. Also inside the core is a carried material 150 that can be released upon degradation of the shell 120 through reaction with the reactive agent 140. In a non-limiting example, the carried material 150 may be a sensor; however, the carried material may be any like material as otherwise described herein.

The carrier element shell 120 may be further designed to provide desired characteristics useful in specific applications. For example, crosslinking of shell walls can be useful to improve the integrity and stability of the carrier element shell 120. This may include improving resistance to changes in size and shape of the particles due to external forces encountered when moving from one external environment (the environment external to the core-shell particle 100) to another, different environment. Higher concentrations of degradable crosslinks may be included in the shell polymer to create faster release, and this can be useful, for example, to provide for near immediate content delivery at the desired location.

In embodiments, the carrier element shell 120 can be adapted to undergo a reversible change such that the content of the core 125 may be partially released in one location and further released in a different location. In a non-limiting example, the carrier element shell 120 may include reversible bonds that are adapted for converting between monomeric, oligomeric, and/or polymeric states. In this manner, degradation of the polymer shell material can be reversible. Moreover, the reversible degradation can be adapted to respond to one or both of external and internal stimuli.

A non-limiting example of a reversible system according to embodiments of the present disclosure is a carrier element shell formed of an epoxy polymer containing disulfide crosslinks and defining a core that includes glyceryl trimyristate as a PCM, 2-mercaptoethanol as a reactive agent, and quantum dots as sensors. In use, such a reversible system can be used in an environment where fluid circulation causes the particles to encounter environments of a different chemical nature.

In some embodiments, after being subjected to the desired environment having a temperature of greater than about 57° C., the crystalline matrix of glyceryl trimyristate liquefies and mobilizes the 2-mercaptoethanol for reaction with the disulfide chemical groups of the shell. The disulfide group is cleaved to form two thiol moieties that create a pore in the shell. This pore allows for fluid communication of the core with the external environment and release of the carried material (e.g., quantum dots). After further circulation, the core-shell particle can encounter an environment that includes an oxidizing agent, which reacts with the shell to reform the disulfide crosslink. The particles may be later recovered from the external environment or otherwise examined. The absence of quantum dots in the particles indicates the presence of oxidizing agents in the environment. The particles can also be quantified to determine the amount of quantum dots remaining in their respective cores.

As can be seen from the foregoing, a variety of chemistries can be utilized in forming a system according to embodiments of the present disclosure. Thus, multiple different materials used to form the shell of a carrier element and multiple different materials used as a reactive agent within the core of the carrier element can be combined. Further, as needed, multiple different materials may be used to prevent reaction of the reactive agent with the carrier element shell until the desired conditions are met. In other words, various chemistries may be provided within the core of the shell that respond to reactive chemistries in the material(s) forming the carrier element shell.

Various methods can be used for combining the shell of the carrier element and the core of the carrier element. In a non-limiting example, the shell of the carrier element can be chemically conjugated to the core of the carrier element. During chemical conjugation, the core can serve as a template for directing the placement and chemical conjugation of the shell. For example, the core of the carrier element can be modified with functional groups that enable chemical or physical tethering of the shell to the core material. For example, the surfactant associated with the core can serve as the source of functional chemical groups. Surfactants containing reactive groups (such as amines, alcohols, and carboxylic acids) can serve both as a stabilizing agent for the core and as functional chemical groups for the chemical conjugate of the shell to the core material. For example, surfactants with amine groups that can be utilized for anchoring shells to core materials include laurel amine or cetrimonium bromide, nonionic triblock copolymers of poly (propylene oxide) and poly (ethylene oxide) (e.g., Pluronic®) end functionalized with amine, synthetic ether amine (Tomamine®—available from Air Products and Chemicals, Inc.), or fatty amines.

In a non-limiting example, layer-by-layer ("LBL") deposition can be used to modify core material surfaces with chemical functional groups through simple adsorption of charged polymers. Multiple different polymers can be deposited upon the core using LBL deposition. In a non-limiting example, a polyelectrolyte containing an amine, such as poly(allylamine hydrochloride), can be used to modify the core. Alternatively, the material comprising the core may contain functional groups that enable the chemical conjugation of the shell material onto the core material.

The shell of the carrier element can be chemically conjugated to the core material of the carrier element using surface initiated polymerization ("SIP"). In a non-limiting example, atom transfer radical polymerization ("ATRP") is used as a SIP method to graft the shell onto the core. A halogenated initiator can be secured on the surface of the core material. Subsequently, immersion of this modified core material into a solution containing a metallic complex, monomer, and a free sacrificial initiator enables the formation of the shell upon the core material. In a non-limiting example, reversible addition-fragmentation chain transfer ("RAFT") can be used as a SIP method to graft the shell onto the core material. In an approach, a free radical initiator, such as azobisisobutyronitrile, can be secured to the surface of the core material. Monomers can be chosen from a variety of vinyl compounds including poly(N-isopropylacrylamide) ("PNIPAAm"), poly(N,N-dimethylaminoethyl methacrylate), 2-vinylpyridine, and 4-vinylpyridine.

In a non-limiting example, radical chain polymerization can be used to graft the shell onto the core material. A core comprising stearic acid can be stabilized by a surfactant comprising amine-modified Pluronic® 68. A photoinitiator (e.g., eosin isothiocyanate) can be added to the core resulting in chemical conjugation with the amine-modified Pluronic® 68. The chemically conjugated core and photoinitiator can be immersed into an acrylate solution and irradiated with a visible light source resulting in the polymerization of the vinyl monomers onto the core material. Monomers can be chosen from a variety of vinyl compounds including epoxy acrylate, urethane acrylate, allyl disulfide, acrylates, and methacrylates.

The shell of the carrier element can be chemically conjugated to the core material of the carrier element using interfacial polymerization wherein polymerization ensues at an interfacial boundary created from monomers dissolved in two immiscible solvents. The encounter of immiscible monomers at the interface will rapidly generate a cross-linked polymeric shell that confines the core material within the polymer shell.

Useful PCMs may be adapted to transition between solid and liquid states or between liquid and vapor states under specified conditions. For example, the PCM may be adapted to be a solid up to a temperature of about 30° C., about 40° C., about 50° C., about 60° C., or about 70° C. and is a liquid at greater temperatures. For example, forms of paraffin wax have melting points ranging from 50-80° C., glyceryl trimyristate has a melting point of 56° C., polyethylene glycol ("PEG") 2000 and 4000 have a melting point of 56° C., beeswax has a melting point of 61-65° C., stearic acid has a melting point of 69° C., and cholesterol has a melting point of 148° C. Useful exemplary PCMs are stable up to relatively high temperatures, such as may be encountered in hydrocarbon-bearing reservoirs, or the like. For example, a PCM may remain stable up to a temperature of about 125° C. or greater, about 150° C. or greater, or about 175° C. or greater. The PCM can be adapted to substantially isolate the reactive agent from reacting with the carrier element until the specified external environmental conditions are encountered. Non-limiting examples of PCMs that may be used in embodiments of the present systems include unsaturated fatty acids (e.g., myristoleic acid, palmitoleic acid, sapienic acid, oleic acid, elaidic acid, vaccenic acid, linoleic acid, linoelaidic acid, α-linolenic acid, arachidonic acid, eicosa-pentaenoic acid, and erncic acid), saturated fatty acids (e.g., caprylic acid, capric acid, lauric acid, myristic acid, palmitic acid, stearic acid, arachidic acid, arachidic acid, behenic acid, lignoceric acid, and cerotic acid), triglycerides (e.g., glyceryl trimyristate), and waxes (e.g., bees wax, lanolin, carnauba wax, candelilla wax, and paraffin wax). Non-limiting examples of materials useful in a carrier element shell include epoxy, polyurethanes, polyureas, vinyl esters, polyesters, and acrylates.

In some embodiments, a solid lipid nanoparticle ("SLN") may be used according to embodiments of the present disclosure. A SLN may be prepared, for example, using a hot homogenization technique where the lipid is heated above its melting point and emulsified in a hot aqueous surfactant solution of identical temperature (i.e., "pre-emulsion"). The pre-emulsion is cycled through the high pressure homogenizer and subsequently cooled to room temperature and recrystallized, resulting in the SLN. In exemplary embodiments, ingredients for homogenization can include approximately 5 to 10% by weight lipids, approximately 2 to 5% by weight emulsifiers, and the balance water. In another example, SLNs may be prepared using a microemulsion technique where the lipid is heated above its melting point and mixed with water and surfactant. When mixed in a correct ratio, the solution is thermodynamically stable and transparent. The transparent solution may be subsequently added to a cold aqueous solution. In exemplary embodiments, ingredients for microemulsion can include 5 to 10% by weight lipids, approximately 2 to 5% by weight emulsifiers, and the balance water. In other examples, SLNs can be prepared by cold homogenization, solvent evaporation, solvent emulsification-diffusion, spray drying, double emulsion, precipitation, film-ultrasound dispersion, high-speed homogenization followed by ultrasonication, and supercritical fluid based methods.

Embodiments of the present disclosure relate to delivering and releasing a material in a specified environment (i.e., the previously noted "external environment"), for example, a hydrocarbon-bearing reservoir. In some embodiments, the environment may be a water well or aquifer. In some embodiments, the environment may be any environment with a circulating medium adapted to move particles as described herein from a first point in the environment to at least a second, different point in the system. The first point may be a point of entry or delivery of the particles in to the environment. The second point may be a point in the environment wherein the conditions are sufficiently different from the conditions of the first point so as to cause a change to the core of the particles. The change in the core may then cause a change in the shell that allows release of a material from the core.

Embodiments of present disclosure include methods that comprise providing particles as described herein. The particles, for example, can comprise: a carrier element forming an outer shell; an inner core defined by the shell, the inner core being fluidly separated from an environment external to the carrier element; the material for release positioned within the core; and a reactive agent within the core, the reactive agent being adapted to react with the carrier element under specified external environmental conditions and change the outer shell so as to cause the core to be in fluid communication with the external environment. Embodiments of the present disclosure may comprise delivering the particles to the environment such that the particles encounter the specified environmental conditions, the reactive agent causes the change to the outer shell, and at least a portion of the material for release moves from the core to the external environment.

In some embodiments, systems and methods according to the present disclosure may be useful in relation to hydrocarbon-bearing reservoirs. For example, the present systems and methods can be adapted for use with a variety of technologies useful for exploration, development, and/or production of hydrocarbons from reservoirs. Enhanced oil recovery technologies and the like are non-limiting examples of technologies that can benefit from the present systems and methods. Because of the harshness of the conditions that are typical in hydrocarbon-bearing reservoirs, the present delivery and release systems are particularly beneficial in that they are adapted to provide intact delivery of a material to environments, even under such harsh conditions. Embodiments of the present systems thus can be useful in a wide variety of instances where delivery of a material in a hydrocarbon-bearing reservoir may be beneficial to evaluate a condition of the reservoir, identify a property of the reservoir, improve removal of a hydrocarbon from the reservoir, or the like.

Figure 2:
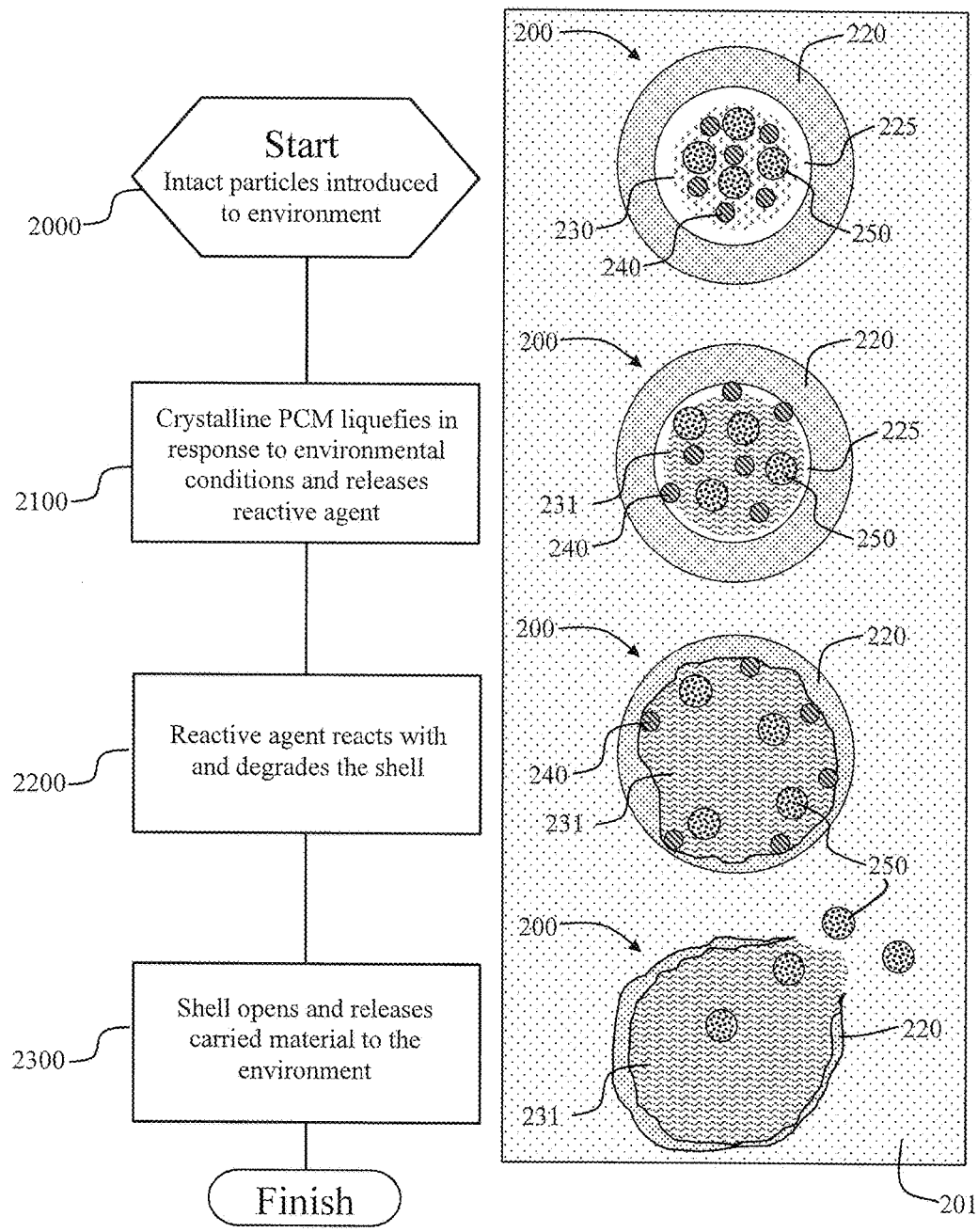
FIG. 2 shows a release mechanism according to embodiments of the present disclosure wherein a shell degrades from the inside out via reaction with a reactive agent provided in the core of the shell.

A non-limiting, exemplary embodiment of a system and method for delivering and releasing a material in a specified environment is illustrated in FIG. 2, which illustrates the delivery and release of a material into an external environment 201, which may be a hydrocarbon-bearing reservoir. As such, the exemplified system and method may relate to enhanced oil recovery from the hydrocarbon-bearing reservoir.

At operation 2000 in FIG. 2, one or more particles 200 in an intact state are introduced into the environment 201 (e.g., a hydrocarbon-bearing reservoir). The one or more particles 200 may be similarly configured as particle 100 in FIG. 1. In the exemplified embodiment, a particle 200 comprises a carrier element shell 220 and a carrier element core 225. Inside the core 225 is a PCM 230, which may be in the form of a crystalline matrix. Inside the PCM 230 matrix is a reactive agent 240 that is released when the PCM 230 changes to liquid form. Also inside the core 225 is a carried material 250 that will ultimately be released upon degradation of the shell 220 through reaction with the reactive agent 240.

At operation 2100, the conditions of the environment 201 (e.g., when the particles 200 travel to a second location within the external environment 201 and/or after a period of time since insertion of the particles 200 into the external environment 201) are such that the crystalline PCM 230 liquefies to become a liquefied PCM 231. The reactive agent 240 becomes mobilized in the liquefied PCM 231 so as to make reactive contact with the carrier element shell 220. At operation 2200, the reactive agent 240 further reacts with the carrier element shell 220. The reaction proceeds at the interior surface or interior layer of the carrier element shell 220 such that the shell essentially is degraded from the inside out. At operation 2300, the carrier element shell 220 is sufficiently degraded through reaction with the reactive agent 240 that the shell opens or otherwise allows the interior components of the particles 200 to be in fluid communication with the environment 201. In FIG. 2, at operation 2300, the carrier element shell 220 is significantly thinned through reaction with the reactive agent 240, and the shell has broken open to allow the carried material 250 to escape and thus be delivered to the surrounding environment 201.

Figure 3:
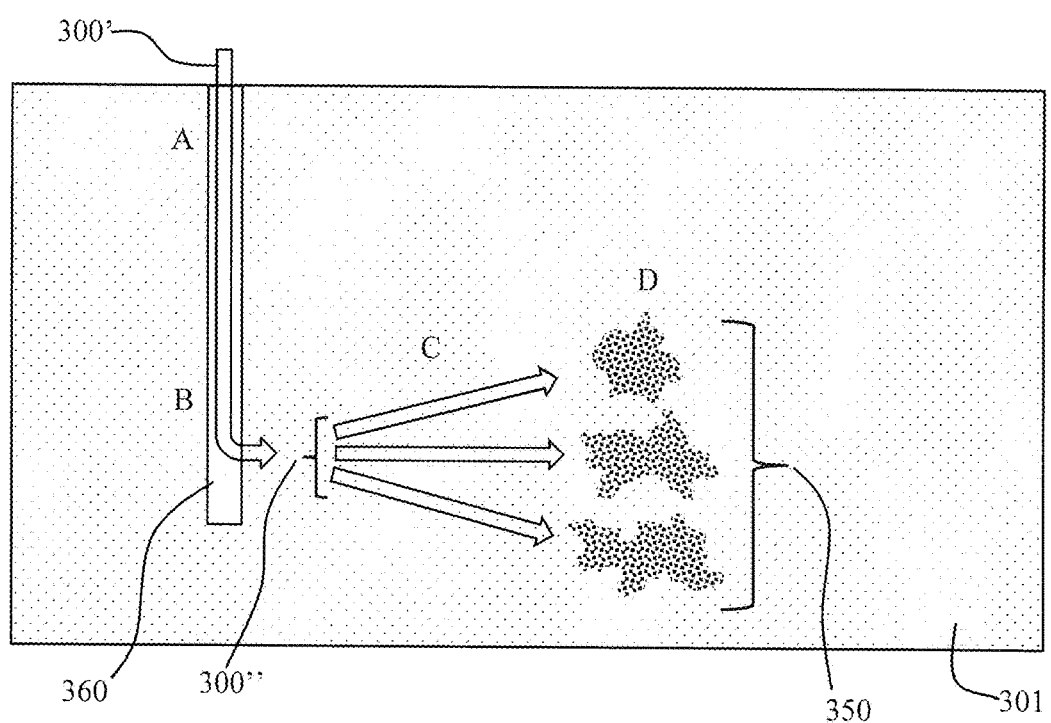
FIG. 3 schematically shows a release mechanism according to embodiments of the present disclosure wherein a delivery and release system as described herein is provided to a hydrocarbon-bearing reservoir to allow for release of a carried material within the reservoir.

Embodiments of the present disclosure are further illustrated in relation to FIG. 3, which shows a representation of a hydrocarbon-bearing reservoir 301 having a wellbore 360 therein. It is understood that any opening providing access to the reservoir 301 may be used. In FIG. 3, a delivery and release system material 300' in any form (e.g., particles) as described herein (e.g., particles 100 and 200) is inserted to the reservoir 301 (e.g., via a wellbore 360). The particles, for example, may be pumped down the wellbore 360 through conventional pumping equipment, such as may be used with an oil and/or gas well or the like. The delivery and release system material 300' is delivered to the reservoir 301 initially in a stable or non-releasing state. After delivery to the reservoir 301, the modified delivery and release system material 300" begins undergoing internal changes, alterations, or modifications (thus becoming the modified delivery and release system material 300") whereby a carried material will be released. In other words, the conditions of the reservoir are sufficiently different from the conditions outside of the reservoir such that the delivery and release system material 300" has undergone modifications whereby, for example, a particle shell is degraded or otherwise altered/modified by one or more materials internal to the particle shell so that the shell releases a carried material 350 from therein (similar to the carried material 150, 250 previously described with respect to FIGS. 1 and 2).

In some embodiments of the present disclosure, the system and process illustrated in FIG. 3 can take place over a time period that may be controlled based upon the materials used in preparing the delivery and release system. As such, the delivery and release system material 300' can be designed to provide an engineered time release that is matched to the external environment 301 wherein the material is placed. In FIG. 3, at time period A, the delivery and release system material 300' is initially delivered to the reservoir 301 (e.g., through the wellbore 360) and has not yet encountered conditions that cause the inside-out release mechanism to begin. At time point B, the delivery and release system material 300' begins entering the reservoir 301 (e.g., from the wellbore 360), and the conditions at this point may be such that the delivery and release system material 300' may begin undergoing modification. At time point C, the conditions of the reservoir 301 have caused the delivery and release material to be in the modified form (300") such that the material is undergoing changes that will cause release of the carried material 350. At time point D, the modified delivery and release material 300" has undergone the inside-out release of the carried material 350 that may then further disperse or otherwise move within the reservoir 301. The duration of each time period and/or the time between respective periods may be customized through custom formation of the delivery and release system material 300' as already discussed herein.

Embodiments of the present disclosure are further illustrated by the following examples, which are set forth to illustrate the presently disclosed subject matter and are not to be construed as limiting. The examples describe testing carried out to confirm the ability of embodiments of the present systems (e.g., see FIGS. 1 and 2) to deliver and release one or more materials under various conditions that exemplify various environments in which embodiments of the present systems may be utilized (e.g., see FIG. 3).

Example 1

Preparation of Solid Lipid Core Particles

An aqueous surfactant solution comprising 21 grams of cetyltrimethylammonium bromide ("CTAB") and 558 grams of distilled water was heated to 90° C. In a separate vessel, 21 grams of stearic acid was heated to 90° C. resulting in a complete melt of the lipid. To prepare an emulsion, the aqueous CTAB solution was slowly combined with the melted stearic acid while the entire solution was agitated using a laboratory mixer. The emulsion was permitted to mix at 700 rpm at 90° C. for 10 minutes.

Figure 4:
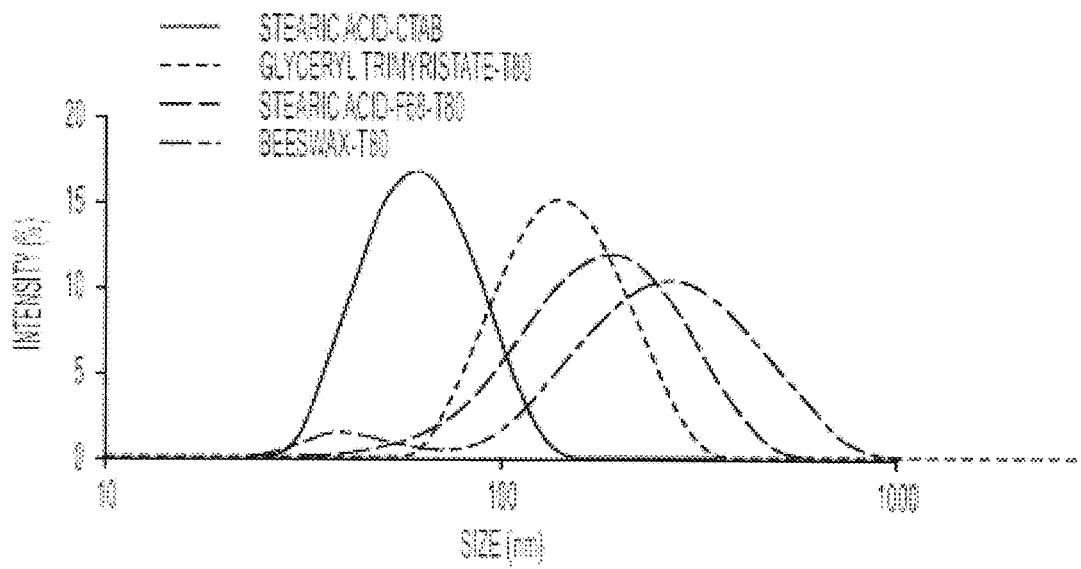
FIG. 4 is a graph showing size distributions of solid lipid core particles prepared with a variety of formulations according to embodiments of the present disclosure.

Subsequently, the emulsion was added to a high pressure homogenizer ("HPH") equipped with an external heating element. Passage through the HPH resulted in lipid nano-emulsions. The lipid nano-emulsions were subsequently cooled to room temperature and recrystallized, resulting in solid lipid core particles. The solid lipid core particles were characterized using dynamic light scattering, XRD, and differential scanning calorimetry. As shown in FIG. 4 and Table 1, solid lipid core particles were prepared using the above approach with a variety of lipids, including stearic acid, beeswax, and glyceryl trimyristate. FIG. 4 shows size distributions of the solid lipid core particles prepared with the various formulations. Table 1 shows the exemplary formulations including the average particle diameter, Zeta Potential, and Polydispersity Index ("PDI"). PDI values provide an indication of the particle size distribution, with values above about 0.7 indicating high polydispersity.

TABLE 1

| SLN Formulation | Diameter (nm) | Zeta Potential (mV) | PDI |
|---|---|---|---|
| 3.5% Stearic acid/3.5% CTAB | 59 | +46 | 0.084 |
| 1% Glyceryl Trimyristate/ 3.5% Tween ® 80 ("T80") | 133 | +34 | 0.345 |
| 3.5% Stearic acid/3.5% (F68/Tween ® 80) | 160 | −22 | 0.178 |
| 3.5% Beeswax/3.5% Tween ® 80 | 200 | −18 | 0.301 |

Figure 5:
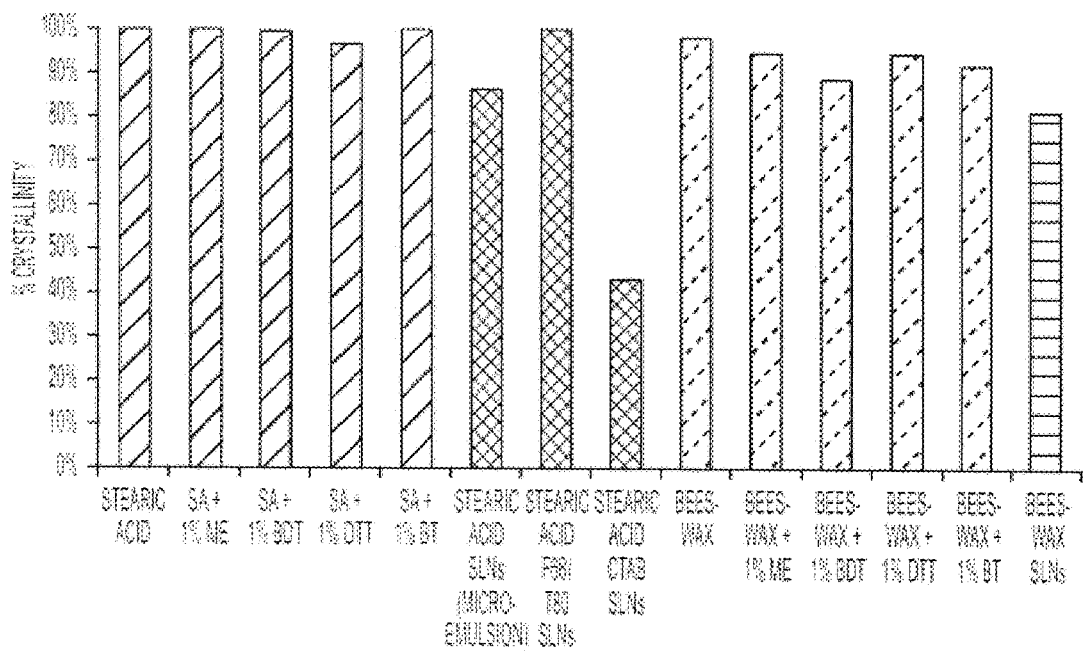
FIG. 5 is a graph showing the crystallinity of lipids (neat), lipids containing reducing agents, and solid lipid core particles according to embodiments of the present disclosure as acquired via Differential Scanning Calorimetry ("DSC")

To evaluate the crystallinity of the solid lipid core particles, the samples were lyophilized and subsequently evaluated using either DSC or XRD. FIG. 5 shows the percent crystallinities of various lipids (neat and with reducing agents) and the accompanying solid lipid core particles, as characterized with DSC. The processing conditions did not significantly affect the melting points or the crystallinity of the SLNs, with the exception of the stearic acid/CTAB SLNs, which showed slightly lowered crystallinity.

Example 2

Evaluating Surfactant Effect on Solid Lipid Core Particle Characteristics

Figure 6:
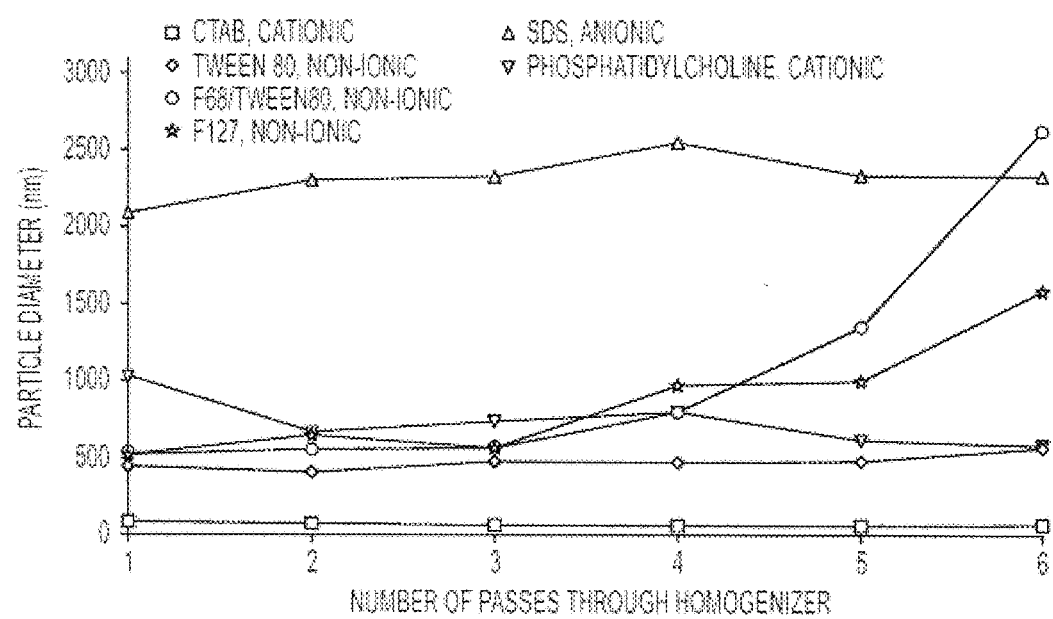
FIG. 6 is a graph showing particle diameter versus the number of passes through a high pressure homogenizer ("HPH") at 1,000 bar for solid lipid core particles according to embodiments of the present disclosure comprising 3.5 wt % stearic acid with a variety of surfactants.

Solid lipid core particles comprising 3.5 wt % stearic acid were prepared using differing surfactants via hot homogenization at a pressure of 1,000 bar. The types of evaluated surfactants were as follows: TWEEN® 80 (non-ionic); PLURONIC® F127 (non-ionic); PLURONIC® F68/TWEEN® 80 (non-ionic); CTAB (cationic); sodium dodecyl sulfate ("SDS") (anionic); and phosphatidylcholine (cationic). FIG. 6 shows the diameter of solid lipid core particles versus the number of passes through the homogenizer for the different formulations. As seen in FIG. 6, SLNs were prepared with a variety diameters, including diameters of less than 100 nm. The formulation of 3.5% Stearic Acid with CTAB, for example, provided particles with an average diameter of about 58 nm.

Example 3

Release of Reactive Chemistries from Lipid Materials

This example was performed to demonstrate the release of a reactive agent from the PCM in the core material in differing external environments. A reducing agent and lipid were combined within a glass test tube and subsequently co-melted by increasing the temperature to approximately 80° C. The reducing agent was added to the lipid at a concentration between 1 wt % and 10 wt %. The recrystallization of the lipid-reducing agent co-melt resulted in a crystalline structure comprising two components (i.e., a co-crystal), namely the reducing agent and the lipid. The co-crystal was combined with a standard American Petroleum Institute ("API") brine solution of 8 wt % NaCl and 2 wt % CaCl$_2$. Reducing agents were chosen from 2-mercaptoethanol ("2-ME"), 1-butane thiol ("BT"), dithioerythritol ("DTT"), and benzene-1,2 dithiol ("BDT"). Lipids were chosen from stearic acid, beeswax, paraffin wax, glyceryl trimyristate, cholesterol, and polyethylene glycol. The co-crystals within the brine were then heated to approximately 80° C. Samples of the resultant solution were taken over time and evaluated using inductively coupled plasma ("ICP") spectrometry.

Figure 7A:
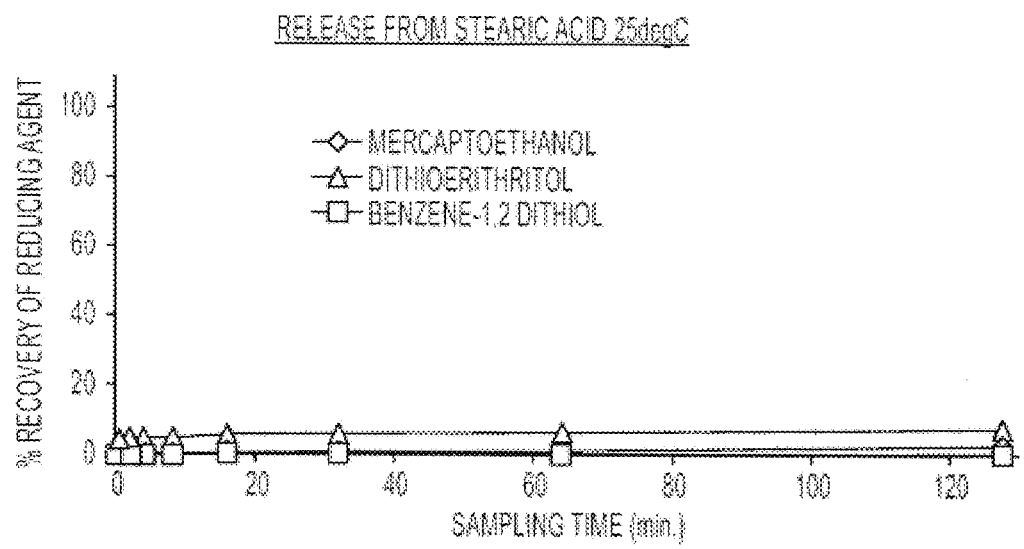
FIG. 7A provides a graph showing release of reducing agents from stearic acid at different times for samples according to embodiments of the present disclosure at 25° C.
Figure 7B:
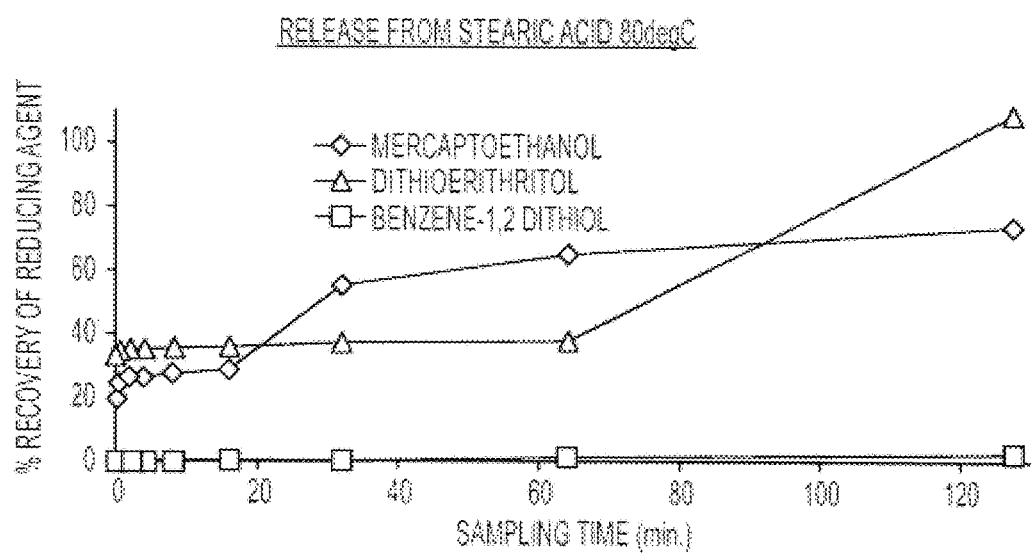
FIG. 7B provides a graph showing release of reducing agents from stearic acid at different times for samples according to embodiments of the present disclosure at 80° C.
Figure 8A:
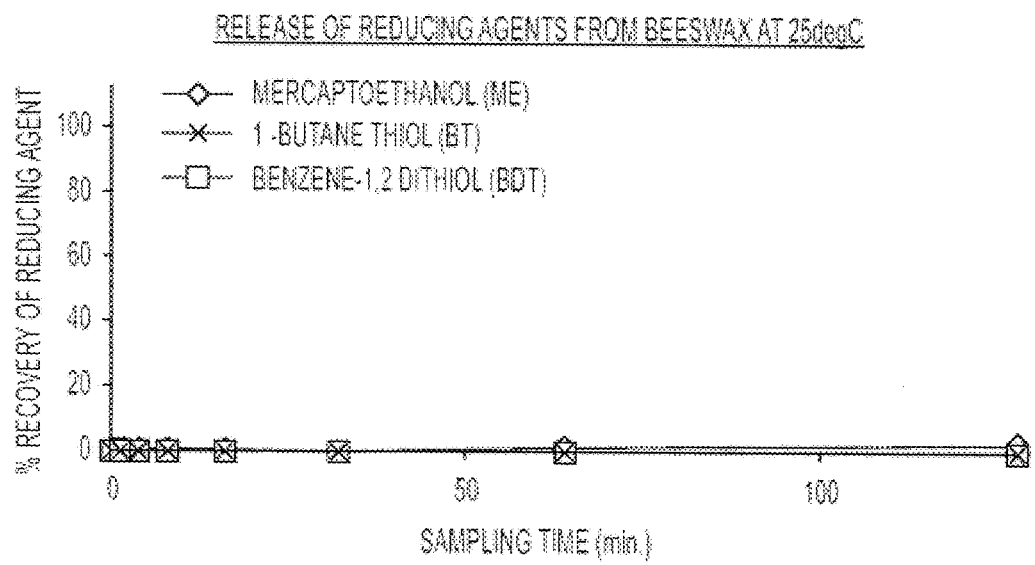
FIG. 8A provides a graph showing release of reducing agents from beeswax at different times for samples according to embodiments of the present disclosure at 25° C.
Figure 8B:
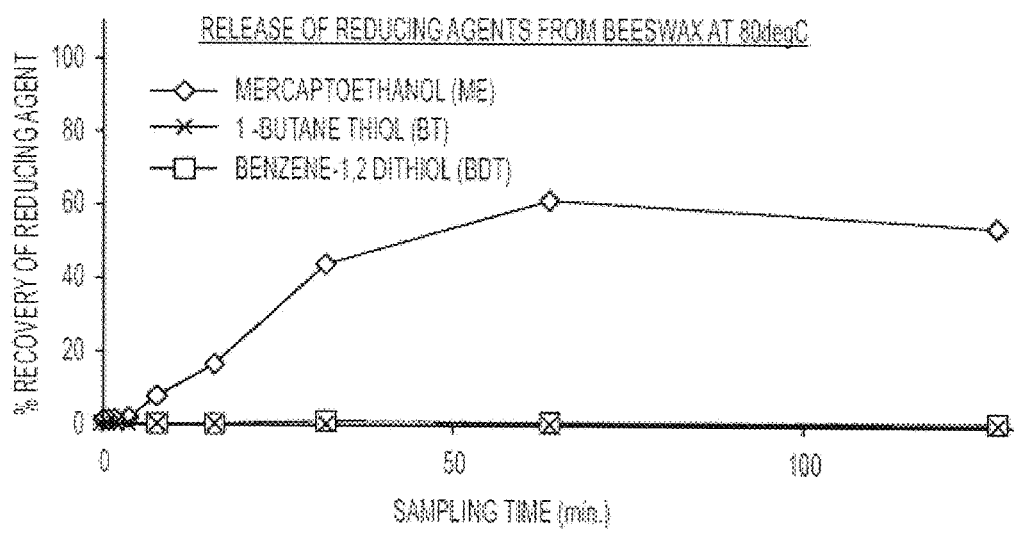
FIG. 8B provides a graph showing release of reducing agents from beeswax at different times for samples according to embodiments of the present disclosure at 80° C.

The results in FIG. 7A and FIG. 7B show the release profiles of reducing agents from stearic acid at 25° C. and 80° C., respectively. A higher temperature (i.e., 80° C.) facilitated the release of the hydrophilic compounds 2-mercaptoethanol ("2-ME") and dithioerythritol ("DTT") from stearic acid, but it did not enable release of the hydrophobic compound, benzene-1,2-dithiol ("BDT"). At a lower temperature (i.e., 25° C.), no reducing agents were released from stearic acid. In further tests, FIG. 8A and FIG. 8B show the release profiles of reducing agents from beeswax at 25° C. and 80° C. Following the same trend as stearic acid, increasing the temperature to 80° C. facilitated the release of the hydrophilic compounds (e.g., 2-ME), but it did not enable release of the hydrophobic compounds, BDT or 1-butane thiol ("BT"), from beeswax.

Example 4

Evaluation of Shell Stability in Simulated Hydrocarbon-Bearing Reservoir Environments This example was performed to demonstrate the formation of the shell material and exposure of the shell to differing external environments without the presence of reactive agents, and to show the stability of the shell material in conditions that are exemplary of an oil/gas reservoir. To prepare polymer shell material, monomers were thoroughly mixed at a stoichiometric ratio and poured into rectangular-shaped molds with dimensions of approximately 35 mm×13 mm×2-4 mm. The formulation was cured under an appropriate temperature prior to performing dynamic mechanical analysis (DMA). In a non-limiting example, 11.322 grams of EPON® 862 epoxy resin, 2.638 grams of AMICURE® PACM cycloaliphatic amine curing agent, and 1.010 grams of 4-aminophenyl disulfide ("4APDS") were mixed and subsequently cured at 80° C. for 60 minutes and 150° C. for 120 minutes. Other materials used included TACTIX® 742, TACTIX® 556, urethane, and EPON® resin 2.5 ("Su2.5"), which is a diglycidyl ether of bisphenol A. The various polymer formulations are shown in Table 2. DMA experiments were performed using the Q800 DMA (commercially available from TA Instruments), which has a load capacity of 18N and can reach temperatures as high as 600° C. The single cantilever mode of deformation was used to characterize the cured samples by way of clamping and bending.

TABLE 2

| Polymer | Ambient Conditions | | API Brine, 100° C., 6.5 hours | |
|---|---|---|---|---|
| | Tg (° C.) | Storage Modulus @35° C. (MPa) | Tg (° C.) | Storage Modulus @35° C. (MPa) |
| Epon ® 862 + AMICURE ® PACM | 139 | 1762 | 137 | 1573 |
| Epon ® 862/Su2.5 + AMICURE ® PACM | 159 | 1769 | 157 | 1643 |
| Epon ® 862/Tactix ® 742 + AMICURE ® PACM | 242 | 1867 | 239 | 1814 |
| Epon ® 862/Tactix ® 556 + AMICURE ® PACM | 142 | 1788 | 140 | 1811 |
| Urethane | 97 | 1714 | 97 | 1542 |
| Epon ® 862 + DDS | 185 | 2189 | 182 | 1910 |
| Epon ® 862 + 4APDS | 142 | 2059 | 140 | 2126 |

To evaluate the stability of the polymer shell material, DMA bars comprising differing epoxy formulations were exposed to harsh conditions (i.e., API brine at 100° C.) for 6.5 hours. These bars were characterized using DMA and compared to samples without exposure to the harsh conditions. As shown in Table 2, results showed that both the morphology and mechanical properties (e.g., Tg and modulus) of the DMA bars remained nearly identical before and after exposure to the harsh conditions.

Example 5

Incorporation of Degradable Crosslinks into Polymer Shell Material

Figure 9:
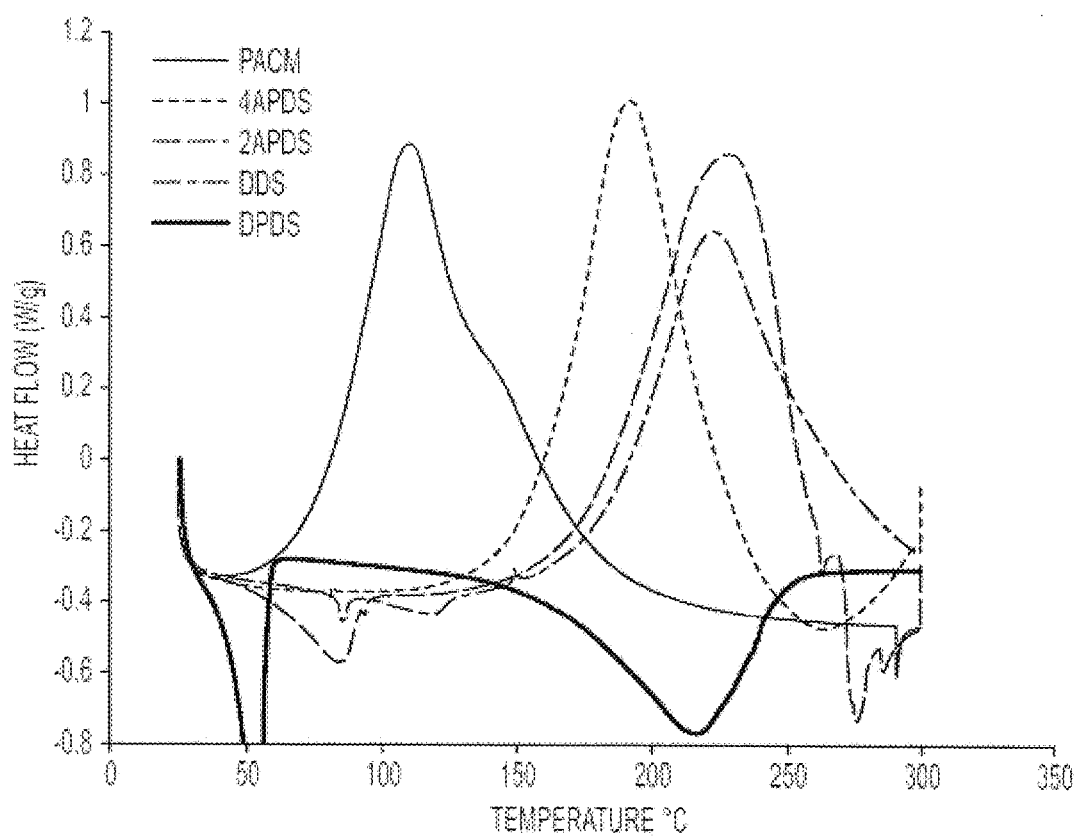
FIG. 9 is a graph showing DSC cure profiles of five different epoxy formulations according to embodiments of the present disclosure wherein each curve shows an epoxy formulation containing EPON® 862 epoxide monomer combined with a different curative agent: AMICURE® PACM curing agent, 4-aminophenyl disulfide ("4APDS"), 2-aminophenyl disulfide ("2APDS"), 4,4'-diaminodiphenylsulfone ("DDS"), and diphenyl disulfide ("DPDS")

This example was performed to illustrate the formation of shell material and degradation of the shell in response to a reactive agent in different external environments. Polymer shell materials were prepared that incorporated degradable, disulfide moieties into epoxy networks, which specifically degrade in response to thiol reactive chemistries. All epoxy formulations were combined at a 1:1 stoichiometric ratio of total amine to total epoxide groups. Two systems comprising different disulfide curatives, 2-aminophenyl disulfide ("2APDS") and 4-aminophenyl disulfide ("4APDS"), were prepared. FIG. 9 shows the cure profiles of five separate formulations, each containing EPON® 862 epoxide monomer with different amine curative agents. The curves in FIG. 9 show that an increase in temperature results in polymerization reactions (i.e., curing). The exothermic curves of 4APDS and 2APDS showed that disulfide-containing monomers were readily incorporated into the epoxy polymer, illustrating the capacity to include degradable crosslinks into polymer shell materials. As a negative control, EPON® 862 was combined with diphenyl disulfide ("DPDS"), which is a compound that contains a disulfide group, but does not have a primary amine. Without a primary amine, it was expected that the monomer would not support the polymerization reaction. The lack of an exothermic profile for the DPDS negative control indicated that the disulfide group was not involved in the epoxy polymerization reaction, suggesting that the disulfide remained unconjugated within the polymer.

Figure 10A:
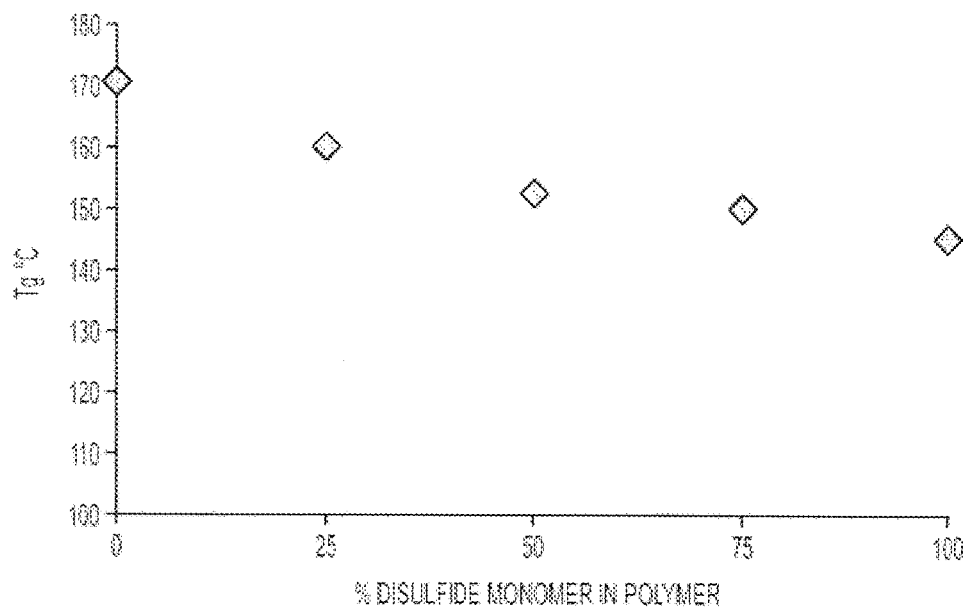
FIG. 10A is a graph showing dependence of glass transition temperature (Tg) on the percent disulfide in an epoxy polymer (averaged from three samples) according to embodiments of the present disclosure, as determined with dynamic mechanical analysis ("DMA"), wherein the epoxy polymer was prepared by combining the EPON® 862 epoxide monomer with a curative agent blend comprising DDS and 4APDS and were cured for 1 hour at 150° C. and 2 hours at 180° C.
Figure 10B:
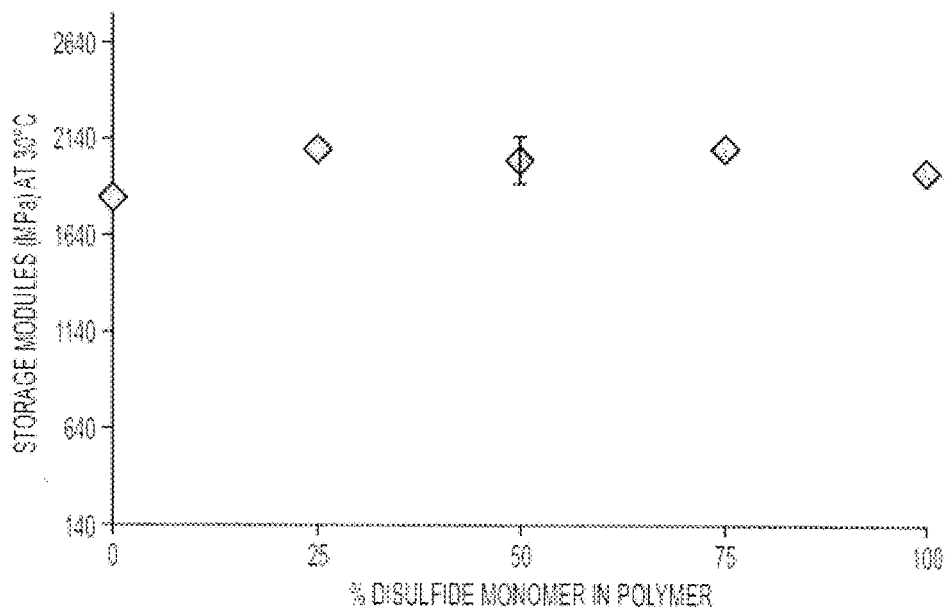
FIG. 10B is a graph showing dependence of storage modulus on the percent disulfide in an epoxy polymer (averaged from three samples) according to embodiments of the present disclosure, as determined with dynamic mechanical analysis ("DMA"), wherein the epoxy polymer was prepared by combining the EPON® 862 epoxide monomer with a curative agent blend comprising DDS and 4APDS and were cured for 1 hour at 150° C. and 2 hours at 180° C.

The amount of degradable disulfide crosslinker within the polymer shell material was tuned by combining the EPON® 862 epoxide monomer with curative agent blends. In a non-limiting example, the curative blend comprised DDS and 4APDS. FIG. 10A shows that the Tg slightly decreased for polymers with higher quantities of 4ADS; FIG. 10B shows that the storage modulus remained similar for all formulations. The slight decrease in Tg likely arose from enhanced flexibility of the disulfide-containing backbone; however, all formulations remained stable up to temperatures of about 140° C. In a test, 11.322 grams of EPON® 862, 2.638 grams of PACM, and 1.010 grams of 4APDS were mixed and subsequently cured at 80° C. for 60 minutes and 150° C. for 120 minutes. The negative control, diphenyl disulfide ("DPDS"), was combined at a 1:1 stoichiometric ratio of disulfide groups to epoxide groups. For the DSC experiments, the uncured sample was placed in a hermetic aluminum pan, and a hole was produced by piercing the lid with a pair of tweezers, permitting off-gassing of volatile components. The sample was weighed after piercing of the lid. The temperature was ramped from 25° C. to 300° C. at 10° C./min. DMA was performed as previously described.

Figure 11:
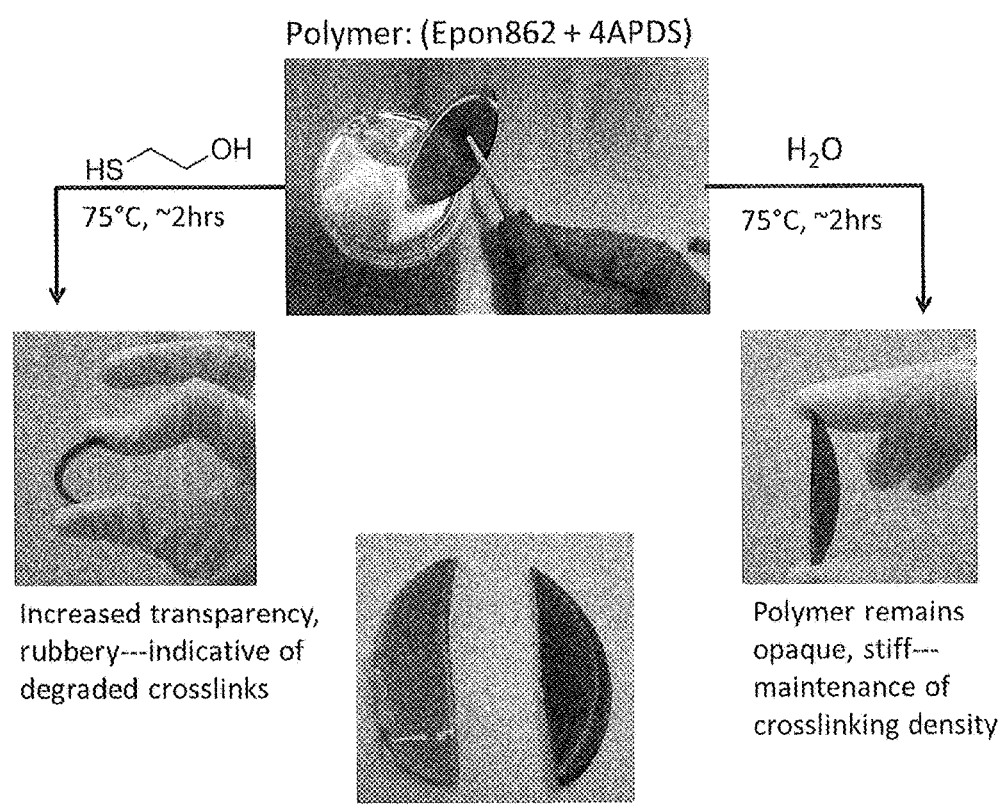
FIG. 11 illustrates the degradation of disulfide containing epoxy material according to embodiments of the present disclosure after exposure to a thiol compound.

Referring to FIG. 11, experiments were performed to demonstrate the degradation of the disulfide chemical groups within the epoxy polymer. A cured polymer comprising EPON® 862 and 4APDS was cut into two sections, with each individual section placed in either 100% 2-mercaptoethanol or 100% water. After approximately 2 hours at 75° C., the polymers showed drastically differing material properties. The polymer section exposed to thiol became rubbery, indicating lowered crosslinking density. The polymer section exposed to water remained stiff, indicating maintenance of crosslinking density. As a negative control, a polymer system without disulfide groups (e.g., EPON® 862+DDS, EPON® 862+PACM) remained stiff after exposure to 100% 2-mercaptoethanol for 6 hours at 80° C. (data not shown).

Example 6

Release of Sensing Elements from Thin Films

Figure 12:
FIG. 12 is a schematic of a bilayer film according to embodiments of the present disclosure immersed into a thiol solution.
Figure 13:
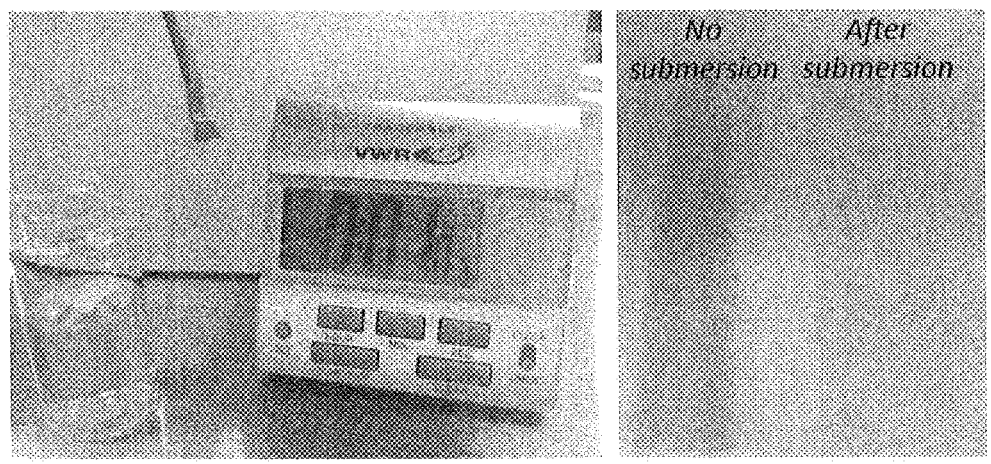
FIG. 13 provides images of thin films according to embodiments of the present disclosure before and after submersion in water.

This example was performed to demonstrate that a thin film system that mimics particles degrades when exposed to a reactive agent (e.g., thiol) and releases the carried material (e.g., the sensing element). Kinetic studies were performed to evaluate the release of sensing elements from thin films with degradable crosslinks. Referring to the schematic diagram illustrated in FIG. 12, bilayer films were prepared upon a polyethylene terephthalate ("PET") substrate (e.g., using a Meyer rod drawdown method). For a first film, a solution comprising polyethylene glycol diacrylate (molecular weight=600), isopropanol, DPT photoinitiator (a blend of diphenyl(2,4,6-trimethylbenzoyl)phosphine oxide and 2-hydroxy-2-methylpropiophenone), and rhodamine-B was cast upon a PET substrate and subsequently photo-cured for 15 seconds at ~100 mW/cm$^2$. For a second film, an epoxy resin was combined with methyl ethyl ketone cast atop the rhodamine B thin film and then thermally cured. The cured bilayer films were placed into a thiol solution and the solution was periodically assayed for release of rhodamine B from the thin films into the solution using a fluorimeter. A thin PEG film containing a sensing element (e.g., rhodamine B, fluorescein, quantum dots) was overlaid with a polymer shell material to be tested. Immersion of this film into a thiol solution determined the shell polymer stability and the permeability of reactive agents through the polymer. Profilometry results showed that these films were on the order of approximately 20 µm. The experimental results are shown in FIG. 13. The left digital camera image shows a control, 23 µg of rhodamine B within a PEG film was rapidly solubilized in water within approximately 1 minute in the absence of a polymer shell material (see FIG. 13). The digital camera image on the right shows a thin PEG film containing rhodamine B without submersion into water and after submersion into water. This control study showed that sensing elements are rapidly released into water when a stable overcoating film is not present. Rhodamine B was employed as a model sensing element for screening the permeability and stability of polymer shell materials.

Figure 14:
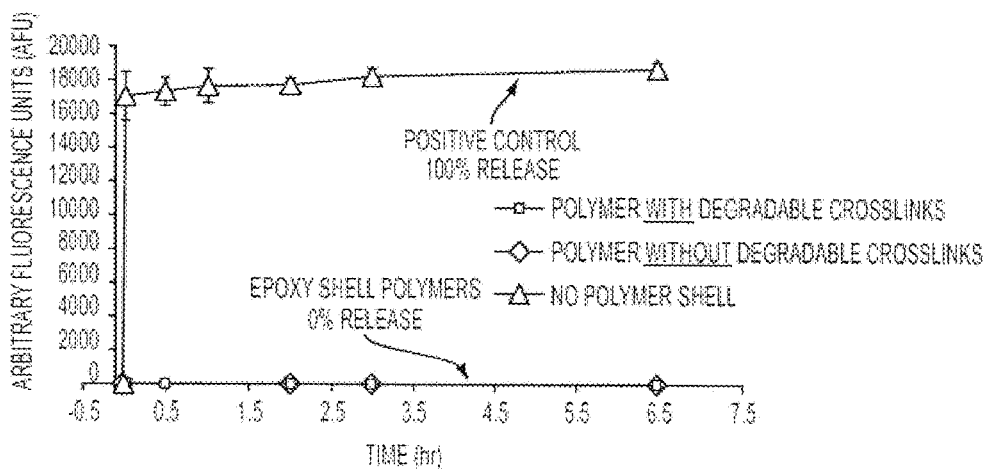
FIG. 14 is a graph showing thin-film release studies using epoxy films according to embodiments of the present disclosure without degradable crosslinks (formed from EPON® 862 epoxide monomer and DDS) or with degradable crosslinks (formed from EPON® 862 epoxide monomer and 4APDS) with the films immersed in an aqueous solution comprising 50% by weight of 2-mercaptoethanol at 25° C.
Figure 15:
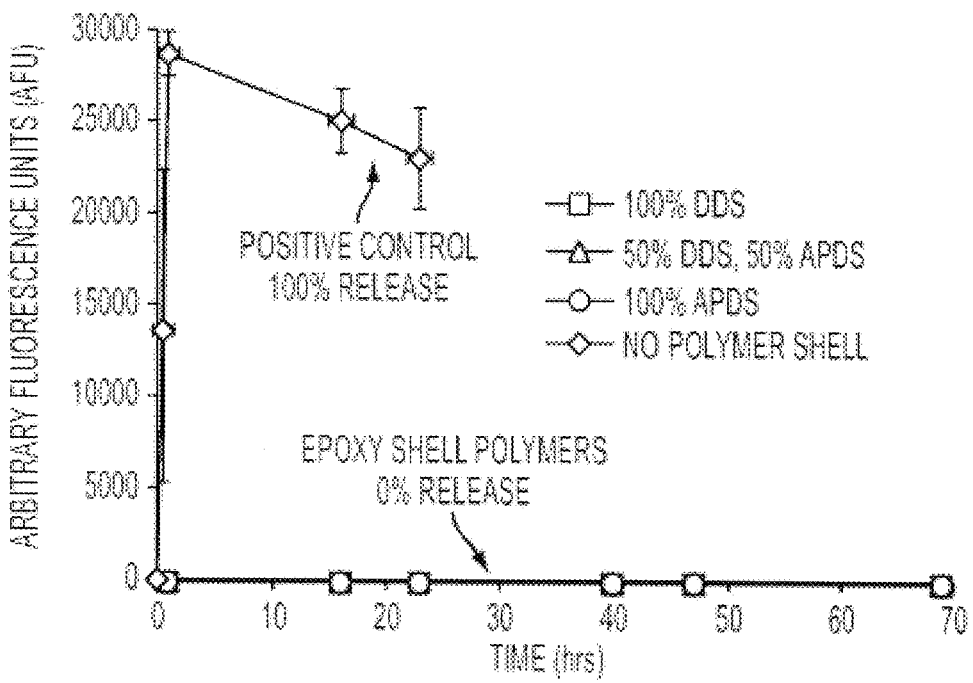
FIG. 15 is a graph showing thin-film release studies using epoxy films according to embodiments of the present disclosure comprising EPON® 862 epoxide monomer with 100% DDS, with 1:1 DDS:APDS, and with 100% APDS with the films immersed in an aqueous solution comprising 50% by weight 2-mercaptoethanol and 50% by weight API brine at 25° C.

The release profile of rhodamine B through thin epoxy polymer films was evaluated. The bilayered films were immersed into thiol solution and characterized via fluorimetry at different time points. As shown in FIG. 14, the epoxy polymer system comprising EPON® 862+DDS (4,4'-diaminodiphenylsulfone) (both with and without degradable disulfide crosslinks) did not show rhodamine B breakthrough after 6.5 hours. Conversely, rhodamine B rapidly released (at approximately 1 minute) in the absence of an epoxy shell. FIG. 15 shows another epoxy system comprising EPON® 862+PACM (both with and without degradable disulfide crosslinks). Rhodamine B rapidly released (at approximately 1 minute) in the absence of an epoxy shell. No release occurred after about 69 hours at room temperature in the samples with the epoxy shell.

Example 7

Evaluation of Delivery and Release Systems Including Phase Change Materials

Figure 16:
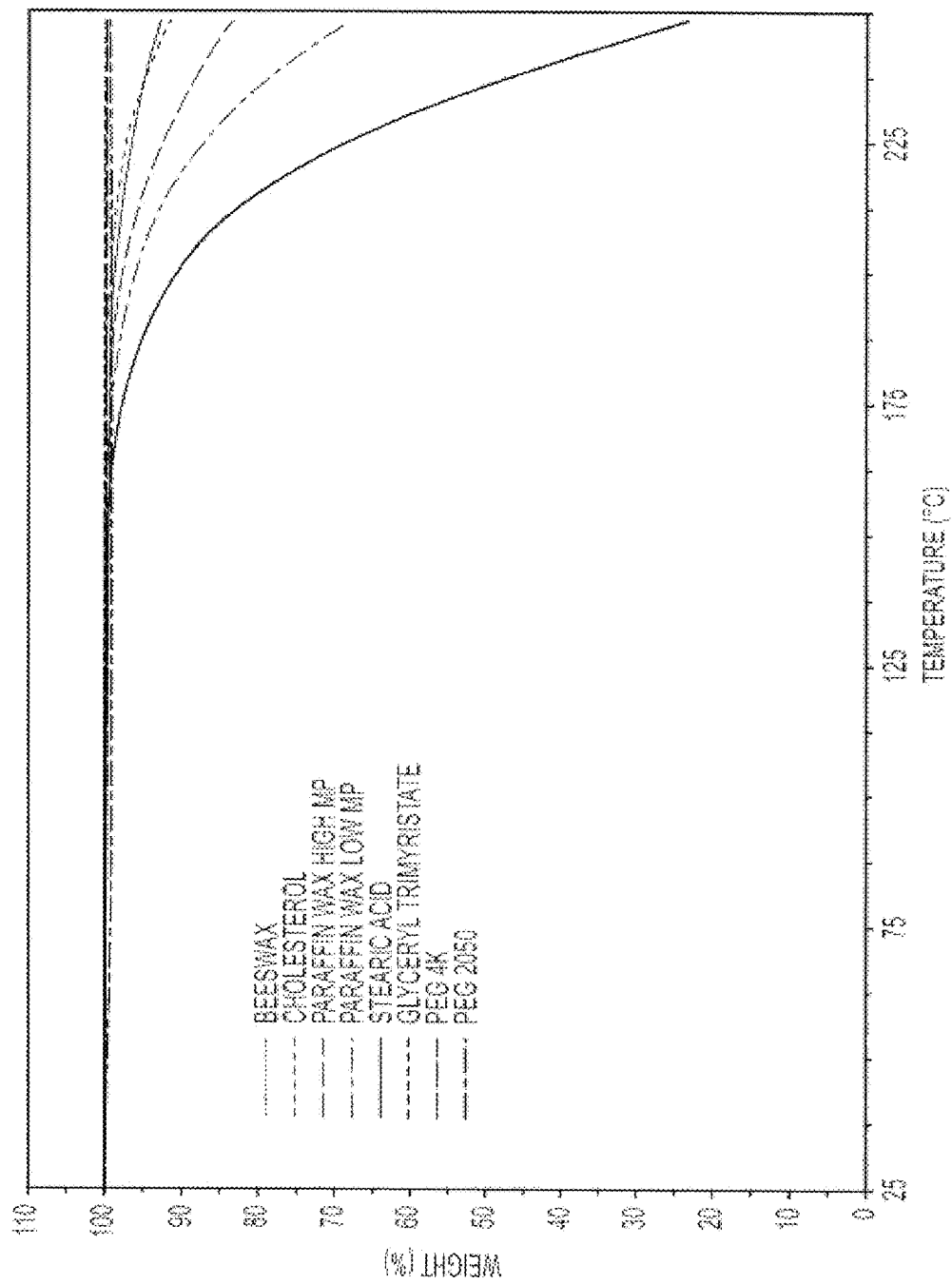
FIG. 16 is a graph showing thermogravimetric analysis ("TGA") results relating to characteristics of PCMs according to embodiments of the present disclosure.

Further testing was carried out to evaluate various materials useful in preparing release and delivery systems according to embodiments of the present disclosure. To this end, thermogravimetric analysis ("TGA") was used to evaluate characteristics of PCMs useful according to the present disclosure. The TGA analysis particularly provided information related to degradation temperature, absorbed moisture content, and solvent residues accumulated during processing. The tested PCMs were shown to be stable in that they did not take up water, and no solvent residue was apparent. The TGA test results are shown in FIG. 16.

Figure 17A:
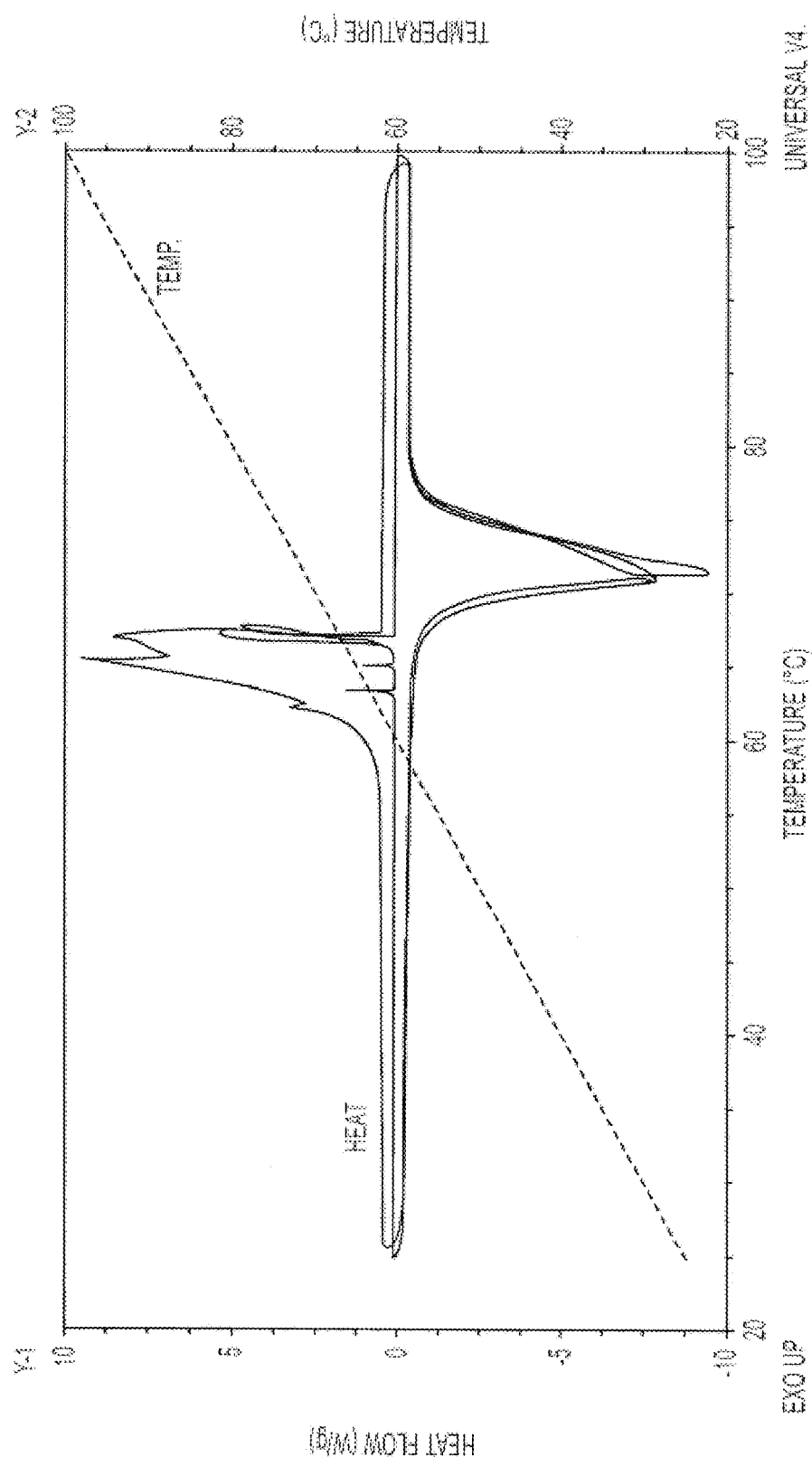
FIG. 17A is a graph showing differential scanning calorimetry ("DSC") results for stearic acid comparing temperature to heat flow.
Figure 17B:
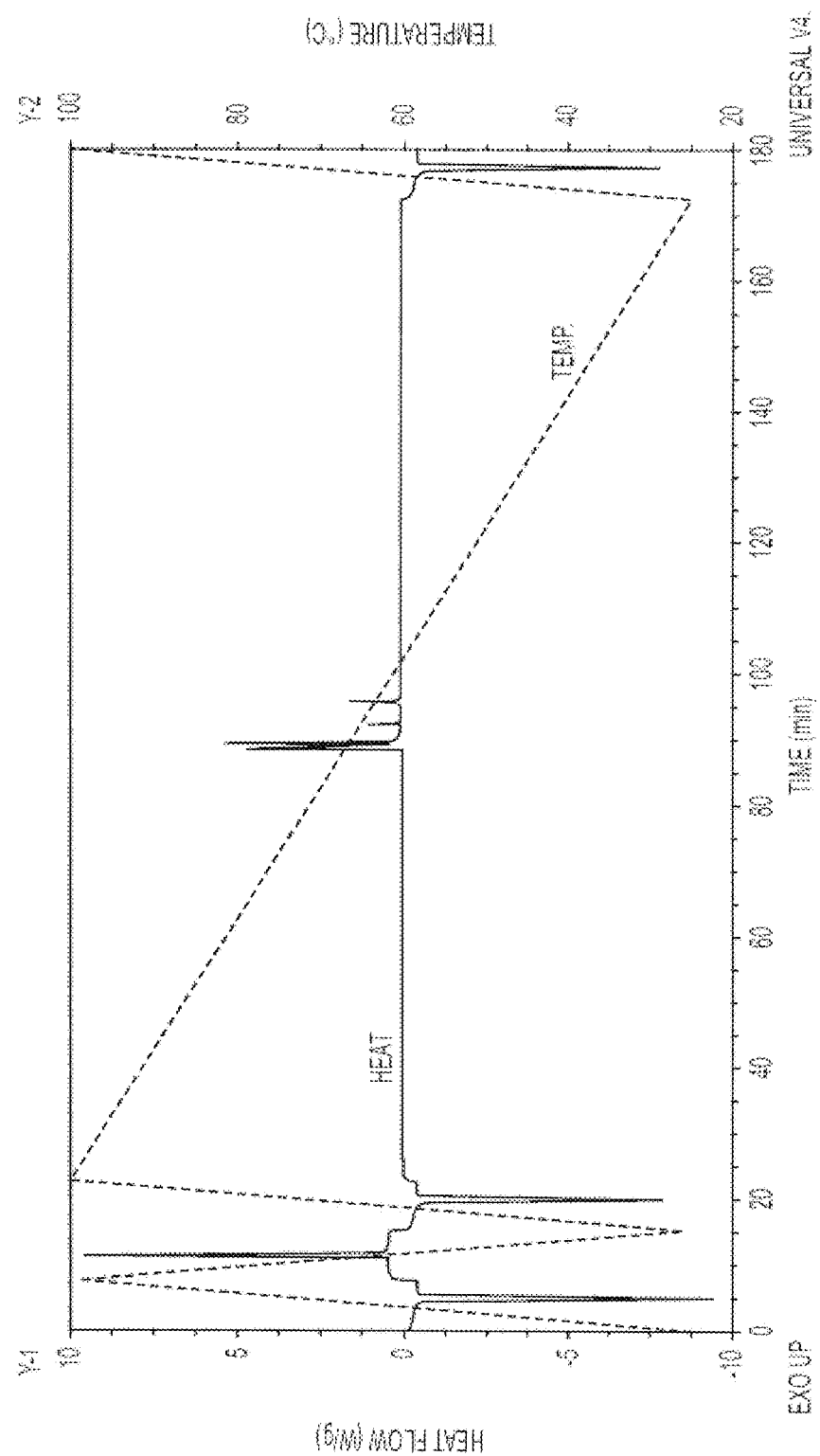
FIG. 17B is a graph showing the integration of time-based data in relation to the DSC results of FIG. 17A.
Figure 17C:
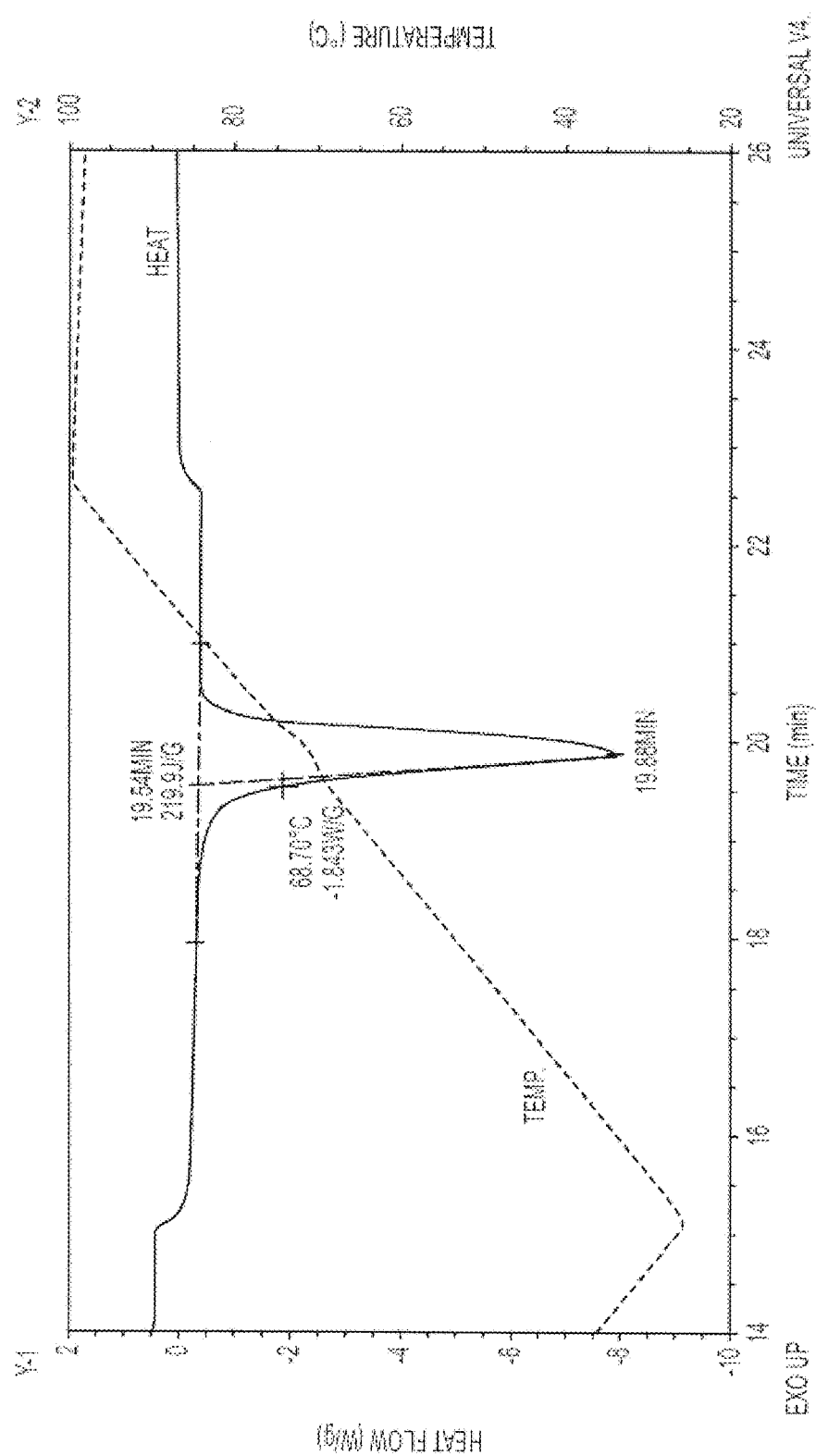
FIG. 17C is a graph showing the DSC heat of fusion values after a fast quench of 10° C./min in relation to the DSC results of FIG. 17B.
Figure 17D:
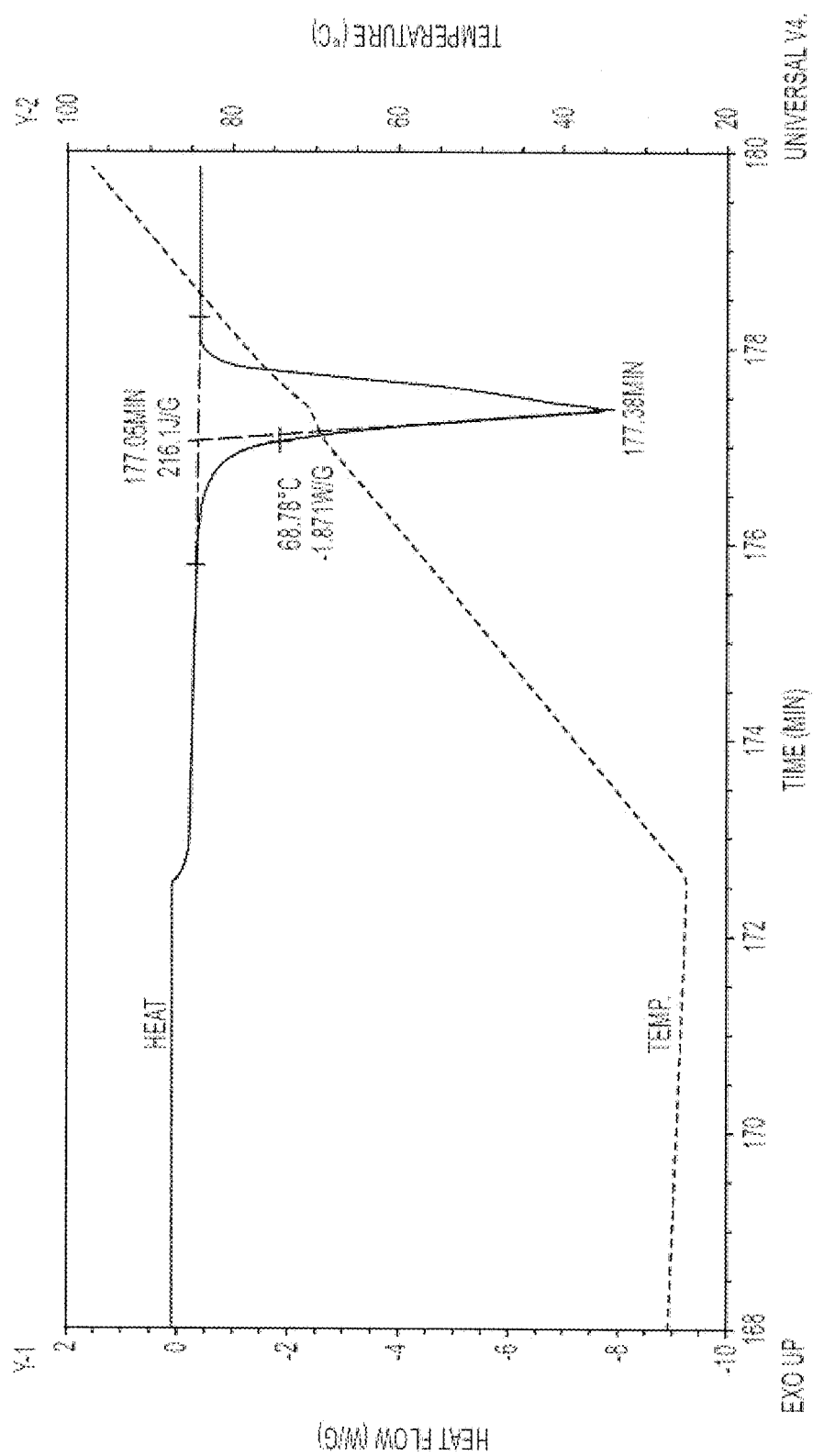
FIG. 17D is a graph showing the DSC heat of fusion values after a slow quench of 0.5° C./min in relation to the DSC results of FIG. 17B.

Crystallinity of the PCMs was evaluated, particularly as to how processing affected crystallinity, using differential scanning calorimetry ("DSC"). Representative DCS plots for tests carried out with stearic acid are shown in FIG. 17A through FIG. 17D. The graph of FIG. 17A compares temperature to heat flow. An exothermic (e.g., crystallization) peak is represented by a positive heat flow and an endothermic (e.g., melting) transition is represented by a negative heat flow. The integration of the time-based data in FIG. 17B through FIG. 17D provides heat of fusion values after a fast quench of 10° C./min (see FIG. 17C) and a slow quench of 0.5° C./min (see FIG. 17D). The graphs in FIGS. 17A-17D show the type of data used to calculate the values in Table 3.

Table 3 shows percent (%) crystallinity of pure lipids (i.e., no reducing agents). As the material melts, the energy (i.e., heat) utilized is measured. The enthalpy for a 100% crystalline material is known and is used to determine the percent crystallinity of the sample. Multiple cycles were performed for each of the PCMs of interest. Melting point was indicative of a change in polymorphic form, and percent crystallinity and change in response to a fast or slow cooling time was considered. Table 3 indicates that temperature changes during PCM processing should not markedly affect crystallinity.

reducing agents. Heat of fusion and melting temperature for beeswax were obtained from "Restorative Dental Materials," edited by Robert G. Craig, 11$^{th}$ edition, Mosby, Inc., page 50, and "Textbook of Dental Materials," S. Hussain, Jaypee Brothers Medical, page 368, which are both hereby incorporated by reference herein.

Release characteristics were also evaluated. As discussed herein, embodiments of the present disclosure provide essentially a chemical clock "timer" that can be initiated by the release of reactive elements from the PCM core, which in turn degrades the shell from the inside-out. Testing was carried out on redox chemistries as stimuli responsive mechanisms. The release kinetics of reducing agents within the PCM were evaluated as a function of time and temperature. Tested reducing agents included BDT, DTT, and mercaptoethanol. Tested PCMs included paraffin, polyethylene glycol, stearic acid, and glyceryl trimyristate. The tested reducing agents exhibited widely different chemical properties. For example, DTT is water soluble owing to the two hydroxyl groups. Mercaptoethanol is also water soluble due to a single hydroxyl group, but also exhibits increased hydrophobicity which may facilitate insertion into a hydrophobic PCM, such as paraffin. BDT is hydrophobic, which may enable compatibility with different PCMs.

In the experimental setup, the concentration and type of reducing agent incorporated in the thin film PCM was varied, and the release of the reducing agents from the PCM

TABLE 3

| Lipid Material | melt peak temp. as delivered (° C.) | Percent crystallinity as delivered (%) | melt peak temp. (° C.) | Percent crystallinity after 10° C./min quench (%) | melt peak temp. (° C.) | Percent crystallinity after 0.5° C./min quench (%) |
|---|---|---|---|---|---|---|
| Stearic Acid | 71.6 | 103% | 71.0 | 103% | 71.0 | 101% |
| Cholesterol | 147.6 | 91% | 148.2 | 91% | 147.6 | 89% |
| PEG 2050 | 55.7 | 90% | 55.9 | 85% | 56.3 | 85% |
| Low melting point Paraffin | 59.5 | 89% | 58.9 | 94% | 59.6 | 93% |
| Beeswax | 64.9 | 98% | 64.6 | 92% | 64.9 | 100% |
| Glyceryl Trimyristate | 61.3 | 94% | 58.6 | 86% | 59.0 | 87% |

Figure 18:
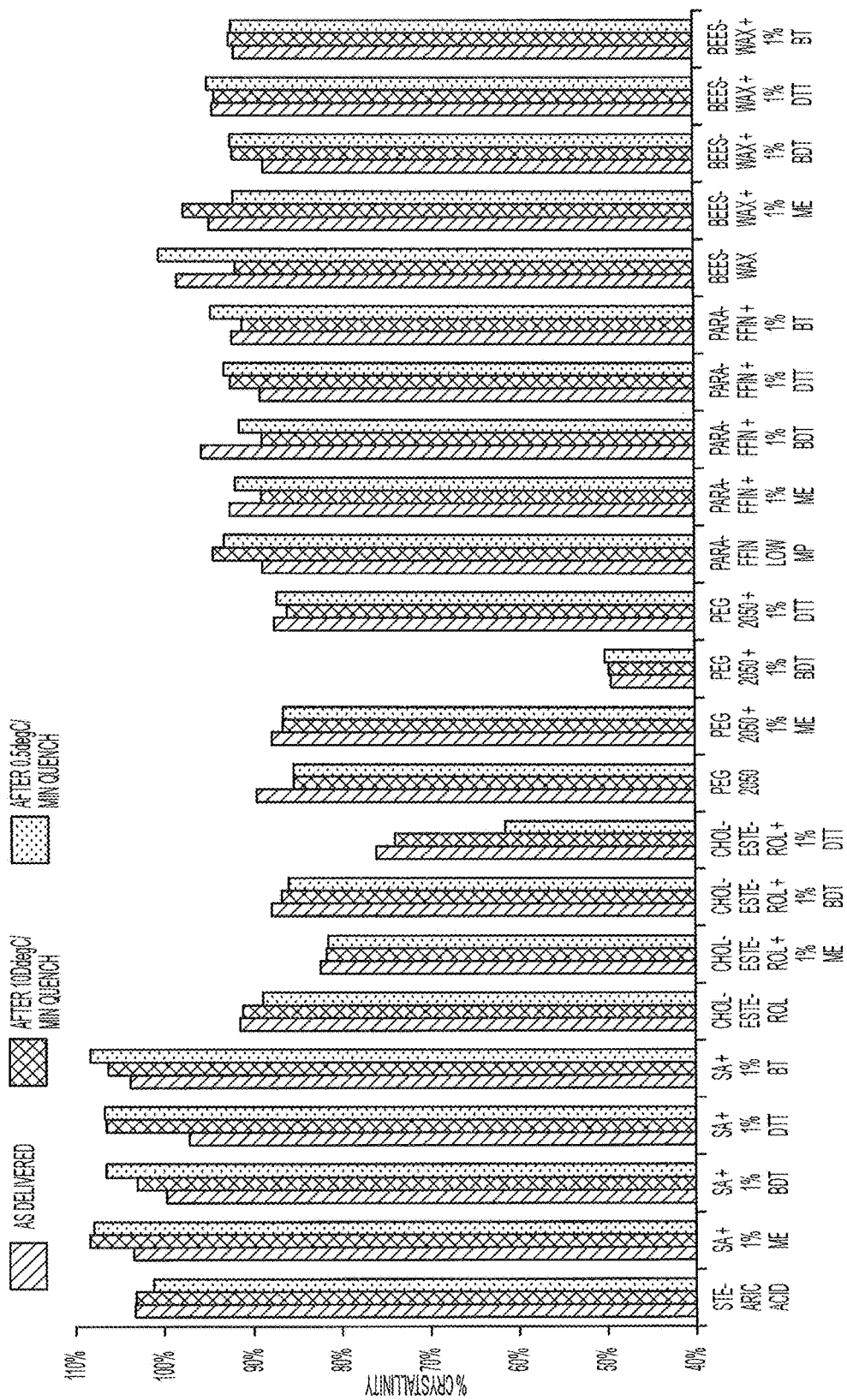
FIG. 18 is a graph showing
Figure 19:
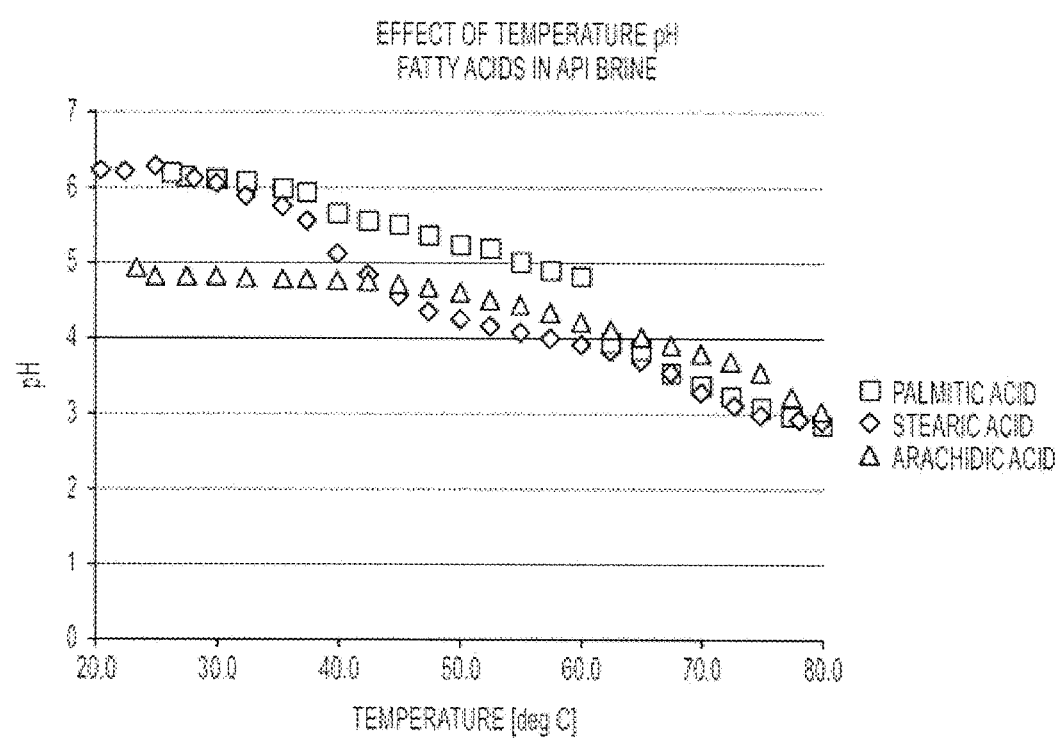
FIG. 19 is a graph showing the effect of temperature on pH of palmitic acid, stearic acid, and arachidic acid in API brine.

FIG. 18 shows the percent crystallinities of a variety of screened PCMs (neat and with reducing agents—mercaptoethanol ("ME"), dithioerythritol ("DTT"), benzene-1,2-dithiol ("BDT"), and 1-butane thiol). DSC analysis was performed on the samples using multiple temperature sweeps with different cooling rates (i.e., 10° C./min or 0.5° C./min). These results show that the addition of most reducing agents did not influence either the percent crystallinity or the melting peaks (melting point data not shown). An outlier was the co-crystallization of PEG 2050 and benzene-1,2-dithiol ("BDT"), likely owing to the difference in hydrophobicity. Alternatively, the cholesterol/BDT system had a high affinity, and the BDT co-crystallized well with the cholesterol. The BDT/cholesterol material melted, but rapidly recrystallized. This shows that within the core-shell system (e.g., see FIGS. 1-2), the BDT would be expected to remain within the cholesterol core and never diffuse into the brine/polymer shell. Thus, crosslink degradation would be expected to occur at the lipid/polymer interface, likely yielding very slow reaction kinetics. The addition of a hydrophilic reducing agent—e.g., dithioerythritol ("DTT")—to cholesterol resulted in a lower percent crystallinity (~68%) and melting peak (~140°). Other illustrated systems included stearic acid and beeswax with any other into API brine was measured as a function of time and temperature. The reducing agents released into the API brine were evaluated using inductively coupled plasma ("ICP") emission spectrometry. ICP emission spectrometry was identified as being useful for the analysis of sample solutions arising from its speed and accuracy, and it is widely used as the official analysis method according to JIS and ISO standards and the Japanese Water Supply Act. Test results showed that a controlled chemical clock was achieved using a temperature trigger. See EXAMPLE 3 above, particularly in relation to FIG. 7A, FIG. 7B, FIG. 8A, and FIG. 8B. FIG. 19 shows measurements of palmitic acid, stearic acid, and arachidic acid to evaluate the usefulness thereof with an acid degradable shell wherein higher temperatures drive a higher pH value, resulting in polymer shell degradation. The tested materials were shown to generally decrease in pH as a function of temperature indicating that fatty acids may be used as a core material or a component of a core material for triggering a pH-responsive polymer shell (e.g., for use in the systems disclosed with respect to FIGS. 1-3). A crystalline PCM was thus shown to liquefy in the presence of the exemplary reactive agents (ME, DTT, BDT, and 1-butane thiol). The release kinetics of the reactive agents were shown to be dependent upon their specific chemistry as well as the external environment.

Example 8

Figures 20A, 20B:
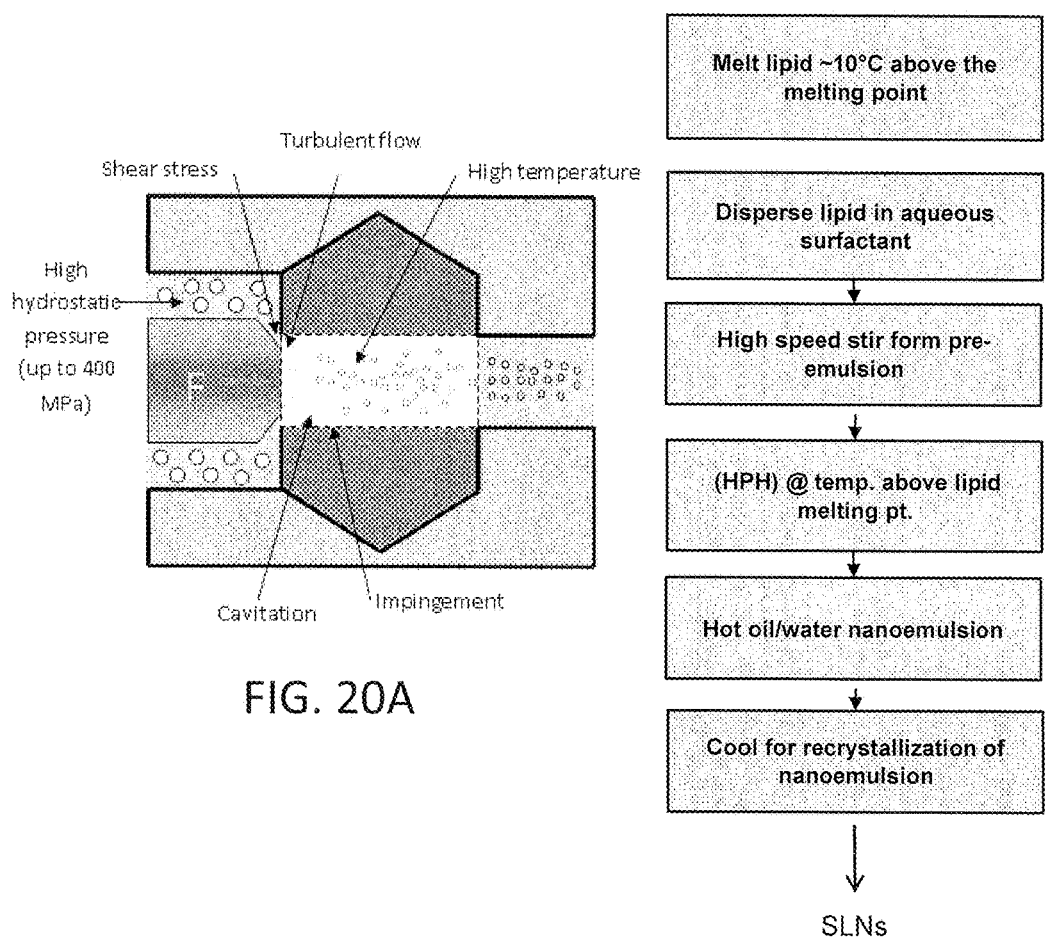
FIG. 20A is a schematic illustration of a high pressure homogenizer useful in the preparation of solid lipid nanoparticles ("SLNs") according to embodiments of the present disclosure.
FIG. 20B illustrates process steps associated with the use of the high pressure homogenizer of FIG. 20A according to embodiments of the present disclosure.

Evaluation of Solid Lipid Nanoparticles for Use in Delivery and Release Systems Homogenization techniques were used to generate solid lipid nanoparticles ("SLNs") in a scalable fashion. The hot homogenization technique was used wherein the lipid was heated above its melting point and emulsified in a hot aqueous surfactant solution of identical temperature (i.e., pre-emulsion). The pre-emulsion was cycled through a high pressure homogenizer (schematically illustrated in FIG. 20A) and subsequently cooled to room temperature and recrystallized, resulting in SLNs. The process of high pressure homogenization is shown in FIG. 20B. Ingredients utilized for homogenization included approximately 5-10% lipids, approximately 2-5% emulsifiers, and water.

Figure 21:
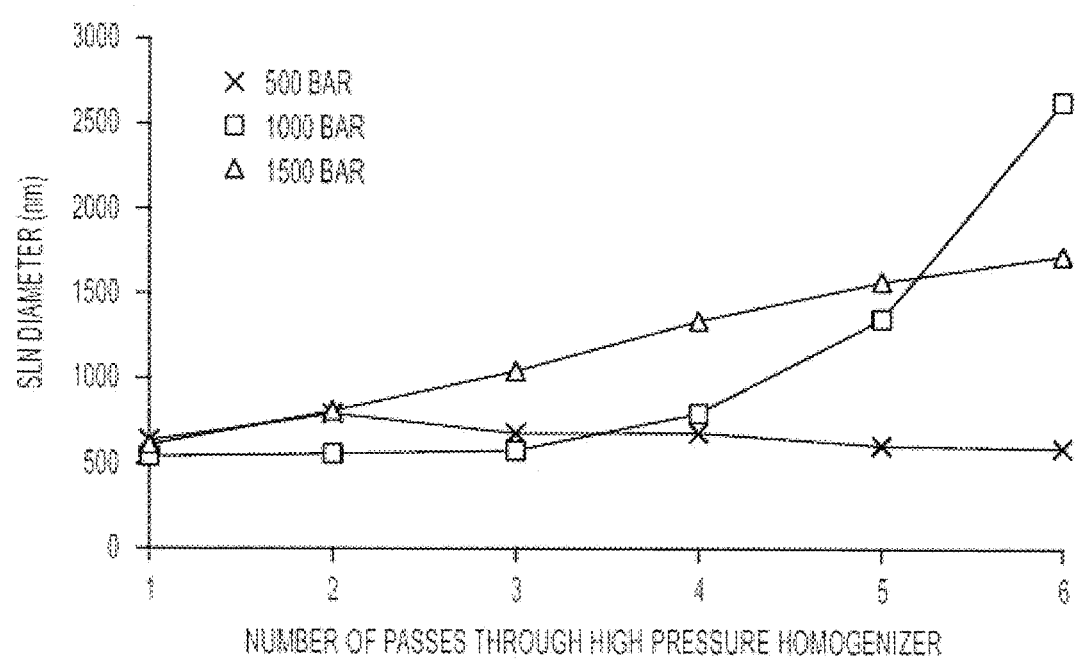
FIG. 21 is a graph showing the diameter of solid lipid nanoparticles according to embodiments of the present disclosure relative to the number of passes through a high pressure homogenizer used in preparing the SLNs.

The effect of homogenization pressure (i.e., the pressure the particles experience while passing through the homogenization valve) on the SLNs was evaluated. In the testing, SLNs comprising 3 wt % Stearic Acid, 1.5 wt % PLURONIC® F68, and 1.5 wt % TWEEN® 80 were prepared using the hot homogenization technique at 1,500 bar, 1,000 bar, and 500 bar. The graph in FIG. 21 shows the diameters of SLNs versus the number of passes through the homogenizer. FIG. 21 indicates an increase in cycles through the homogenizer corresponded to an increase in transparency of the liquid, thereby suggesting a reduction in the nanoparticle size. Post-processing of the solutions by slowly cooling to room temperature and permitting to crystallize resulted in an opaque liquid even at a higher number of HPH cycles. This is well supported in the literature, wherein increases in homogenization pressure or number of cycles may ultimately result in higher particle size owing to the increase in kinetic energy of the particles (Sci. Revs. Chem. Commun.: 2, 2012, 80-102).

Figure 22:
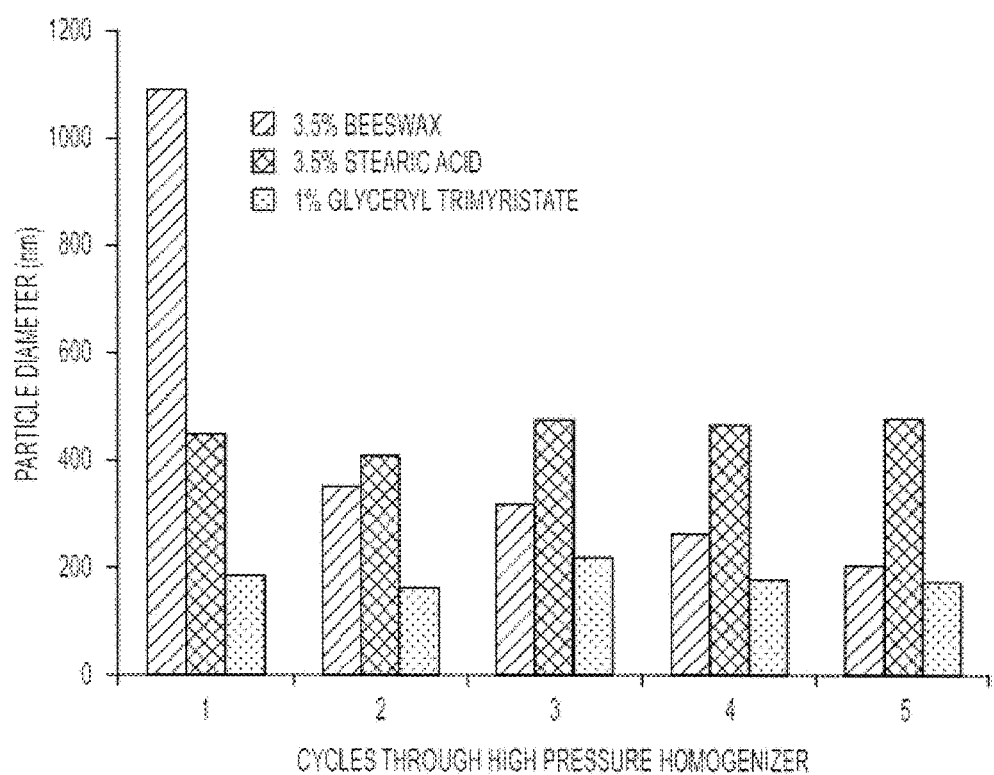
FIG. 22 is a graph showing the diameter of solid lipid nanoparticles according to embodiments of the present disclosure relative to the number of cycles through a high pressure homogenizer used in preparing the SLNs.

Three different lipid types, namely a fatty acid (e.g., stearic acid), a wax (e.g., beeswax), and a triglyceride (e.g., glyceryl trimyristate) were evaluated for usefulness in SLNs. All SLNs were prepared with a single surfactant package (e.g., 3.5% TWEEN® 80) and a single pressure (e.g., 1,000 bar). As seen from FIG. 22, the sizes of the SLNs did not change with an increase in homogenization cycles (except for cycle 1 of beeswax), but did change with the lipid type. For example, the diameters of particles decreased with the triglyceride lipid. The effect of surfactant type on SLNs is discussed above in EXAMPLE 2.

Figure 23:
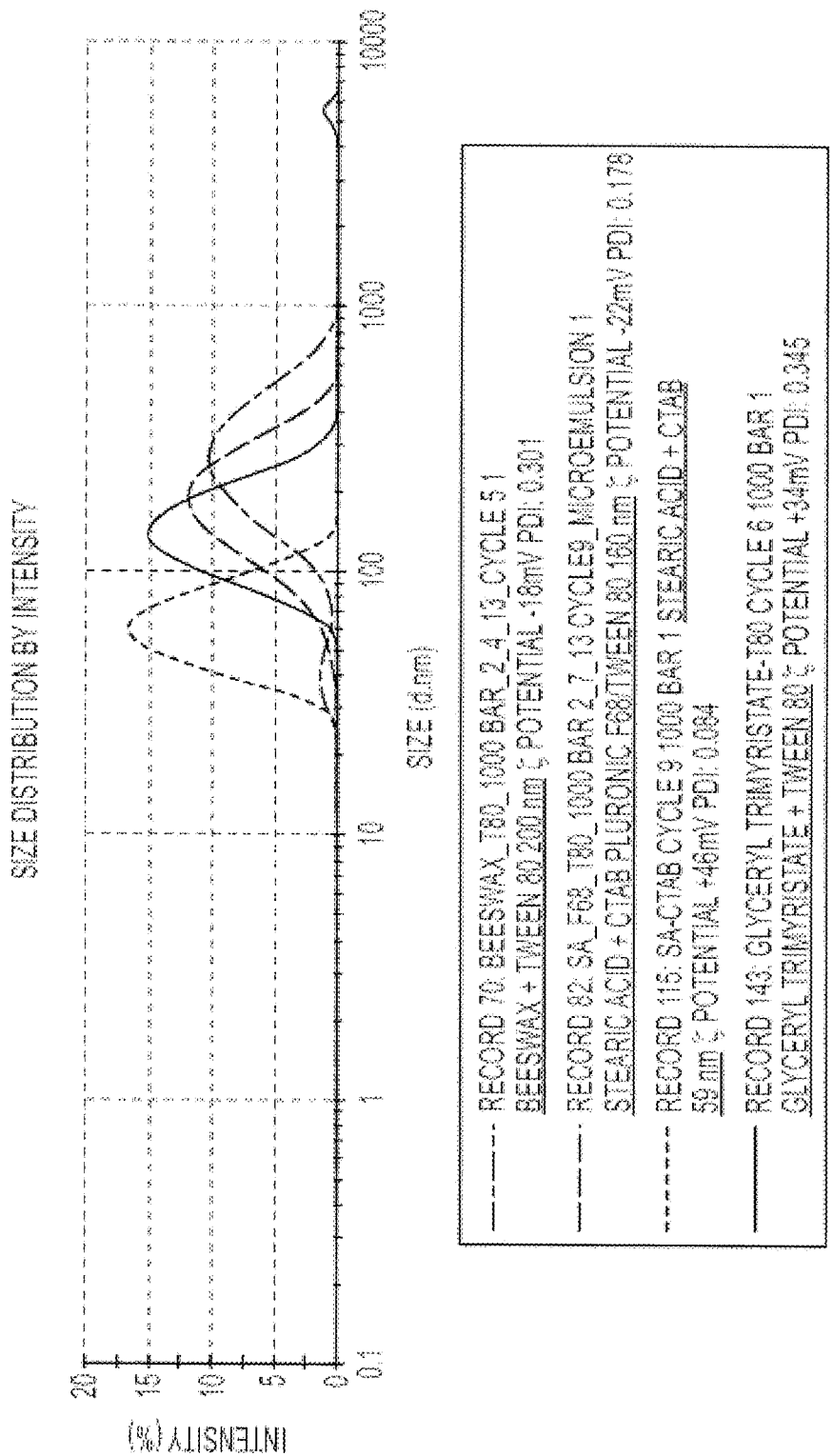
FIG. 23 is a graph showing size distributions of solid lipid nanoparticles according to embodiments of the present disclosure as measured by dynamic light scattering ("DLS")

Dynamic light scattering ("DLS") testing identified four formulations that resulted in particles with diameters less than 300 nm. The formulations included: (1) 3.5% Stearic Acid+3.5% CTAB, (2) 1% glyceryl trimyristate+3.5% Tween 80, (3) 3.5% Stearic Acid+3.5% of PLURONIC® F68 and TWEEN® 80 blend, and (4) 3.5% Beeswax+3.5% Tween 80. Size distributions of these formulations are shown in FIG. 23.

Figure 24A:
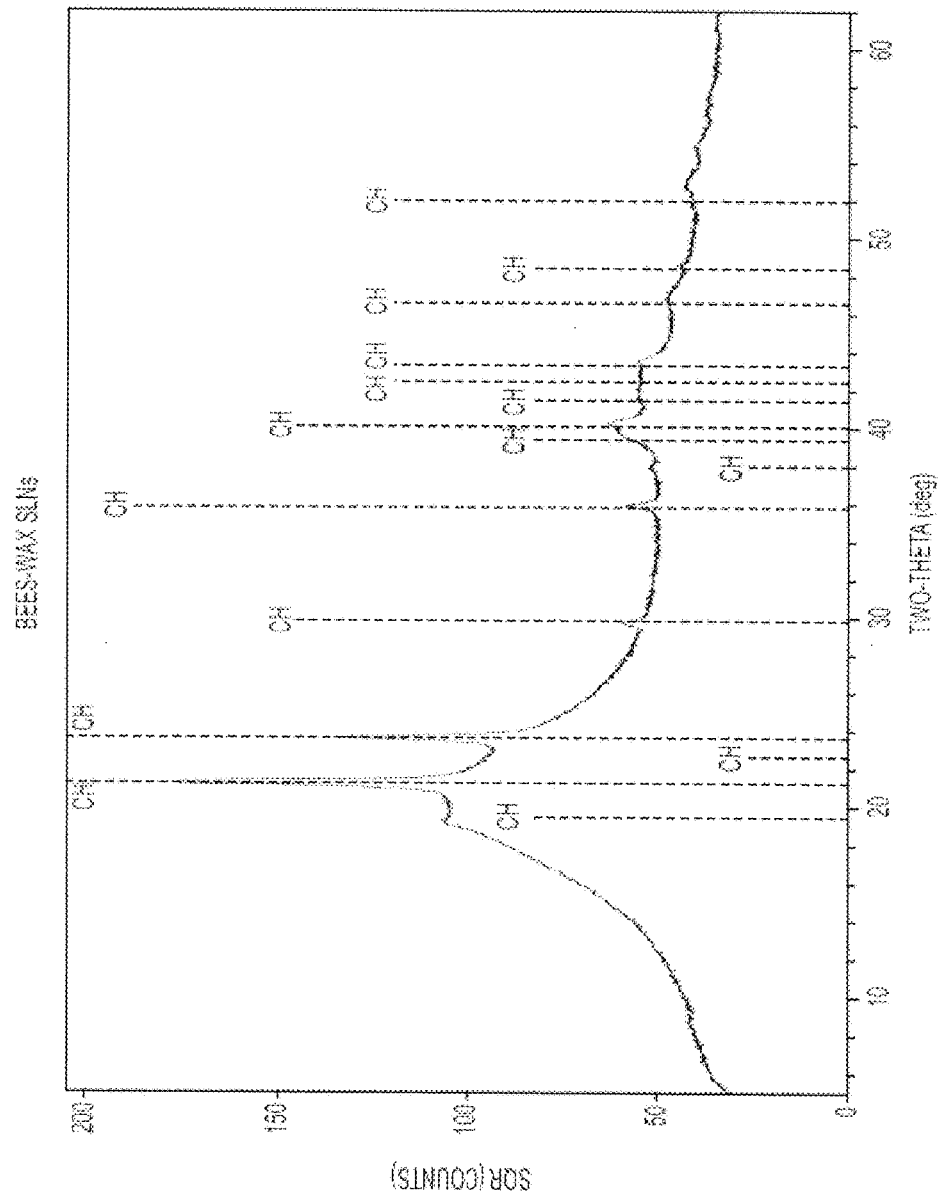
FIG. 24A is a graph showing the X-Ray Diffractometry ("XRD") pattern of a solid lipid nanoparticle according to embodiments of the present disclosure prepared using beeswax.
Figure 24B:
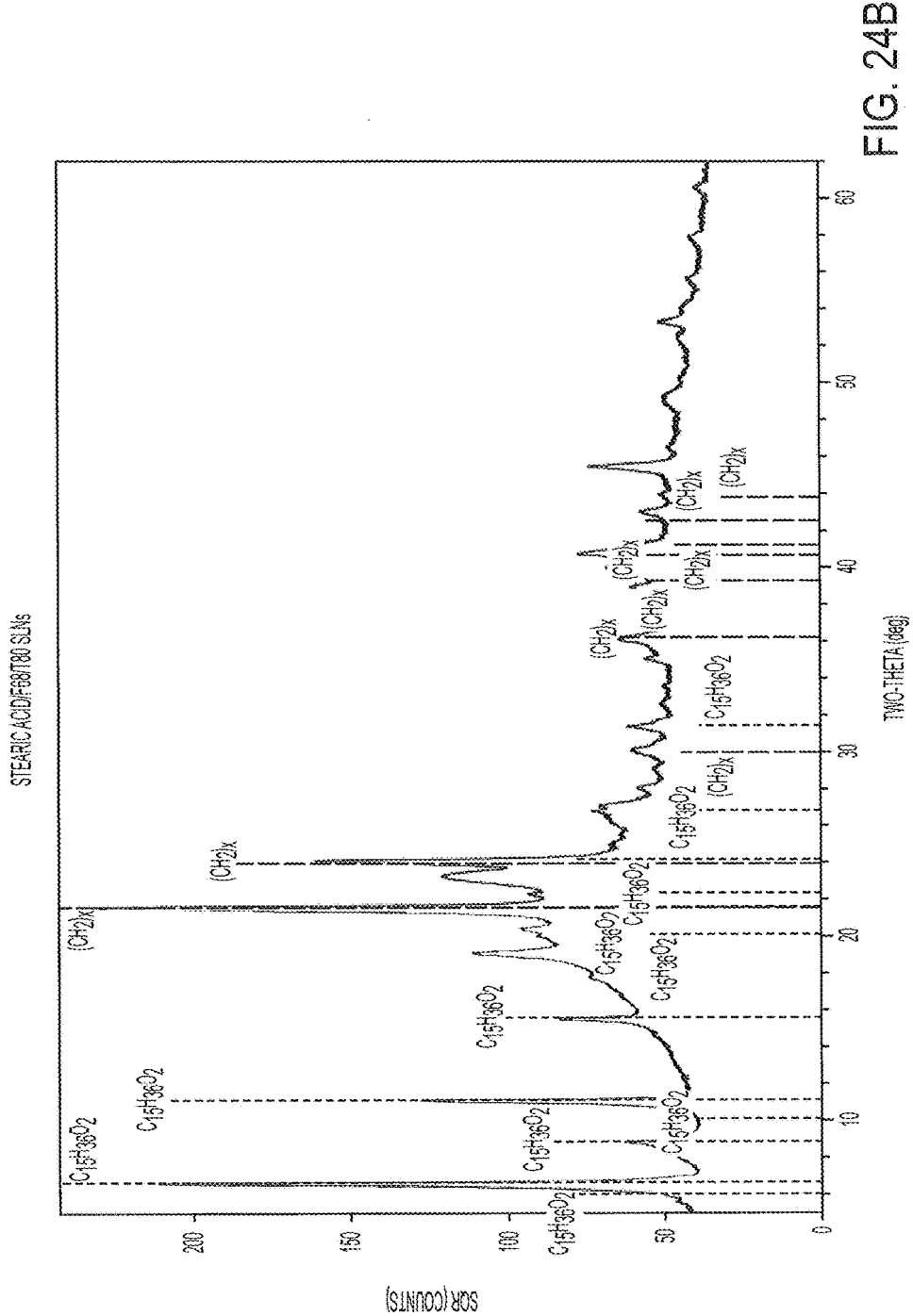
FIG. 24B is a graph showing the X-Ray Diffractometry ("XRD") pattern of a solid lipid nanoparticle according to embodiments of the present disclosure prepared using stearic acid.

Crystallinity of SLNs was examined using X-Ray Diffractometry ("XRD"). XRD spectra plots for two SLNs—beeswax and stearic acid (with PLURONIC® F68 and TWEEN® 80) are shown in FIG. 24A and FIG. 24B, respectively. The XRD spectra plots indicate that crystalline characteristics remained after preparing the SLNs, as shown by the sharp peaks in the XRD spectra plots.

Figure 25A:
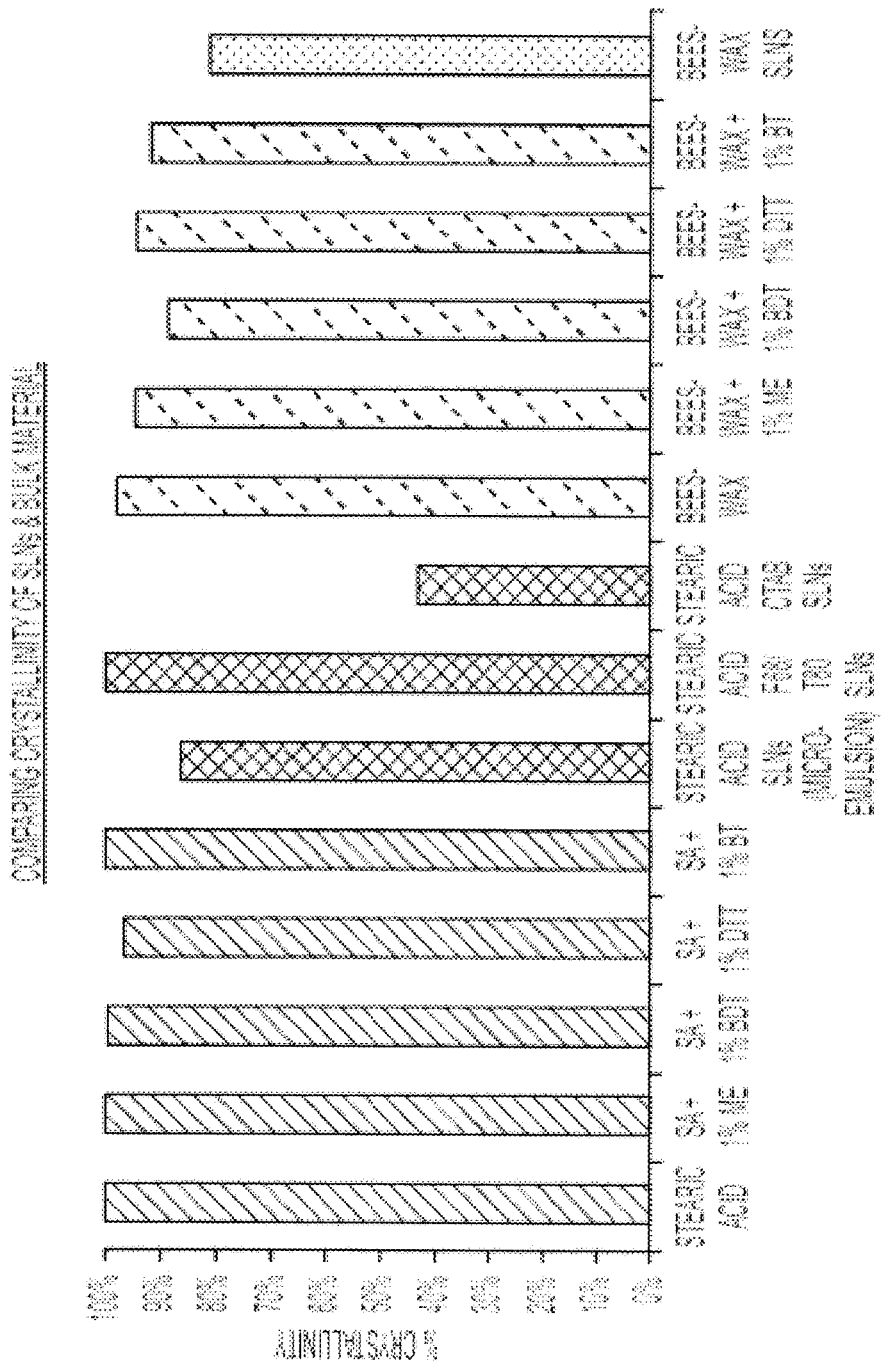
FIG. 25A is a graph showing the percent crystallinity of solid lipid nanoparticles according to embodiments of the present disclosure as compared with the bulk materials used in forming the SLNs.
Figure 25B:
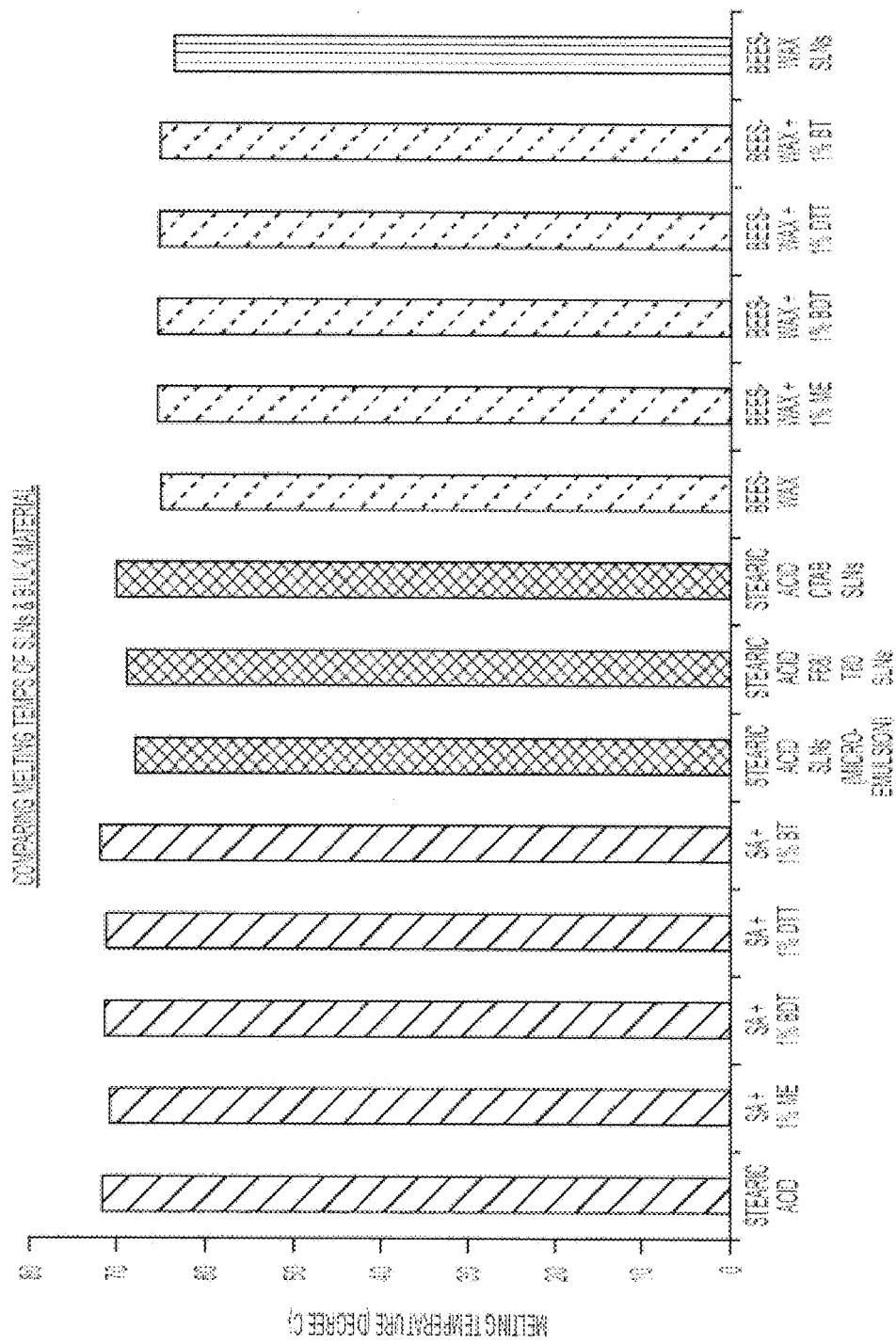
FIG. 25B is a graph showing the melting temperatures of solid lipid nanoparticles according to embodiments of the present disclosure as compared with the bulk materials used in forming the SLNs.

DSC was used to evaluate the effects of processing conditions on crystallinity of SLNs. The histograms of FIG. 25A and FIG. 25B show the percent crystallinities and melting temperatures of various phase change materials (neat and with reducing agents 2-mercaptoethanol ("ME"), 1-butane thiol ("BT"), dithioerythritol ("DTT"), and benzene-1,2 dithiol ("BDT")) and the accompanying SLNs. This showed that the processing conditions did not significantly affect the melting points or crystallinity of the SLNs.

To evaluate the morphology of SLNs, transmission electron microscopy ("TEM") was used. FIG. 26A through FIG. 26C show TEM images of stearic acid SLNs (TWEEN® 80/F68), FIG. 27A through FIG. 27C show TEM images of beeswax SLNs (TWEEN® 80), FIG. 28A and FIG. 28B show TEM images of stearic acid SLNs (e.g., CTAB), and FIG. 29 shows a TEM image of glyceryl trimyristate SLNs. The sizes calculated from the images were correlated with the sizes obtained via DLS. The TEM images in FIG. 27 indicate the presence of SLNs.

Example 9

Characterization of Shell Stability

This example was performed to illustrate formation of a shell material and show that the shell can be degraded in response to a reactive reagent in different external environments. Dynamic Mechanical Analysis ("DMA") was used to screen polymer shell materials for stability in environments emulating reservoir conditions (e.g., a subterranean reservoir). By measuring changes in the polymer properties (e.g., Tg and storage modulus) before and after exposure to a reservoir environment, a quantitative stability value was assigned to the polymer shell materials. The number of crosslinks per unit length was referred to as the crosslinking density. In general, higher degrees of crosslinked density resulted in stronger, stiffer materials with high temperature stability and resistance to solvents. The glass transition temperature ("Tg") indicated the extent of cure and also the extent of degradation of a sample. The degree of polymer crosslinking influenced Tg. For example, a high degree of crosslinking was expected to result in a higher storage modulus ("E'") above the Tg, whereas a low degree of crosslinking was expected to result in a lower storage modulus about the Tg. (Journal of Polymer Science (1970) 8(3), 437-445).

Figure 30:
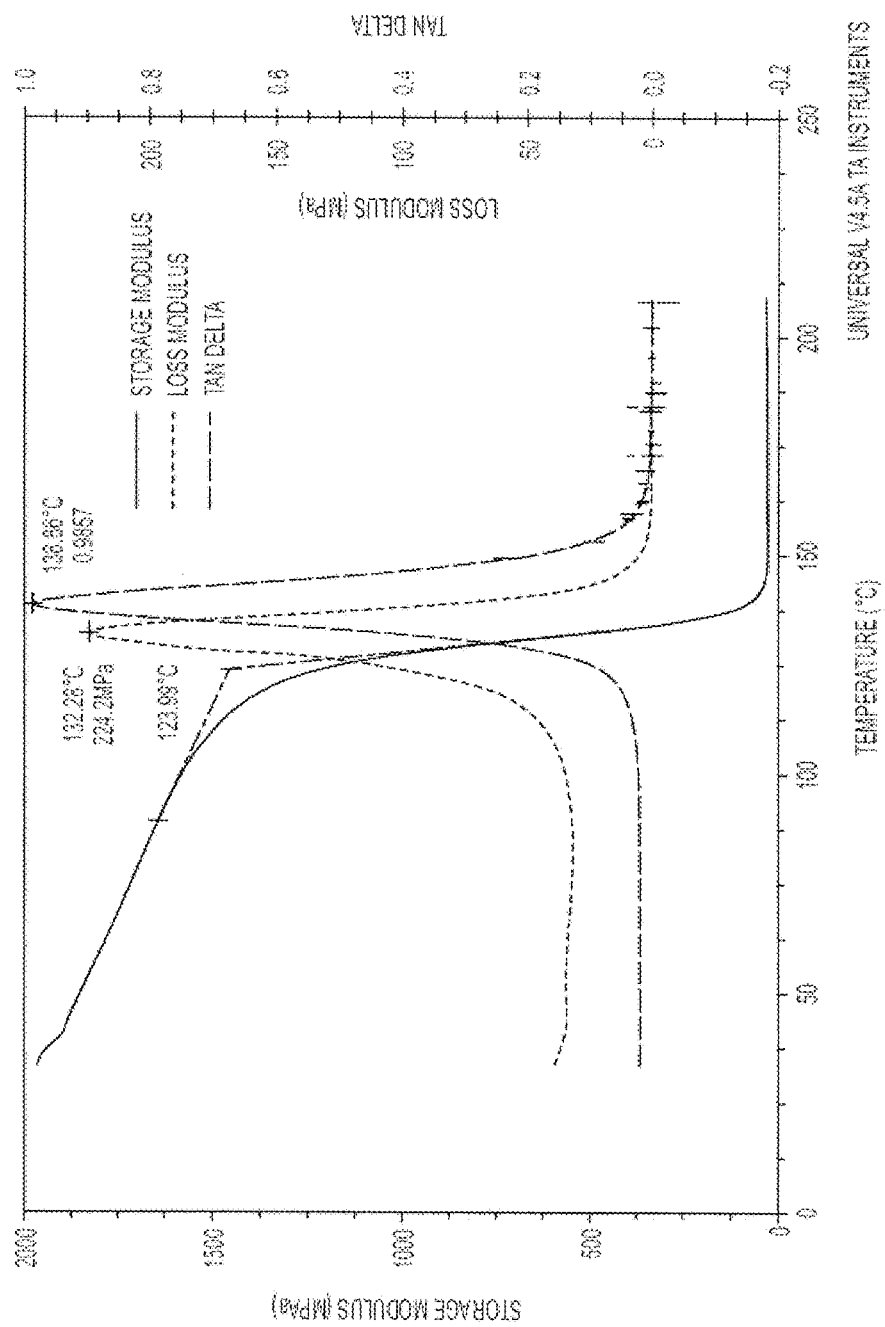
FIG. 30 is a graph showing the results of Dynamic Mechanical Analysis ("DMA") testing on an epoxy thermoset formed from EPON® 862 and 4,4'-diaminodicyclohexyl methane (AMICURE® PACM) useful according to embodiments of the present disclosure.
Figure 31:
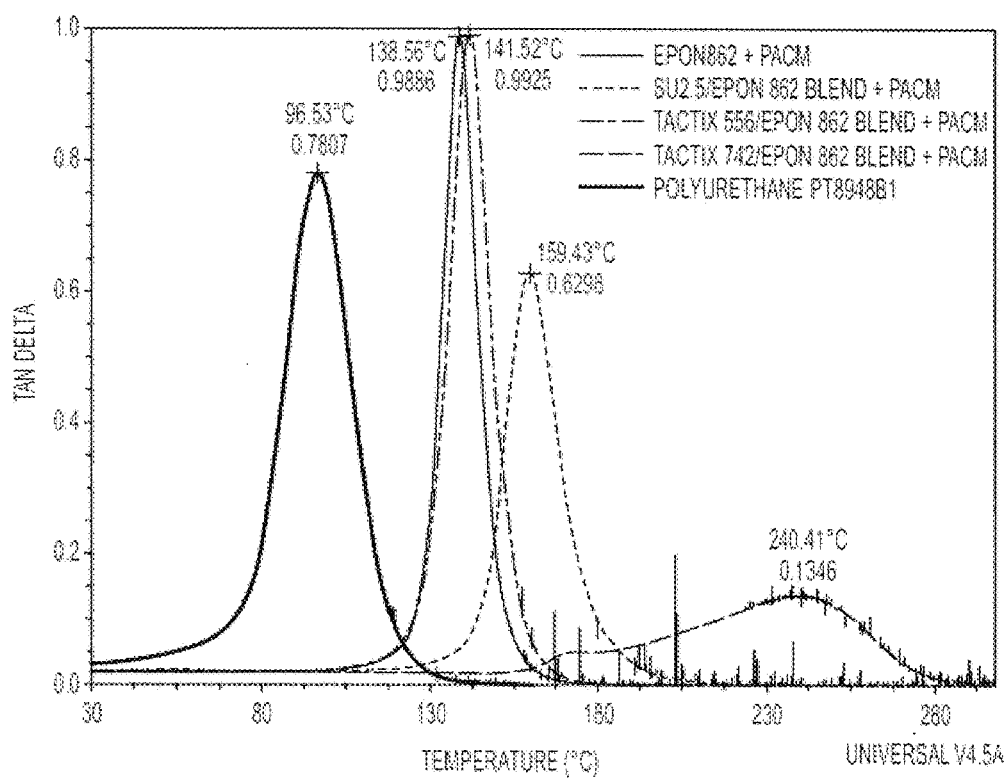
FIG. 31 is a graph showing the results of Dynamic Mechanical Analysis ("DMA") testing on a variety of polymer compositions useful according to embodiments of the present disclosure illustrating a range of glass transition temperatures.
Figure 32:
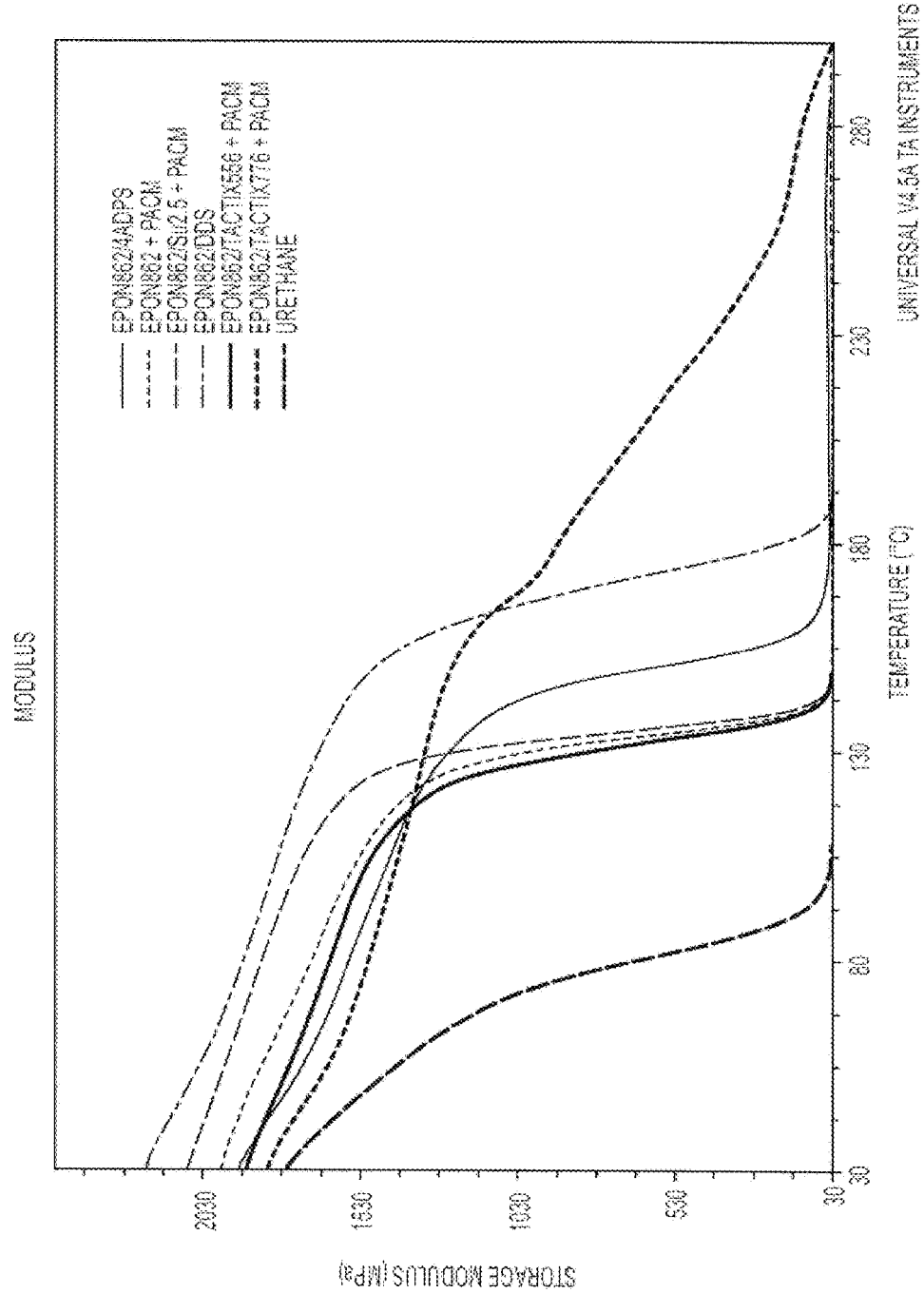
FIG. 32 is a graph showing storage modulus values obtained from DMA testing on a variety of polymer compositions useful according to embodiments of the present disclosure.
Figure 33:
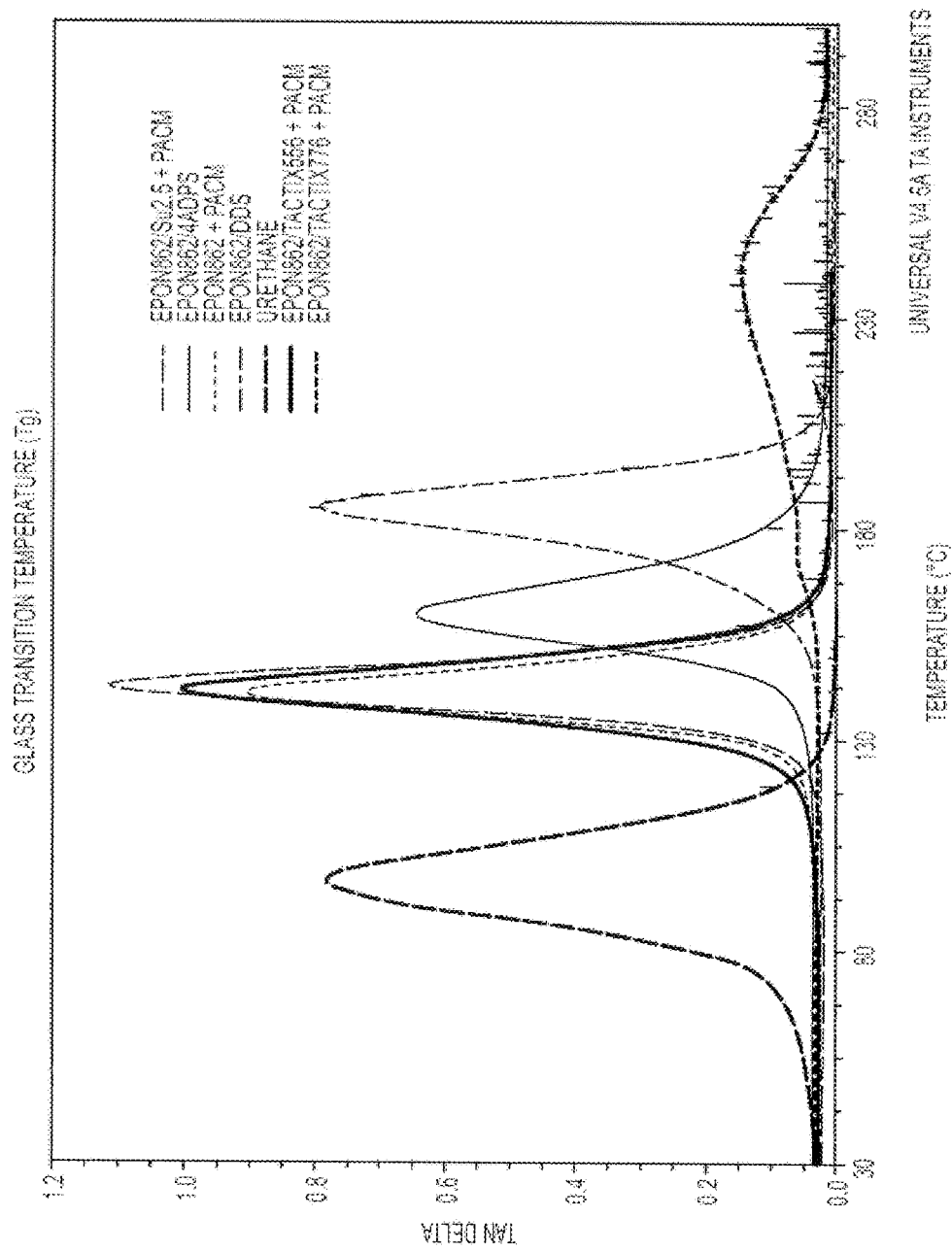
FIG. 33 is a graph showing glass transition temperature values obtained from DMA testing on a variety of polymer compositions useful according to embodiments of the present disclosure.

Initially, DMA was performed on a variety of polymer systems after exposure to ambient conditions to obtain baseline values. FIG. 30 shows an example of DMA results from a standard epoxy thermoset (e.g., EPON® 862+PACM), showing a Tg of 138.86° C. FIG. 31 shows DMA results from a variety of polymers screened resulting in a wide range of Tg values. As shown, the epoxy systems have Tg's above 137° C., showing adequate stability at higher temperatures needed for reservoir environments. Modulus and glass transitions values for the following polymer systems are shown in FIG. 32 and FIG. 33, respectively: Urethane; EPON® 862/4APDS; EPON® 862/DDS; EPON® 862+PACM; EPON® 862/Su2.5+PACM; EPON® 862/TACTIX® 776+PACM; and EPON® 862/TACTIX® 776+PACM. FIGS. 30-33 show that a variety of polymer systems have the necessary mechanical properties to withstand the environment is typical oil/gas reservoirs.

Polymers were exposed to an API brine solution at 100° C. for 6.5 hours and subsequently evaluated with DMA. As an initial qualitative evaluation, the morphology of the polymers appeared identical before and after the testing. In general, all polymer systems maintained similar mechanical properties (e.g., Tg and modulus) after exposure to the reservoir environment.

Figure 34:
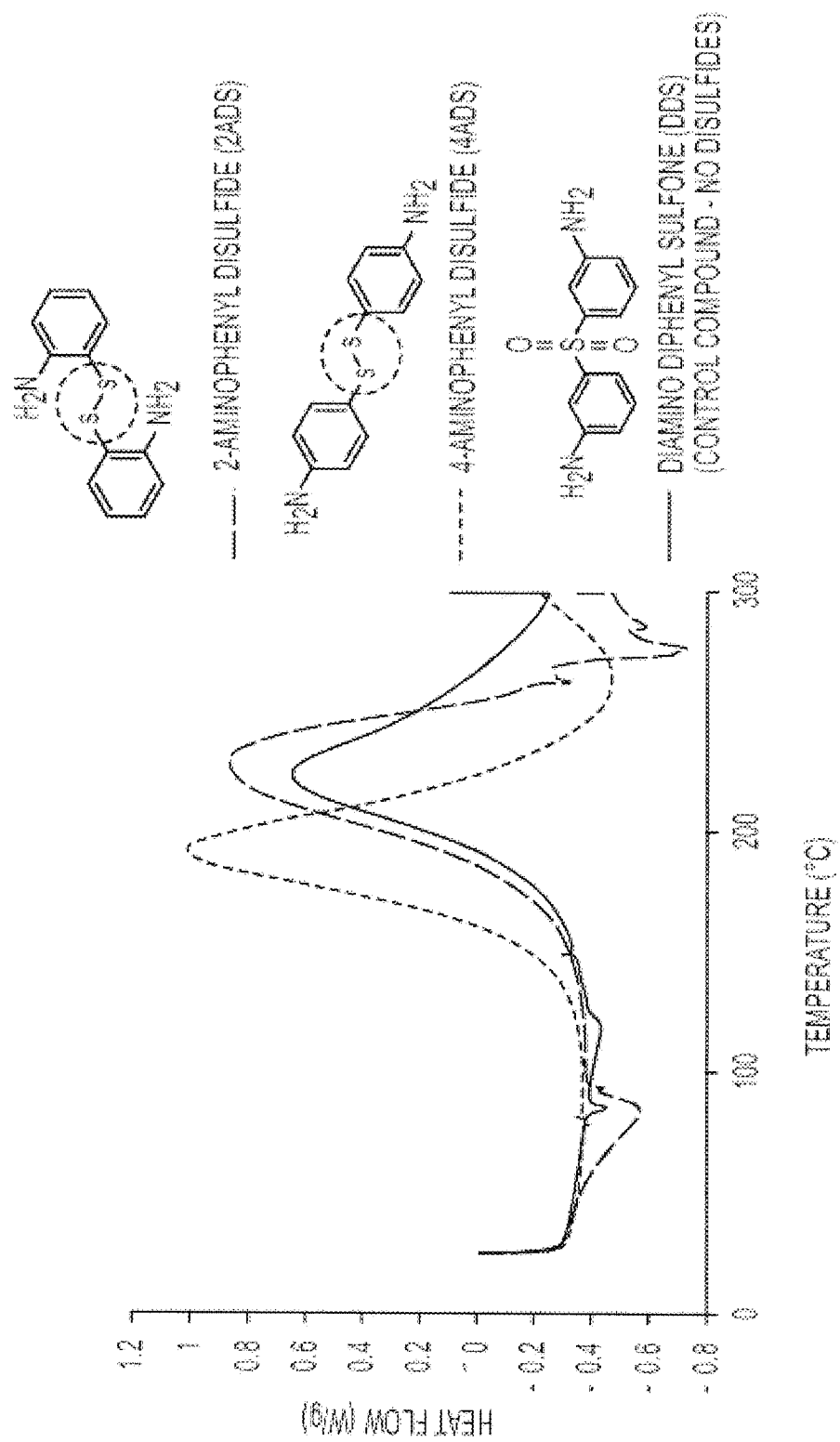
FIG. 34 is a graph showing the cure of epoxy systems with degradable crosslinks according to embodiments of the present disclosure.

The ability to incorporate degradable crosslinks into the epoxy systems was evaluated in relation to disulfide groups, namely 2-aminophenyl disulfide and 4-aminophenyl disulfide. The curves in FIG. 34 show the cure of an epoxy (EPON® 862) with either 2ADS or 4ADS. Although both systems polymerized, results showed that the curing kinetics of 2APDS was much slower than 4APDS, likely owing to the stearic hindrance of the amines in the 2APDS compound. The testing illustrated that a dual curative epoxy system is feasible using an initial cure step in the range of ~120 to 190° C., which should result in thorough consumption of 4-aminophenyl disulfide with little competition from the 4,4'-diaminidiphenyl sulfone. Overall, these curves in FIG. 34 demonstrated that monomers containing the degradable disulfide (—S—S—) group readily polymerize within an epoxy system. Further testing regarding degradable crosslinks is described above in EXAMPLE 5 and FIG. 10A through FIG. 13.

In a qualitative evaluation of degradable disulfide crosslinks in epoxy materials, a sample of epoxy polymer (comprising EPON® 862+4APDS) was placed into 100% thiol (i.e., 2-mercaptoethanol) for approximately 3.5 hours at 75° C. The experimental setup is shown in FIG. 35 (with the epoxy sample 180 in the thiol solution 185), the sample prior to immersion is shown in FIG. 36, and the degraded polymer sample after immersion is shown FIG. 37 (wherein an outer portion of the sample became transparent over time).

Example 10

Demonstration of Inside-Out Degradation Mechanism Using Prototype Particles

Figure 38:
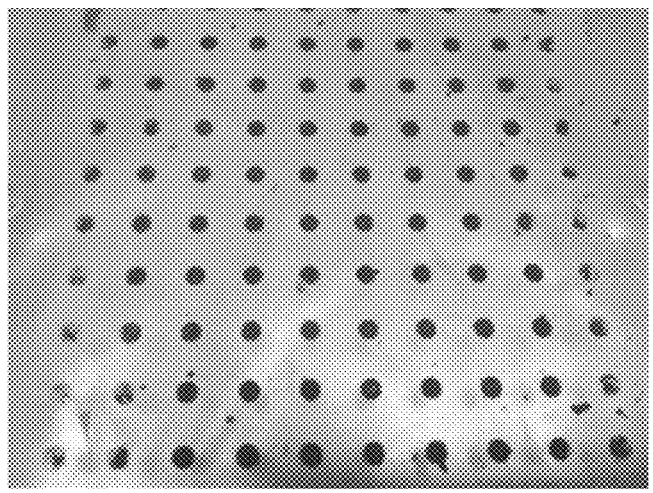
FIG. 38 is an image of a silicone mold containing a core material of stearic acid, 2-mercaptoethanol ("2-ME") and rhodamine B according to embodiments of the present disclosure.

This example was performed to illustrate an exemplary mechanism for the operation shown in FIG. 2. Prototype core-shell particles (e.g., particles 100, 200) were prepared by using an injection molding-type process. The molds were milled from cast aluminum. In this example, the core material was prepared by combining 2.17 g of stearic acid, 2 mL of 2-mercaptoethanol ("2-ME"), and approximately 2 mg of rhodamine B, as a tracer. The material was heated to 80° C. to melt the contents. The liquefied material was then added to silicone molds by quickly spreading the material over the surface and subsequently allowing the material to harden. A digital photographic image of the molded material is shown in FIG. 38. Meanwhile, the resin material was prepared by combining 1.77 g of 4APDS and 3.223 g of EPON® 862. Upon assembling the mold, the material was heated to 60° C. for about 2 hours to cure the resin without melting the core (i.e., stearic acid melting point is approximately 69° C.).

To evaluate the release of the cargo from the core-shell particles, the particles were immersed in 10 mL of deionized water and placed at 80° C. Aliquots were removed at specific intervals and evaluated using a Biotek Synergy MX microplate reader with an excitation of 510/9.0 nm and an emission of 530/9.0 nm. The particles were also evaluated using an Olympus SZ61 microscope.

Example 11

Demonstration of Inside-Out Degradation Mechanism Using Prototype Particles

Figure 39:
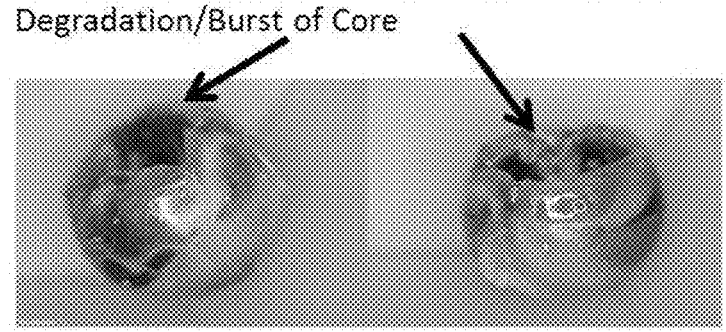
FIG. 39 shows microscope images of core-shell particles according to embodiments of the present disclosure prepared using an injection molding method wherein the shell was formed of an off-stoichiometric ratio of 4APDS and EPON 862.
Figure 39:
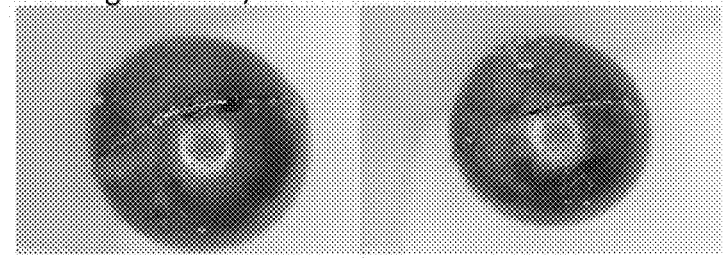
Figure 40:
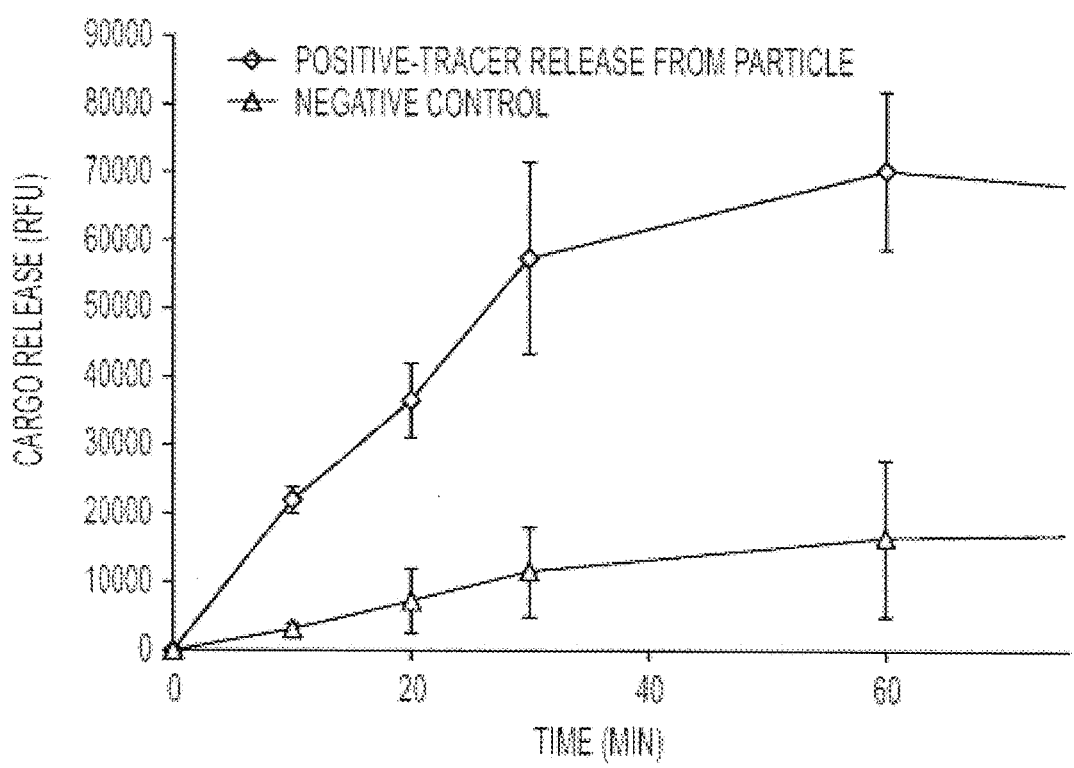
FIG. 40 is a graph showing the release of rhodamine B from core-shell particles according to embodiments of the present disclosure with cores that contain rhodamine B, 2-ME, and stearic acid (upper curve labeled as "Positive-Tracer Release from Particle") and the release of rhodamine B from core-shell particles of the same composition but without thiol in the core (lower curve labeled as "Negative Control")

This example was performed to illustrate an exemplary mechanism for the operation shown in FIG. 2. Particles were prepared comprising stearic acid PCM, a rhodamine B model sensor, and the 2-ME thiol reactive chemistry. The shell of the particle consisted of the formulation discussed in EXAMPLE 3 (i.e., off-stoichiometric ratio of 4APDS and EPON® 862). A negative control was prepared wherein the particle did not contain the 2-ME thiol reactive chemistry in the core. Test results are shown in FIG. 39, which visually demonstrates the capacity for the inside-out degradation of core-shell systems configured in accordance with embodiments of the present invention. The digital photographic images show a distinct destruction and degradation of the shell from particles that contain thiol reactive chemistry in the core (as seen in the two upper images with the arrows noting the degradation/burst of the cores). Conversely, the negative control (see bottom image in FIG. 39) remained intact and did not degrade because of the absence of the thiol reactive chemistry. Release as a function of time is graphically illustrated in FIG. 40 using core-shell particles comprising rhodamine B, 2-ME, and stearic acid, and using core-shell particles comprising rhodamine B and stearic acid without 2-ME. To make the evaluation, aliquots were acquired over time and quantified using fluorescent spectroscopy. As seen in FIG. 40, the presence of the thiol reactive chemistry significantly increased release of the rhodamine B. For example, the positive line shows core-shell particles containing thiol in the core, and the negative line shows core-shell particle without thiol in the core. When thiol is present in the core, the particles burst and release the cargo (i.e., here rhodamine B) into the surrounding external environment.

Example 12

Demonstration of Using Disulfide Content to Control Degradation Profile of Epoxy Shell Material This example was performed to illustrate formation of a shell material using differing formulations, and demonstrate degradation of the shell in response to an exemplary reactive agent in different external environments. Samples were prepared by combining the EPON 862 epoxy monomer with appropriate amine-based monomer (i.e., either PACM, 4APDS, or combinations thereof). The combined monomers were substantially dissolved by mixing with heat and degassed by vacuum. The dynamic mechanical analysis ("DMA") bars were prepared by pouring the pre-mixed monomers into aluminum molds with approximate dimensions of 35 mm×12.7 mm×2.6 mm. All samples were cured at 80° C. for 60 minutes, followed by 150° C. for another 120 minutes.

Figure 41:
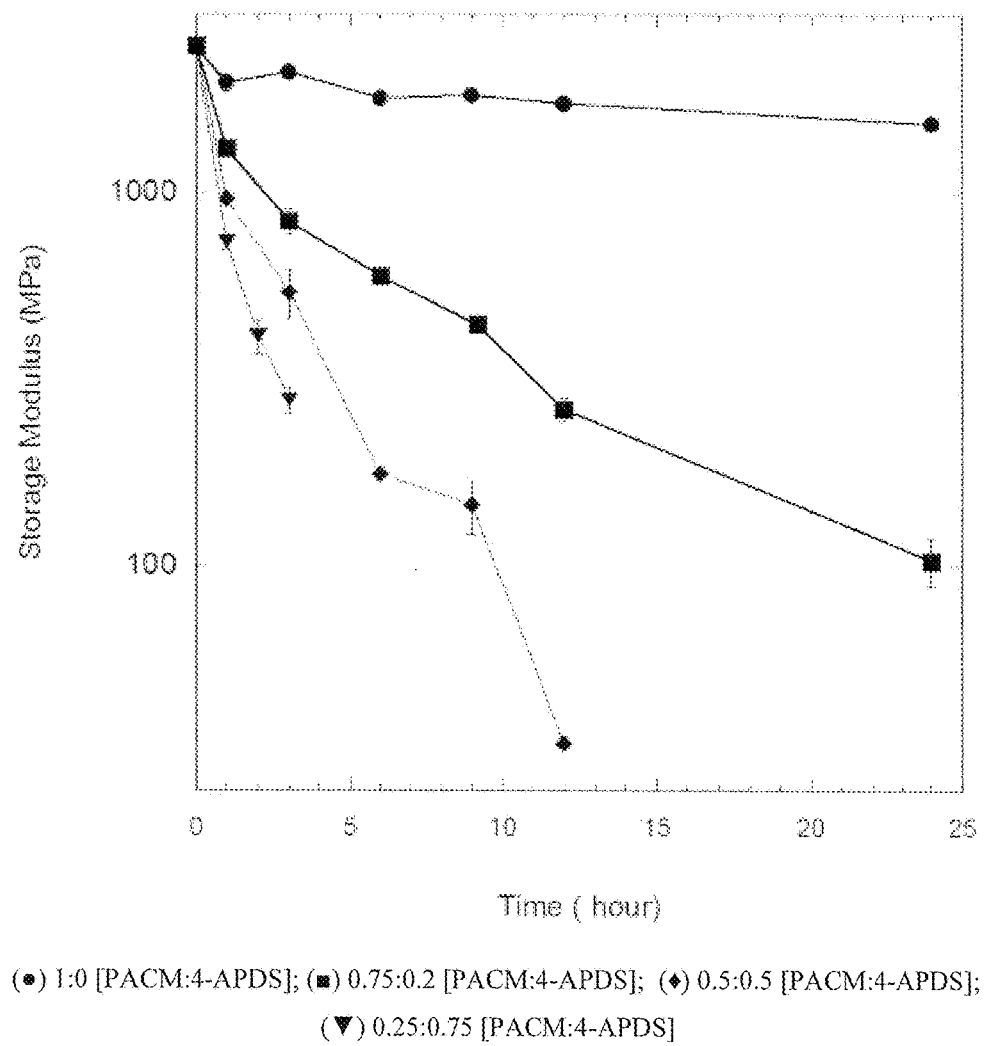
FIG. 41 is a graph showing storage modulus (reported at 35° C.) for epoxy polymers immersed in 100% of 2-ME for differing times at 80° C.
Figure 42A:
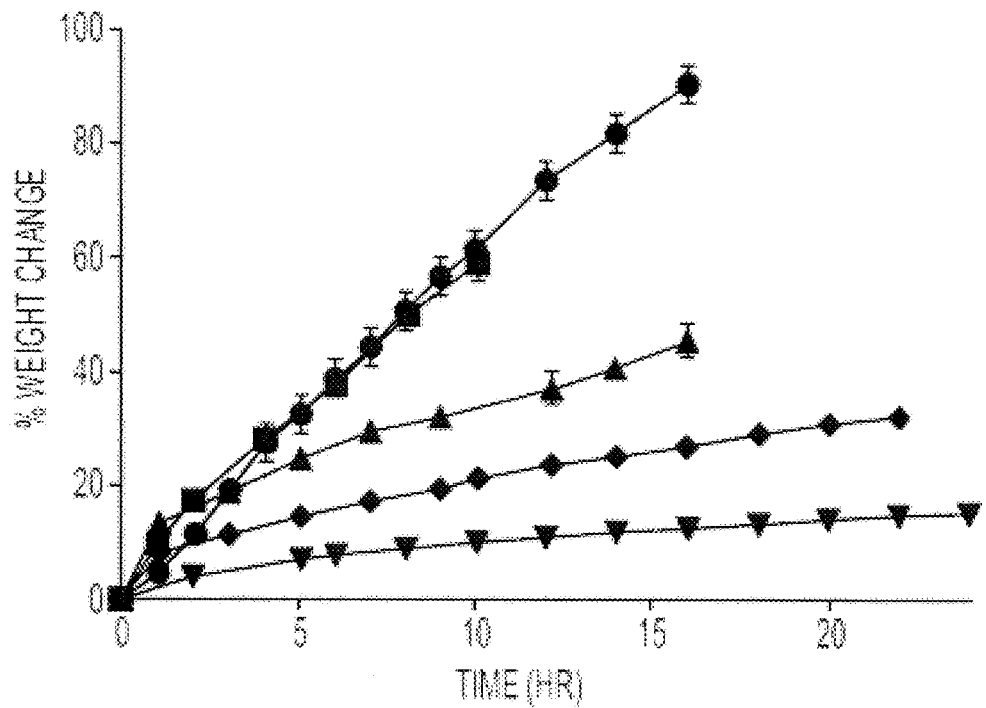
FIG. 42A provides a graph showing the percent weight change for epoxy polymers immersed in 100% of 2-ME for differing times at 80° C.
Figure 42B:
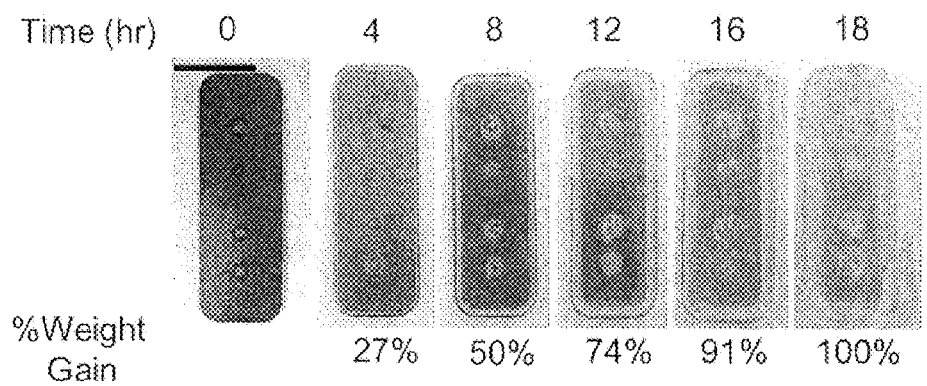
FIG. 42B provides a graph showing images illustrating the progressive degradation of a sample, consisting of EPON 862 and 100% of 4APDS, after immersion in 100% of 2-ME at 80° C. for different times.

As seen in FIG. 41, FIG. 42A, and FIG. 42B, immersion of the epoxy shell materials into 2-ME at 80° C. resulted in changes in weight and in mechanical properties that correlated with the quantity of disulfide within the epoxy sample. FIG. 41 illustrates storage modulus ("E'") over time for various combinations of EPON® 862 with varying ratios of PACM and 4APDS. FIG. 41 shows that the E' (reported at 35° C.) decreased with longer immersion times in the reactive thiol chemistry. The E' decreases more rapidly for samples that contain a higher quantity of disulfides within the network. The decrease in the E' supports the reduction in crosslink density resulting from the scission of disulfide bonds. For example, after a 6-hour immersion in thiol at 80° C., the E' (reported at 35° C.) was 176 (+7) MPa for a sample containing 50% disulfide and 601 (+29) MPa for a sample containing 25% disulfide.

In general, the higher content of disulfide degradable crosslink within the cured epoxy resin resulted in higher weight gain and swelling of the polymer structure. For example, epoxy material cured with 100% of 4APDS amine monomer gained 91% (+4%) of the initial weight after 16 hours, whereas epoxy material cured with 50% of 4APDS and 50% of PACM monomer gained 46% (+3%) of the initial weight after 15 hours. The weight gain of the samples likely occurred from the cleavage of the disulfide groups within the epoxy network, resulting in an expansion of the polymer network and creation of diffusion routes for additional solvent absorption. The EPON® 862 resin cured with 100% of 4APDS ultimately ruptured after being immersed in 2-ME for 18 hours, as shown in the digital photographic images in FIG. 42B.

Conversely, samples devoid of 4APDS absorbed minimal amount of solvent, as shown in FIG. 42A. In FIG. 42A, epoxy polymer samples were formed of APDS:PACM at ratios of (●) 1:0, (■) 0.75:0.25, (▲) 0.5:0.5, (◇) 0.25:0.75, and (○) 0:100 combined with EPON® 862. A control study was performed using 1-propanol, which has a similar structure as 2-ME, but without the thiol functional group. The epoxy material containing disulfide groups (i.e., EPON® 862+4APDS) did not absorb substantial quantities of 1-propanol (i.e., 0.75% (+0.16%) of the initial weight after 24 hours), further supporting the degradation mechanism of thiol reactive groups with disulfide groups within the shell. This data demonstrates the ability to tune the degradation profiles by changing the quantity of degradable crosslinks within the polymer-shell material.

Example 13

Tuning Monomer Concentrations for Shell Dissoultion

This example was performed to illustrate formation of a shell material using differing formulations, and demonstrate degradation of the shell material in response to exemplary reactive agents in different external environments. Samples were prepared by combining the EPON® 862 epoxy monomer (epoxide equivalent weight of 169) with appropriate amine-based monomer (i.e., either PACM, 4APDS, or combinations thereof). The combined monomers were substantially dissolved by mixing with heat and degassed by vacuum. Samples contained either a stoichiometric ratio of monomers (i.e., 1:2 molar ratio of diamine:diepoxide) or an off-stoichiometric ratio of monomers (i.e., 1:1 molar ratio of diamine:diepoxide). All samples were cured at 80° C. for 60 minutes, followed by 150° C. for another 120 minutes. By decreasing the crosslinking density, the complete degradation and dissolution of the disulfide polymer-shell material substantially dissolved after contact with thiol. In particular, the crosslinking density was decreased by changing the stoichiometric ratio of epoxy:amine monomer (i.e., "off-stoichiometric" samples with 1:1.5, epoxy groups to amine hydrogens).

The mechanical properties of the shell material prepared with the excess of amine (i.e., 1:1.5, epoxy groups to amine hydrogens) without exposure to thiol was tested to obtain baseline values of the mechanical properties. The results in Table 4 show that epoxy shell materials prepared with an off-stoichiometric ratio of amine:epoxy maintain the structural integrity. For all curative blends, the Tg values were greater than 109° C., and the E' values were greater than 2,200 MPa (reported at 35° C.; see Table 4).

TABLE 4

| Ratio of AMICURE® PACM:4APDS | Storage Modulus (E') @35° C. (MPa) | Tg (° C.) | $T_D$ (° C.) | $M_C$ |
|---|---|---|---|---|
| 100:0 | 2263 (±22) | 109 (±0.8) | 335 (±0.2) | 1080 (±45) |
| 75:25 | 2692 (±95) | 108 (±1.1) | 326 (±0.8) | 854 (±42) |
| 50:50 | 2886 (±38) | 111 (±1.3) | 300 (±0.4) | 969 (±37) |
| 25:75 | 2520 (±128) | 115 (±1.3) | 291 (±0.4) | 1220 (±45) |
| 0:100 | 2488 (±111) | 116 (±1.0) | 268 (±0.5) | 1359 (±18) |

Figure 43A:
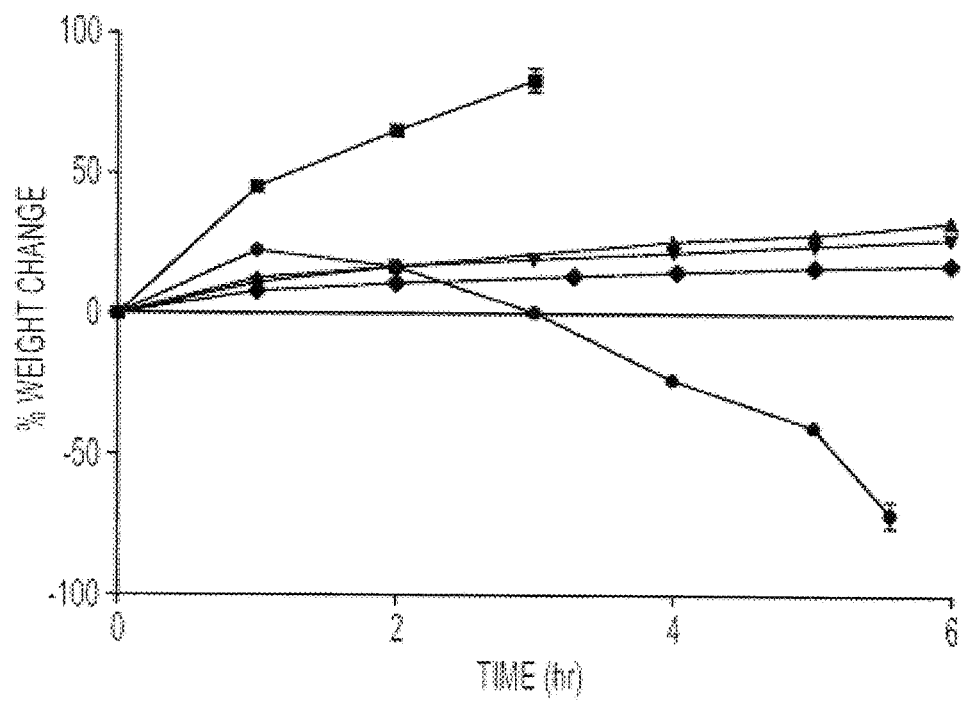
FIG. 43A provides a graph showing percent weight change for epoxy polymers prepared with an off-stoichiometric ratio of 1.5:1 total amine curative:EPON 862 wherein all samples were immersed in 100% of 2-ME for differing times at 80° C.
Figure 43B:
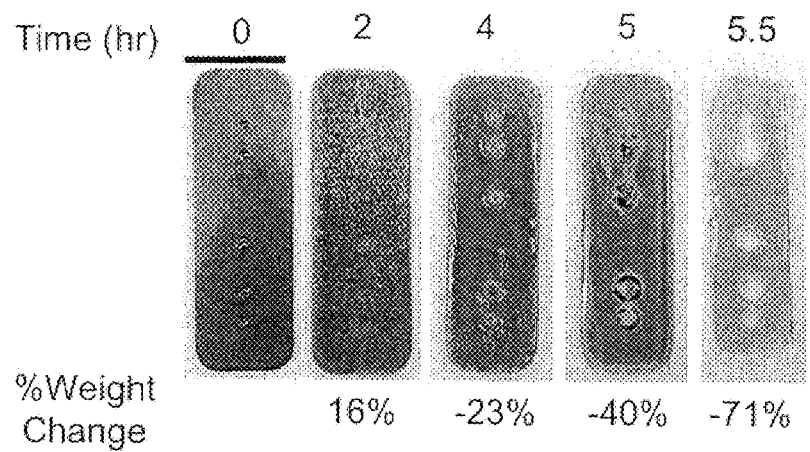
FIG. 43B provides a graph showing images illustrating the degradation of samples formed with EPON 862 and 100% of 4-APDS, after immersion in 100% of 2-ME at 80° C. for different time frames.
Figure 44:
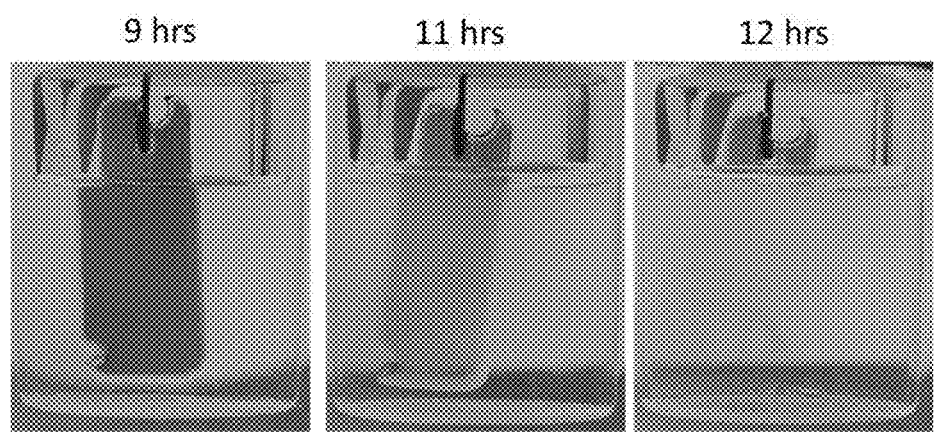
FIG. 44 shows images from video documenting the dissolution of epoxy polymer shell material according to embodiments of the present disclosure comprising EPON862 with an of—stoichiometric ratio of 1.5:1 of 4-APDS:EPON862 immersed in 100% 2-mercaptoethanol at 80° C.

The off-stoichiometric samples were immersed in 100% 2-ME (2-mercaptoethanol) at 80° C. for different time periods. For the off-stoichiometric polymer formulations, the higher content of disulfide degradable crosslink within the cured polymer also resulted in higher weight gain and swelling of the polymer structure. Importantly, the formulation consisting of an off-stoichiometric ratio of 1.5:1 of 4APDS:EPON® 862 resulted in a complete dissolution after approximately 8 hours of immersion in 100% of 2-ME at 80° C. (see FIG. 43A). In FIG. 43A, the epoxy polymer samples were formed of APDS:PACM at ratios of (●) 1:0, (■) 0.75:0.25, (▲) 0.5:0.5, (◇) 0.25:0.75, and (○) 0:100 combined with EPON® 862. The digital photographic image in FIG. 43B shows the dissolution of the sample with time. To further demonstrate the unique properties of the newly designed epoxy formulation, the dissolution of a sample over time was monitored. The digital photographic images extracted from digital videos acquired during the degradation show the dissolution of polymer-shell materials comprising an off-stoichiometric ratio of 1.5:1, 4APDS:EPON® 862. Conversely, the negative control without disulfide moieties in the shell material (an off-stoichiometric ratio of 1.5:1, PACM:EPON® 862) did not degrade in the presence of thiol.

Example 14

Exposure of Epoxy Disulfide Blends to

This example was performed to exemplify formation of a shell material and exposure of the shell to differing external environments (without the presence of reactive agents) to demonstrate the stability of the shell material in conditions exemplary of oil/gas reservoirs. Dynamic mechanical analysis ("DMA") was used to assess the stability of polymer-shell material in environments emulating subterranean reservoir (e.g., hydrocarbon-bearing reservoir) conditions. By measuring changes in the polymer properties (e.g., Tg, E') before and after exposure to a reservoir environment, a quantitative stability value was assigned to the polymer-shell material. Table 5 shows the mechanical properties of epoxy samples exposed to the following conditions:

HPHT #1: 100° C., 10,000 psi, pH 12 cement for 2 weeks;
HPHT #2: 100° C., 10,000 psi, oil for 2 weeks;
API brine 80° C. for 96 hours;
Control: samples without any simulated exposures.

For all of these conditions, all curative blends remained stable, showing Tg values greater than 130° C. and the E' values greater than 2,000 MPa (reported at 35° C.) (see Table 5). FIG. 45A shows the tan delta curves of samples immersed in oil. FIG. 45B shows the tan delta curves of samples immersed in pH 12 slurry. For FIGS. 45A and 45B, the samples were left at 10,000 psi and 100° C. for 2 weeks. Epoxy polymer samples were formed of EPON 862 and PACM:4-APDS at ratios of (i) 1:0, (ii) 0.75:0.25, (iii) 0.5:0.5, (iv) 0.25:0.75, and (v) 0:100. The graphs in FIG.

45A and FIG. 45B show the appearance of another tan delta cure, likely resulting from slight plasticization of the shell material. Overall, however, this data indicates that these epoxy polymer-shell materials are durable and capable of withstanding specific reservoir environments. Table 5 shows the mechanical properties of bulk epoxy shell material with and without exposure to harsh conditions. All samples were prepared with a stoichiometric value of EPON® 862 and a blend of amine monomers (i.e., 4APDS and PACM).

particles with an inside-out mechanism can be used with a variety of monomers, including but not limited to, styrene, acrylates, epoxy, phenolics, imides, vinyl esters, and combinations thereof.

Figure 48:
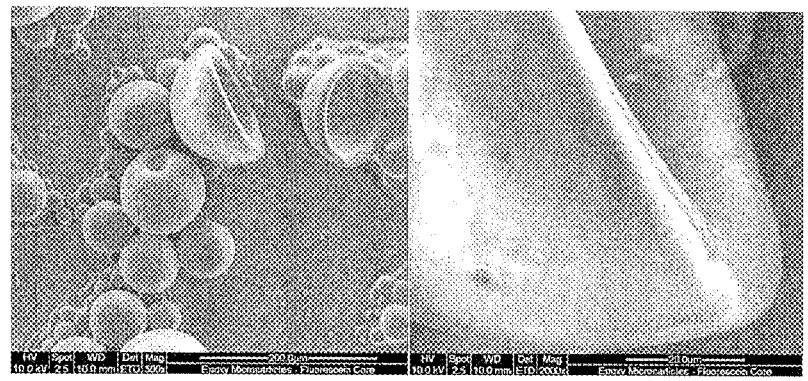
FIG. 48 shows SEM images of core-shell particles according to embodiments of the present disclosure prepared with a double emulsion technique with shells of epoxy material prepared with EPON 862 and AMICURE® PACM.

The SEM images in FIG. 48 show particles prepared using the double emulsion methods that contain collapsed cores resultant of SEM conditions. In these cases, during the double emulsion process, the cores of the particles consist of aqueous liquid, which evaporates during SEM processing.

TABLE 5

| | Storage Modulus (at 35° C.) | | | | Tg (° C.) | | | |
|---|---|---|---|---|---|---|---|---|
| PACM:4APDS | Control | HPHT #1 | HPHT #2 | API Brine | Control | HPHT #1 | HPHT #2 | API Brine |
| 100:0 | 2,438 (±74) | 2,452 (±27) | 2,447 (±55) | 2,237 | 140 (±0.5) | 137 (±0.5) | 137 (±1.6) | 136 |
| 75:25 | 2,525 (±84) | 2,452 (±130) | 2,407 (±53) | 2,314 | 132 (±1) | 138 (±0.6) | 139 (±0.3) | 133 |
| 50:50 | 2,500 (±59) | 2,483 (±44) | 2,587 (±64) | 2,187 | 134 (±0.7) | 140 (±0.4) | 139 (±0.03) | 126 |
| 25:75 | 2,380 (±244) | 2,513 (±178) | 2,449 (±135) | 2,053 | 139 (±0.2) | 141 (±0.6) | 141 (±0.5) | 138 |
| 0:100 | 2,587 (±124) | 2,463 (±145) | 2,447 (±55) | 2,454 | 143 (±0.6) | 141 (±0.2) | 143 (±0.3) | 141 |

Example 15

Preparation of Core-Shell Particles Via Interfacial Polymerization

Figure 46:
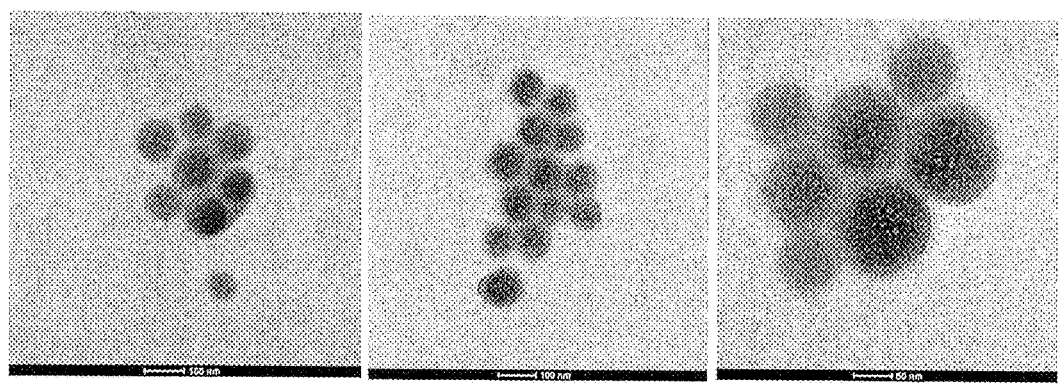
FIG. 46 shows scanning electron microscopy ("SEM") images of core-shell particles according to embodiments of the present disclosure prepared using interfacial polymerization.
Figure 47:
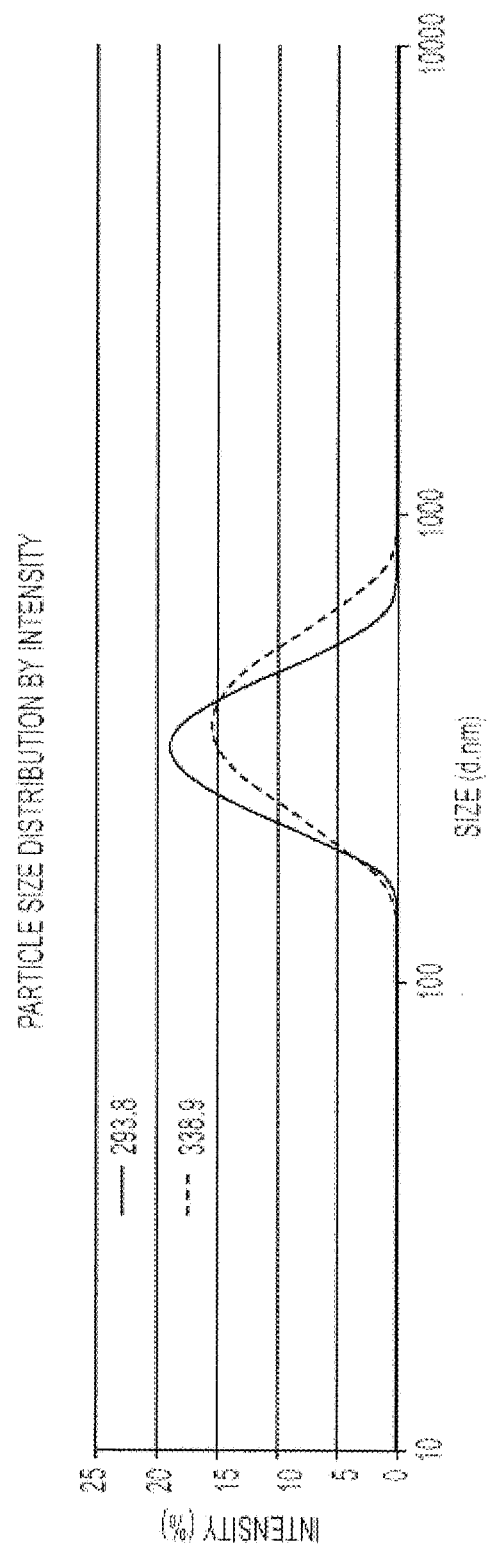
FIG. 47 is a graph of DLS profiles of nanocapsules according to embodiments of the present disclosure prepared using interfacial polymerization to have cores of Miglyol-812 and shells of ethyl 2-cyanoacrylate material.

This example was performed to show formation of core-shell particles with a triglyceride core and a cyanoacrylate shell. Core-shell particles were prepared using interfacial polymerization, whereby polymerization ensues at an interfacial boundary created from monomers (or components) dissolved in two immiscible solvents. Specifically, cyanoacrylate chemistry was used to generate nanocapsules containing triglyceride cores. As shown in the digital photographic images of FIG. 46, the interfacial polymerization technique was used to prepare core-shell nanocapsules with a triglyceride PCM core (i.e., the capric triglyceride Miglyol® 812) and a cyanoacrylate-based polymer shell (i.e., ethyl 2-cyanoacrylate). The SEM images in FIG. 46 indicate that the particles are approximately 50 nm, but are aggregated in clusters of approximately 300 nm. This aggregation is supported by the DLS data, which show particle sizes of approximately 300 nm in diameter (FIG. 47). FIG. 47 shows DLS profiles of nanocapsules prepared using interfacial polymerization. Particles contained cores of Miglyol® 812 and shells of ethyl 2-cyanoacrylate material. The curves represent two repeated experiments of a single synthesis protocol.

Example 16

Preparation of Core-Shell Particles Via Double Emulsions

Figure 49:
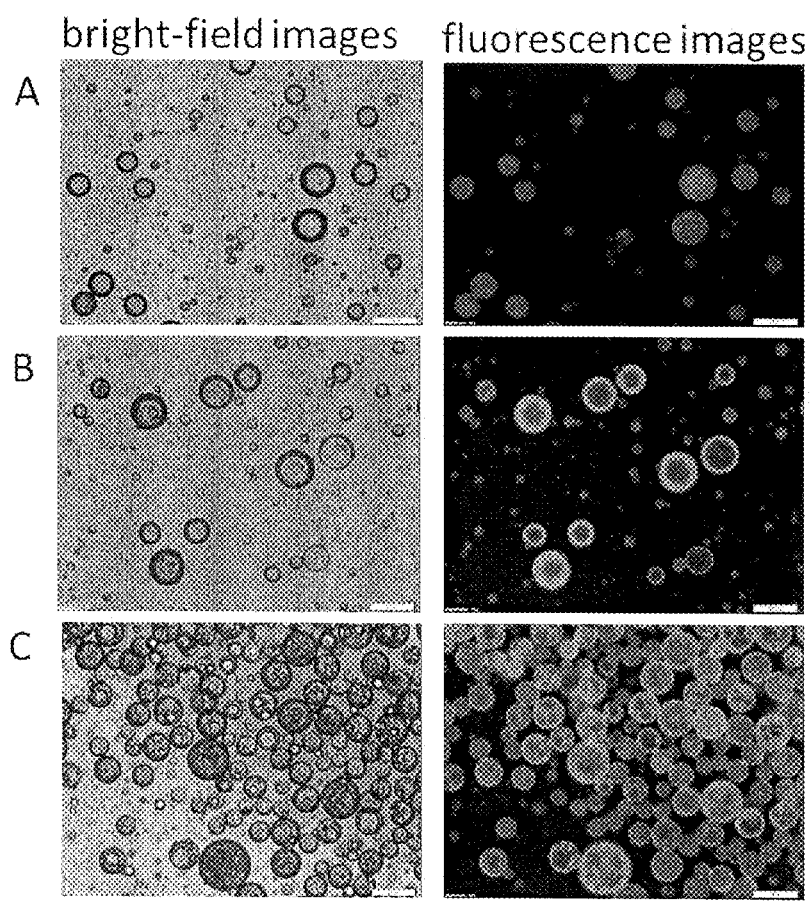
FIG. 49 shows bright-field (left column of images) and fluorescence (right column of images) microscopy images of core-shell particles according to embodiments of the present disclosure prepared with double emulsion technique.

This example was performed to show formation of core-shell particles with an aqueous core, a fluorophore (i.e., a carried material), and an epoxy shell. Core-shell particles were prepared comprising epoxy-based shell materials. A water-in-oil-in-water ("WOW") emulsion was used to make a double emulsion. The oil phase was subsequently cured to generate core-shell particles. The double emulsion method entailed first forming a primary water-in-monomer emulsion, which is subsequently added to an excess of water to form a secondary emulsion, thereby resulting in a double emulsion. The double emulsion is heated, resulting in a cure of the monomer. The WOW emulsion to prepare core-shell These images demonstrate the successful preparation of core-shell particles using a stable epoxy material for the shell. The ability to incorporate different fluorophores into the core material was further evaluated. FIG. 49 shows bright-field images (left column of images) and corresponding fluorescence images (right column of images) of core-shell particles prepared using different fluorophores, as model sensors, in the cores. In FIG. 49, particles were prepared with EPON® 862 and PACM and DMP-30 epoxy accelerator. Core materials were (row A) Nile Red, (row B) fluorescein and Nile Red, and (row C) fluorescein. Notably, the two fluorophores tested here (i.e., fluorescein and Nile Red) appeared to migrate to the shell during the polymerization process. This highlights the importance of ensuring compatibility between cargo and core-shell carrier systems during the development of these methods.

Example 17

Figure 50:
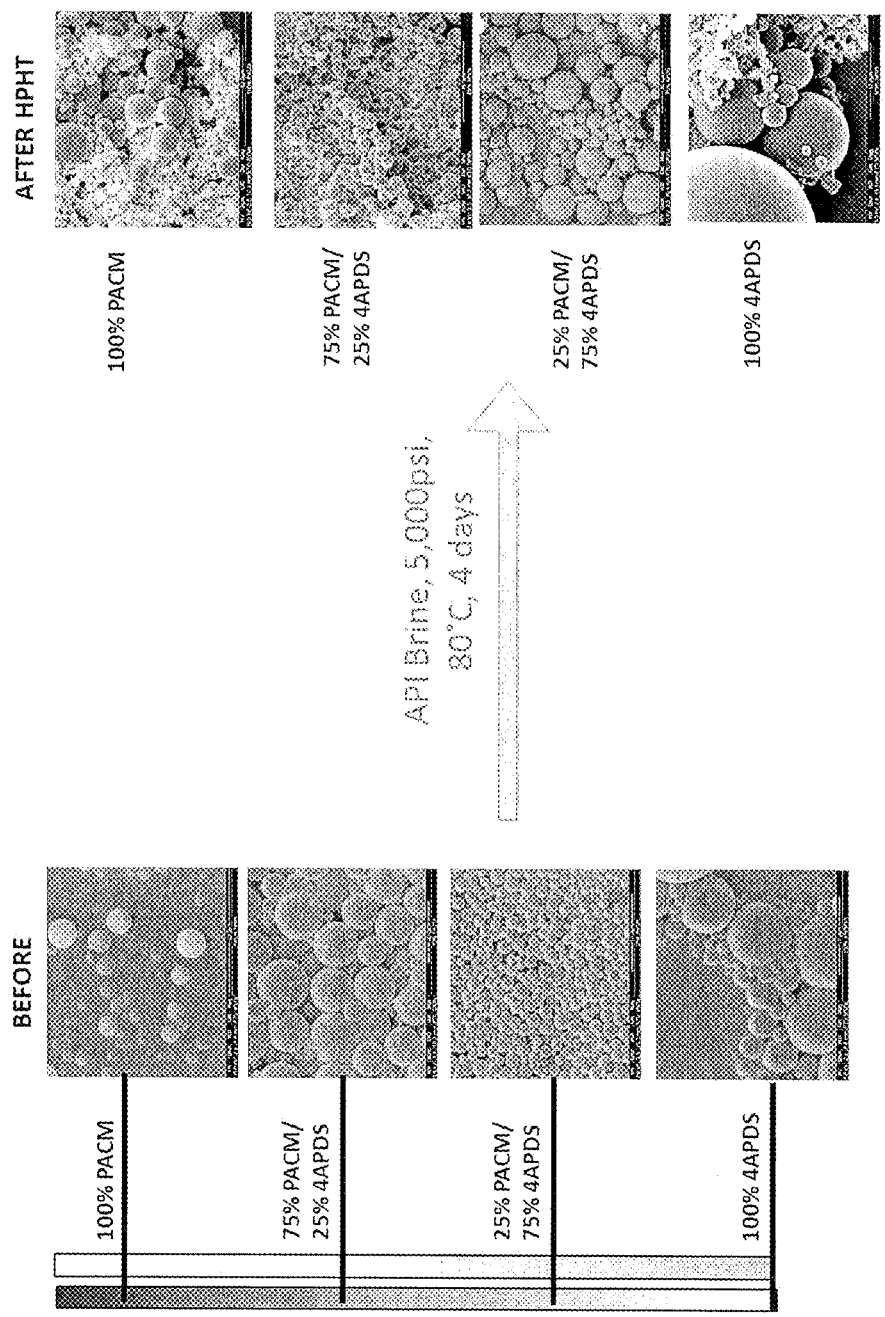
FIG. 50 shows SEM images of epoxy particles according to embodiments of the present disclosure prepared using a single emulsion method, wherein the particles are illustrated with and without exposure to high pressure, high temperature ("HPHT") conditions.

Stability of Particles after Exposure to High Pressure, High Temperature (HPHT) Conditions The stability of particles prepared without reactive chemistry embedded in the core was evaluated. More specifically, this example was performed to demonstrate the formation of particles and exposure of the particles to differing external environments without the presence of reactive agents, and show the stability of the particles in conditions exemplary of oil/gas reservoirs. A single emulsion method was used to prepare epoxy-based particles comprising EPON® 862 in combination with different amine curative blends of 4APDS and PACM. These particles were subjected to HPHT conditions comprising 5,000 psi, 80° C., API brine for 4 days. As an initial qualitative evaluation, particle morphology was evaluated before and after incubation in a reservoir environment. As shown in FIG. 50, the morphology of the epoxy particles appeared to be similar with and without exposure to these harsh reservoir conditions. These images demonstrated that the morphology of the particles containing degradable disulfides was not affected by the HPHT conditions. Studies were performed using a Fann Model 275 consistometer.

Example 18

Inside-Out Degradation of Core-Shell Systems Using an In-Situ Generating Reactive Species This example was performed to demonstrate formation of a particle with a core, a shell, reactive species, and a carried material. Core-shell particles were prepared using a double emulsion technique, such as the water-in-oil-in-water ("WOW") method. The core of the particle contained a component capable of an in-situ generation of a reactive species that can interact with and degrade the shell from the inside-out (i.e., at the core-shell interface.) Non-limiting examples of reactive species include radical initiators, including azo compounds (e.g., azobisisobutyronitrile), organic peroxides (e.g., benzoyl peroxide, tert-butyl peroxide, cumyl hydroperoxides, ketone peroxides), hydrogen peroxide, and cerium ammonium nitrate. The core of the particle also contained a tracer, sensor, or contrast agent. When the particle was heated, the radical was formed within the core and readily reacted with the shell at the core-shell interface to degrade the shell from the inside out, resulting in the release of the sensor.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims.

As used herein with respect to an identified property or circumstance, "substantially" refers to a degree of deviation that is sufficiently small so as to not measurably detract from the identified property or circumstance. The exact degree of deviation allowable may in some cases depend on the specific context.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D. The term "comprising," which is synonymous with "including," "containing," or "characterized by," is inclusive or open-ended and does not exclude additional, unrecited elements or method steps. "Comprising" is a term of art used in claim language which means that the named elements are present, but other elements can be added and still form a construct or method within the scope of the claim.

All publications and patent applications are herein incorporated by reference to the same extent as if each individual publication or patent application was specifically and individually indicated to be incorporated by reference.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

The invention claimed is:

1. A delivery and release system comprising a particle comprising:
   a carrier element forming an outer shell;
   a releasable material positioned within and surrounded by the outer shell; and
   a reactive agent positioned within and surrounded by the outer shell,
   wherein the reactive agent is configured to react with the carrier element when the external environment exhibits specified conditions to thereby change at least a portion of the outer shell so as to cause at least a portion of the releasable material to be released from the carrier element and be in fluid communication with the external environment; and
   wherein the reactive agent is configured to react with the carrier element and degrade at least a portion of the outer shell via inside-out degradation.

2. The delivery and release system according to claim 1, wherein the reactive agent is configured to react one or both of physically and chemically with the carrier element.

3. The delivery and release system according to claim 1, wherein the particle comprises a phase change material ("PCM").

4. The delivery and release system according to claim 3, wherein the PCM is configured to be a solid up to a temperature of about 40° C. and is configured to be a liquid at temperatures greater than about 40° C.

5. The delivery and release system according to claim 3, wherein the specified conditions of the external environment are conditions in a subterranean reservoir, and wherein the PCM is adapted to transition between solid and liquid states or between liquid and vapor states in response to one or more of the specified conditions in the subterranean reservoir.

6. The delivery and release system according to claim 5, wherein the PCM is configured to substantially isolate the reactive agent from reacting with the carrier element until the particle is subjected to the one or more of the specified conditions in the subterranean reservoir.

7. The delivery and release system according to claim 1, wherein the particle comprises a releasable material positioned within the inner core and selected from the group consisting of sensors, probes, markers, materials reactive with one or more components of the reservoir, and combinations thereof.

8. The delivery and release system according to claim 1, wherein at least a portion of the delivery and release system is in a form of nanoparticles.

9. The delivery and release system according to claim 1, wherein at least a portion of the delivery and release system is in a form of solid lipid nanoparticles.

10. A delivery and release system comprising a particle comprising:
   a carrier element forming an outer shell, the carrier element comprising a polymeric material that includes crosslinks configured for degradation upon reaction with the reactive agent;
   a releasable material positioned within and surrounded by the outer shell; and
   a reactive agent positioned within and surrounded by the outer shell,
   wherein the reactive agent is configured to react with the carrier element when the external environment exhibits specified conditions to thereby change at least a portion of the outer shell so as to cause at least a portion of the releasable material to be released from the carrier element and be in fluid communication with the external environment.

11. The delivery and release system according to claim 10, wherein the carrier element comprises a material adapted for reversible change of the degradation of the crosslinks.

12. The delivery and release system according to claim 1, wherein the particle comprises a phase change material ("PCM").

13. The delivery and release system according to claim 12, wherein the PCM is configured to be a solid up to a temperature of about 40° C. and is configured to be a liquid at temperatures greater than about 40° C.

14. The delivery and release system according to claim 12, wherein the specified conditions of the external environment are conditions in a subterranean reservoir, and wherein the PCM is adapted to transition between solid and liquid states or between liquid and vapor states in response to one or more of the specified conditions in the subterranean reservoir.

15. The delivery and release system according to claim 5, wherein the PCM is configured to substantially isolate the reactive agent from reacting with the carrier element until the particle is subjected to the one or more of the specified conditions in the subterranean reservoir.

16. The delivery and release system according to claim 10, wherein the particle comprises a releasable material positioned within the inner core and selected from the group consisting of sensors, probes, markers, materials reactive with one or more components of the reservoir, and combinations thereof.

17. The delivery and release system according to claim 10, wherein at least a portion of the delivery and release system is in a form of nanoparticles.

18. The delivery and release system according to claim 10, wherein at least a portion of the delivery and release system is in a form of solid lipid nanoparticles.

* * * * *